US011382718B2

(12) United States Patent
Katzman et al.

(10) Patent No.: US 11,382,718 B2
(45) Date of Patent: Jul. 12, 2022

(54) ARRANGEMENTS FOR REMOTE ORTHODONTIC TREATMENT

(71) Applicant: SDC U.S. SMILEPAY SPV, Nashville, TN (US)

(72) Inventors: Jordan Katzman, Nashville, TN (US); Alex Fenkell, Nashville, TN (US); David Katzman, Nashville, TN (US); Christopher Yancey, Nashville, TN (US); Josh Chapman, Nashville, TN (US)

(73) Assignee: SDC U.S. SMILEPAY SPV, Nashville, TN (US)

( * ) Notice: Subject to any disclaimer, the term of this patent is extended or adjusted under 35 U.S.C. 154(b) by 0 days.

(21) Appl. No.: 16/047,623

(22) Filed: Jul. 27, 2018

(65) Prior Publication Data

US 2018/0368943 A1 Dec. 27, 2018

Related U.S. Application Data

(62) Division of application No. 15/725,430, filed on Oct. 5, 2017.

(Continued)

(51) Int. Cl.
*A61C 7/00* (2006.01)
*A61C 7/08* (2006.01)
(Continued)

(52) U.S. Cl.
CPC ............... *A61C 7/002* (2013.01); *A61C 7/02* (2013.01); *A61C 7/08* (2013.01); *A61C 8/0001* (2013.01);
(Continued)

(58) Field of Classification Search
CPC ......... A61C 7/002; A61C 7/08; A61C 8/0001; A61C 9/0006; A61C 9/02; A61C 13/0004;
(Continued)

(56) References Cited

U.S. PATENT DOCUMENTS 4,002,162 A   1/1977   Weisser
4,003,132 A   1/1977   Beck
(Continued)

FOREIGN PATENT DOCUMENTS

AU   2015100268   5/2015
BE   1016074      2/2006
(Continued)

OTHER PUBLICATIONS

"Invisalign Manufacturing Process English" video, uploaded to YouTube on Apr. 7, 2014, https://www.youtube.com/watch?v=vsRO_wTR2a8. access Sep. 26, 2019 (Year: 2014).*
(Continued)

*Primary Examiner* — Edward Moran
*Assistant Examiner* — Matthew P Saunders
(74) *Attorney, Agent, or Firm* — Foley & Lardner LLP

(57) ABSTRACT

Systems and methods of remote orthodontic treatment include receiving a plurality of images from a customer where the plurality of images represent teeth of the customer, receiving a first approval from a staff computing device where the first approval is indicative of a staff user approving the plurality of images for assessment by a dental professional, receiving a second approval from a provider computing device where the second approval is indicative of the provider approving a fitness of the customer for treatment, generating, in response to receiving the second approval, a treatment plan including a series of steps to reposition at least one tooth of the teeth of the customer, and
(Continued)

manufacturing one or more aligners based at least in part on the treatment plan where the aligners are specific to the customer and are configured to reposition the at least one tooth of the teeth of the customer.

18 Claims, 51 Drawing Sheets

Related U.S. Application Data

(60) Provisional application No. 62/522,847, filed on Jun. 21, 2017.

(51) Int. Cl.
    *A61C 7/02*         (2006.01)
    *A61C 9/00*         (2006.01)
    *A61C 8/00*         (2006.01)
    *A61C 19/02*       (2006.01)
    *A61C 13/00*       (2006.01)

(52) U.S. Cl.
    CPC ............ *A61C 9/0006* (2013.01); *A61C 19/02* (2013.01); *A61C 9/0026* (2013.01); *A61C 9/0053* (2013.01); *A61C 13/0004* (2013.01)

(58) Field of Classification Search
    CPC . A61C 7/00; G06F 17/60; G06F 19/00; G06F 19/321; G06F 19/3418; G16H 10/60; G16H 50/20; G16H 50/50; G06Q 50/24; G06T 2207/33036
    USPC ......... 433/2, 3, 6, 24, 68, 214, 223; 705/2–3
    See application file for complete search history.

(56) References Cited

U.S. PATENT DOCUMENTS

| | | | |
|---|---|---|---|
| 4,200,089 A | 4/1980 | Inoue | |
| 4,763,791 A | 8/1988 | Halverson et al. | |
| 5,190,168 A | 3/1993 | French et al. | |
| 5,385,155 A | 1/1995 | Kittelsen et al. | |
| 5,816,255 A * | 10/1998 | Fishman | A61C 9/0006 128/861 |
| 5,882,192 A * | 3/1999 | Bergersen | A61C 7/00 433/2 |
| 5,975,893 A | 11/1999 | Chishti et al. | |
| 6,121,565 A | 9/2000 | Allott, III | |
| 6,227,851 B1 | 5/2001 | Chishti et al. | |
| 6,394,801 B2 | 5/2002 | Chishti et al. | |
| 6,450,807 B1 | 9/2002 | Chishti et al. | |
| 6,488,499 B1 | 12/2002 | Miller | |
| 6,582,225 B1 * | 6/2003 | Bergersen | A61C 7/00 433/2 |
| 6,632,089 B2 | 10/2003 | Rubbert et al. | |
| 6,699,037 B2 | 3/2004 | Chishti et al. | |
| 6,761,560 B2 | 7/2004 | Miller | |
| 7,037,108 B2 | 5/2006 | Chishti et al. | |
| 7,077,647 B2 | 7/2006 | Choi et al. | |
| 7,156,661 B2 * | 1/2007 | Choi | A61C 7/00 433/213 |
| 7,188,073 B1 | 3/2007 | Tam et al. | |
| 7,192,275 B2 | 3/2007 | Miller | |
| 7,225,170 B1 | 5/2007 | Ryan, Jr. | |
| 7,383,198 B1 | 6/2008 | Sepe | |
| 7,467,022 B2 | 12/2008 | Bhagwat et al. | |
| 7,523,044 B2 * | 4/2009 | Rosenblood | G06Q 40/08 705/2 |
| 7,578,674 B2 | 8/2009 | Chishti et al. | |
| 7,597,245 B1 | 10/2009 | Tillery | |
| 7,716,062 B2 | 5/2010 | Bergersen | |
| 7,738,989 B2 | 6/2010 | Taub et al. | |
| 7,904,307 B2 | 3/2011 | Abolfathi et al. | |
| 7,905,725 B2 * | 3/2011 | Chishti | A61C 7/00 433/24 |
| 7,916,900 B2 | 3/2011 | Lanier | |
| 7,967,145 B2 | 6/2011 | Tchouangang | |
| 8,015,049 B1 | 9/2011 | Tam et al. | |
| 8,075,306 B2 | 12/2011 | Kitching et al. | |
| 8,087,932 B2 | 1/2012 | Liu | |
| 8,092,215 B2 * | 1/2012 | Stone-Collonge | G16H 30/40 433/24 |
| 8,145,340 B2 | 3/2012 | Taub et al. | |
| 8,287,275 B2 | 10/2012 | Knutson | |
| 8,303,301 B2 * | 11/2012 | Bergersen | A61C 7/00 382/128 |
| 8,562,338 B2 | 10/2013 | Kitching et al. | |
| 8,577,493 B2 | 11/2013 | Taub et al. | |
| 8,591,225 B2 | 11/2013 | Wu et al. | |
| 8,636,510 B2 | 1/2014 | Kitching et al. | |
| 8,651,859 B2 | 2/2014 | Chishti et al. | |
| 8,731,280 B2 | 5/2014 | Kuo et al. | |
| 8,740,614 B2 | 6/2014 | Wen et al. | |
| 8,765,031 B2 | 7/2014 | Li et al. | |
| 8,899,978 B2 | 12/2014 | Kitching et al. | |
| 8,930,219 B2 * | 1/2015 | Trosien | G06Q 10/10 705/3 |
| 9,017,072 B2 | 4/2015 | Kitching et al. | |
| 9,107,722 B2 | 8/2015 | Matov et al. | |
| 9,168,113 B2 | 10/2015 | Wu et al. | |
| 9,256,962 B2 | 2/2016 | Berry et al. | |
| 9,364,297 B2 | 6/2016 | Kitching et al. | |
| D764,061 S | 8/2016 | Furdui-Carr | |
| 9,655,693 B2 | 5/2017 | Li et al. | |
| 9,715,753 B2 | 7/2017 | Berry et al. | |
| 9,757,065 B1 | 9/2017 | Suri et al. | |
| 9,855,123 B2 | 1/2018 | Wolgin | |
| 9,922,170 B2 * | 3/2018 | Trosien | G06Q 10/10 |
| 10,052,174 B2 | 8/2018 | Kitching et al. | |
| 10,085,823 B2 | 10/2018 | Cao et al. | |
| 10,134,286 B1 | 11/2018 | Elswick et al. | |
| 10,136,972 B2 | 11/2018 | Sabina et al. | |
| 10,231,801 B2 | 3/2019 | Korytov et al. | |
| 10,342,638 B2 | 7/2019 | Kitching et al. | |
| 10,383,705 B2 | 8/2019 | Shanjani et al. | |
| 10,504,386 B2 * | 12/2019 | Levin | G06F 3/0481 |
| 10,595,966 B2 * | 3/2020 | Carrier, Jr. | A61C 9/0053 |
| 10,636,105 B2 | 4/2020 | Pumphrey | |
| 2001/0027481 A1 | 10/2001 | Whyel | |
| 2002/0007290 A1 | 1/2002 | Gottlieb | |
| 2002/0014357 A1 | 2/2002 | Hammonds | |
| 2002/0028418 A1 * | 3/2002 | Farag | A61C 9/0053 433/29 |
| 2002/0116232 A1 | 8/2002 | Rapp et al. | |
| 2002/0143574 A1 | 10/2002 | Karras et al. | |
| 2002/0188478 A1 * | 12/2002 | Breeland | G06Q 30/06 705/3 |
| 2003/0138752 A1 * | 7/2003 | Bergersen | A61C 7/00 433/2 |
| 2003/0207227 A1 * | 11/2003 | Abolfathi | A61C 7/00 433/24 |
| 2003/0225594 A1 | 12/2003 | Bergersen | |
| 2004/0073611 A1 | 4/2004 | Atwood | |
| 2004/0091835 A1 | 5/2004 | Roetzer | |
| 2004/0152036 A1 * | 8/2004 | Abolfathi | A61C 7/00 433/24 |
| 2004/0185415 A1 | 9/2004 | Ghim | |
| 2004/0197728 A1 * | 10/2004 | Abolfathi | A61C 7/00 433/24 |
| 2004/0250359 A1 | 12/2004 | Spivey | |
| 2005/0159986 A1 * | 7/2005 | Breeland | G06Q 30/06 705/3 |
| 2005/0182654 A1 | 8/2005 | Abolfathi et al. | |
| 2006/0019216 A1 | 1/2006 | Priluck et al. | |
| 2006/0026051 A1 | 2/2006 | Rose | |
| 2006/0040230 A1 | 2/2006 | Blanding et al. | |
| 2006/0057541 A1 * | 3/2006 | Kahwaty | A61C 19/063 433/215 |
| 2006/0064329 A1 * | 3/2006 | Abolfathi | G06Q 30/06 705/3 |
| 2006/0093982 A1 | 5/2006 | Wen | |
| 2006/0141416 A1 | 6/2006 | Knutson | |
| 2006/0154198 A1 * | 7/2006 | Durbin | A61C 9/00 433/29 |
| 2006/0167724 A1 | 7/2006 | Petersen et al. | |

(56) References Cited

U.S. PATENT DOCUMENTS

| | | | |
|---|---|---|---|
| 2006/0173708 A1 | 8/2006 | Vining et al. | |
| 2006/0275731 A1 | 12/2006 | Wen et al. | |
| 2006/0275736 A1 | 12/2006 | Wen et al. | |
| 2007/0037116 A1* | 2/2007 | Knutson | A61C 9/0006 433/68 |
| 2007/0061166 A1 | 3/2007 | Ramasubramanian et al. | |
| 2007/0102946 A1 | 5/2007 | Blackwell et al. | |
| 2007/0128574 A1* | 6/2007 | Kuo | G16H 50/30 433/24 |
| 2007/0134613 A1 | 6/2007 | Kuo et al. | |
| 2007/0238065 A1* | 10/2007 | Sherwood | A61C 7/00 433/24 |
| 2008/0059227 A1 | 3/2008 | Clapp | |
| 2008/0159798 A1* | 7/2008 | Culp | G06K 1/121 400/247 |
| 2008/0206705 A1 | 8/2008 | Kaza et al. | |
| 2008/0305454 A1 | 12/2008 | Kitching et al. | |
| 2008/0306724 A1 | 12/2008 | Kitching et al. | |
| 2008/0308450 A1 | 12/2008 | Tchouangang | |
| 2009/0061381 A1 | 3/2009 | Durbin et al. | |
| 2009/0081604 A1 | 3/2009 | Fisher | |
| 2009/0081611 A1 | 3/2009 | Hines et al. | |
| 2009/0136893 A1 | 5/2009 | Zegarelli | |
| 2009/0215003 A1 | 8/2009 | Swain et al. | |
| 2010/0036682 A1* | 2/2010 | Trosien | G16H 50/70 705/3 |
| 2010/0068676 A1 | 3/2010 | Mason et al. | |
| 2010/0082391 A1 | 4/2010 | Soerensen et al. | |
| 2010/0105011 A1 | 4/2010 | Karkar et al. | |
| 2010/0145754 A1 | 6/2010 | Rahman | |
| 2010/0153162 A1 | 6/2010 | Tam et al. | |
| 2010/0179854 A1 | 7/2010 | Shafer et al. | |
| 2010/0203466 A1 | 8/2010 | Lawrence | |
| 2011/0084093 A1 | 4/2011 | Nehren et al. | |
| 2011/0106557 A1 | 5/2011 | Gazula | |
| 2011/0161249 A1 | 6/2011 | Whitehouse | |
| 2011/0183293 A1 | 7/2011 | Tchouangang | |
| 2011/0215933 A1 | 9/2011 | Darling et al. | |
| 2012/0065985 A1 | 3/2012 | Royal et al. | |
| 2012/0083549 A1 | 4/2012 | Kamohara et al. | |
| 2012/0267811 A1 | 10/2012 | Weitzman | |
| 2012/0330677 A1 | 12/2012 | Velimesis | |
| 2013/0028617 A1 | 1/2013 | Fukuoka et al. | |
| 2013/0035955 A1 | 2/2013 | Torres | |
| 2013/0087157 A1 | 4/2013 | Hawkins et al. | |
| 2013/0089828 A1 | 4/2013 | Borovinskih et al. | |
| 2013/0122448 A1 | 5/2013 | Kitching | |
| 2013/0215116 A1 | 8/2013 | Siddique et al. | |
| 2013/0230300 A1 | 9/2013 | Saleh et al. | |
| 2013/0286174 A1 | 10/2013 | Urakabe | |
| 2014/0052661 A1 | 2/2014 | Shakes et al. | |
| 2014/0122100 A1 | 5/2014 | Fillmore | |
| 2014/0199653 A1 | 7/2014 | Kurthy | |
| 2014/0249878 A1 | 9/2014 | Kaufman | |
| 2014/0278679 A1 | 9/2014 | Navani et al. | |
| 2014/0315153 A1 | 10/2014 | Kitching et al. | |
| 2014/0330577 A1 | 11/2014 | Herman et al. | |
| 2014/0356798 A1 | 12/2014 | Parker | |
| 2014/0379356 A1* | 12/2014 | Sachdeva | A61C 7/002 705/2 |
| 2015/0010879 A1 | 1/2015 | Kurthy | |
| 2015/0025907 A1* | 1/2015 | Trosien | G06Q 10/10 705/2 |
| 2015/0202025 A1 | 7/2015 | Kaza et al. | |
| 2015/0205921 A1 | 7/2015 | Dick et al. | |
| 2015/0220887 A1 | 8/2015 | Peres et al. | |
| 2015/0238283 A1* | 8/2015 | Tanugula | G06F 30/00 433/6 |
| 2015/0257859 A1 | 9/2015 | Akl | |
| 2015/0310387 A1 | 10/2015 | Friedman et al. | |
| 2016/0012182 A1 | 1/2016 | Golay | |
| 2016/0034871 A1 | 2/2016 | Vargas et al. | |
| 2016/0132893 A1 | 5/2016 | Bisges et al. | |
| 2016/0158627 A1* | 6/2016 | Layzell | A61C 19/05 264/16 |
| 2016/0242871 A1 | 8/2016 | Morton et al. | |
| 2016/0253464 A1 | 9/2016 | Balwani et al. | |
| 2016/0256240 A1 | 9/2016 | Shivapuja et al. | |
| 2016/0287198 A1 | 10/2016 | Abramovich et al. | |
| 2016/0317264 A1 | 11/2016 | Derraugh et al. | |
| 2017/0010252 A1 | 1/2017 | Bearup et al. | |
| 2017/0020642 A1 | 1/2017 | Mah | |
| 2017/0039423 A1 | 2/2017 | Cork et al. | |
| 2017/0046486 A1 | 2/2017 | Cunningham | |
| 2017/0156830 A1 | 6/2017 | Wallace | |
| 2017/0165040 A1 | 6/2017 | Wolgin | |
| 2017/0231721 A1 | 8/2017 | Akeel et al. | |
| 2017/0239018 A1 | 8/2017 | Kim | |
| 2017/0281313 A1* | 10/2017 | Kim | A61B 1/00009 |
| 2017/0300207 A1 | 10/2017 | Wen et al. | |
| 2017/0340414 A1* | 11/2017 | Janzadeh | A61C 7/002 |
| 2017/0347953 A1 | 12/2017 | Suri et al. | |
| 2017/0364637 A1 | 12/2017 | Kshepakaran et al. | |
| 2017/0365025 A1 | 12/2017 | Pumphrey | |
| 2018/0014914 A1 | 1/2018 | Raghavan et al. | |
| 2018/0110589 A1* | 4/2018 | Gao | A61C 7/002 |
| 2018/0121875 A1 | 5/2018 | Satyanarayana Rao et al. | |
| 2018/0125610 A1* | 5/2018 | Carrier, Jr. | A61C 7/002 |
| 2018/0158544 A1* | 6/2018 | Trosien | G06Q 10/10 |
| 2018/0206940 A1 | 7/2018 | Kopelman et al. | |
| 2018/0228359 A1 | 8/2018 | Meyer et al. | |
| 2018/0263731 A1* | 9/2018 | Pokotilov | A61C 7/08 |
| 2018/0263732 A1* | 9/2018 | Pokotilov | A61C 7/08 |
| 2018/0263733 A1* | 9/2018 | Pokotilov | A61C 7/08 |
| 2018/0284727 A1* | 10/2018 | Cramer | G05B 19/4099 |
| 2018/0285801 A1* | 10/2018 | Alde | G06Q 10/06393 |
| 2018/0303580 A1* | 10/2018 | Salah | A61B 1/00016 |
| 2018/0353073 A1 | 12/2018 | Boucher et al. | |
| 2018/0368943 A1 | 12/2018 | Katzman et al. | |
| 2018/0368953 A1 | 12/2018 | Katzman et al. | |
| 2018/0368954 A1 | 12/2018 | Katzman et al. | |
| 2019/0013098 A1 | 1/2019 | Katzman et al. | |
| 2019/0019187 A1 | 1/2019 | Miller et al. | |
| 2019/0026598 A1 | 1/2019 | Salah et al. | |
| 2019/0038383 A1 | 2/2019 | Webber et al. | |
| 2019/0083219 A1 | 3/2019 | Sharer | |
| 2019/0175303 A1 | 6/2019 | Akopov et al. | |
| 2019/0223983 A1 | 7/2019 | Mah | |
| 2019/0252066 A1 | 8/2019 | Katzman et al. | |
| 2019/0333622 A1 | 10/2019 | Levin et al. | |
| 2019/0388188 A1 | 12/2019 | Kaza et al. | |
| 2020/0035353 A1 | 1/2020 | Katzman et al. | |
| 2020/0066391 A1 | 2/2020 | Sachdeva et al. | |
| 2020/0081413 A1 | 3/2020 | Georg et al. | |
| 2020/0113650 A1 | 4/2020 | Lemchen et al. | |
| 2020/0289238 A1 | 9/2020 | Levine | |
| 2020/0306011 A1 | 10/2020 | Chekhonin et al. | |
| 2020/0401976 A1 | 12/2020 | Nelson et al. | |
| 2021/0196434 A1 | 7/2021 | Cramer et al. | |

FOREIGN PATENT DOCUMENTS

| | | |
|---|---|---|
| CN | 201370648 | 12/2009 |
| CN | 204472650 | 7/2015 |
| CN | 106326681 | 1/2017 |
| EP | 0 278 626 | 8/1988 |
| EP | 2 425 734 | 3/2012 |
| EP | 3 595 572 | 1/2020 |
| GB | 0 338 822 | 11/1930 |
| JP | 09-038117 | 2/1997 |
| WO | WO-2006/118771 | 11/2006 |
| WO | WO-2009/085752 | 7/2009 |
| WO | WO-2015054746 A1 * | 4/2015 |
| WO | WO-2019/036677 | 2/2019 |

OTHER PUBLICATIONS

SmileCareClub promo video uploaded on Jun. 6, 2014 https://www.youtube.com/watch?v=h7x8BwWXUsk accessed Sep. 26, 2019 (Year: 2014).*

(56) References Cited

OTHER PUBLICATIONS

Smile Direct Club "smile evaluation kit instruction guide" https://s3.amazonaws.com/static.smiledirectclub.com/evaluation_kit_instructions_5_2_16_email.pdf access Sep. 26, 2019 (Year: 2016).*
Kravitz et al. (Teledentistry, Do-It-Yourself Orthodontics, and Remote Treatment Monitoring), Journal of Clinical Orthodontics Dec. 2016, vol. L, No. 12 pp. 718-726. (Year: 2016).*
"Speak Out Game—Ellen Show with Khloe Kardashian and Kevin Hart", uploaded to YouTube on Oct. 11, 2016, https://www.youtube.com/watch?v=RDILAiBFRLY.
International Search Report and Written Opinion for International Application No. PCT/US2018/038459, dated Oct. 22, 2018, 13 pages.
Smile Care Club, "Impression Kit", Jul. 21, 2014, available for retrieval at URL https://vimeo.com/wmvproductions/review/115725718/28854a7f49.
Smile Care Club, "Impressions—New Box", 2015,available for retrieval at URL https://vimeo.com/wmvproductions/review/137176701/d45be82d56.
Smile Care Club, "Impressions—Old Box", 2015,available for retrieval at URL https://vimeo.com/wmvproductions/review/137176599/0b8020929d.
Smile Care Club, "Impressions ReEdit", 2016,available for retrieval at URL https://vimeo.com/wmvproductions/review/168249998/0b75310374.
Smile Care Club, "Impressions", 2015,available for retrieval at URL https://vimeo.com/wmvproductions/review/136533463/1a8515abf5.
Smile Care Club, "Promo", 2014, available for retrieval at URL https://vimeo.com/wmvproductions/review/115725719/9c8235cdf2.
"203221—SmileCareClub" video, uploaded to YouTube on Jun. 10, 2014, https://www.youtube.com/watch?v=B43vT_1GnRO.
"Affordable Clear Braces—Smile Care Club" video, uploaded to YouTube on Mar. 30, 2015, https://www.youtube.com/watch?v=Qk-VhbH1RVM.
"Clear Braces . . . At Home??! Review—Before & After—Cost" video, uploaded to YouTube on Oct. 7, 2014, https://www.youtube.com/watch?v=9wrwhRTPjtk&t.
"Smile Care Club Unboxing, Review, Tutorial" video, uploaded to YouTube on May 1, 2015, https://www.youtube.com/watch?v=p7Y5fMRnJWE.
"Step 1!Working on my Smile . . . Smile Care Club" video, uploaded to YouTube on Jan. 4, 2015, https://www.youtube.com/watch?v=T_F3Xt4Og7w.
Kravitz et al., "Teledentistry, Do-It-Yourself Orthodontics, and Remove Treatment Monitoring", JCO, Dec. 2016, 9 pages.
"Invisalign Manufacturing Process English" video, uploaded to YouTube on Apr. 7, 2014, https://www.youtube.com/watch?v=vsR0_wTR2a8.
International Search Report in International Patent Application PCT/US2018/065133 dated Apr. 22, 2019 (2 pages).
Smile Care Club, "Making Dental Impressions" video, Mar. 2016, 74 pages of screenshots.
"Startup Story and Hiring Help from Smile Direct Club Founder Doug Hudson" on relode.com, published Aug. 11, 2015, available at https://www.relode.com/blog/startup-story-and-hiring-help-from-smilecareclub-founder-doug-hudson, 2 pages.
Albert et al., "Smile Care Club Review—My experience straightening my teeth with smile care", https://smilecareclubreview.wordpress.com/page/1/, relevant web posts published from Jan. 9, 2015-Mar. 4, 2015, accessed online Dec. 30, 2019 (Year: 2015), 8 pages.
Grindguard, "Howto use your dental impression kit", http://www.grindguardpm.com/support/how-to-use-your-dental-impression-kit/ Feb. 9, 2017, accessed online Jan. 3, 2020 (Year: 2017), 5 pages.
Hoabie et al., "Evaluation Kit in Mail", https://smilecareclub.wordpress.com/ Mar. 27, 2015, accessed online Jan. 2, 2020 (Year: 2015), 3 pages.
International Search Report and Written Opinion for International Application No. PCT/US2019/054958, dated Dec. 17, 2019, 8 pages.
ITero Element Orthodontic Patient Video, Uploaded to YouTube Apr. 4, 2016, https://www.youtube.com/watch?v=Ca69CuWqHCw.
Smile Direct Club Impression Guide (available online Nov. 14, 2016, https://www.sharperimage.com/si/pdf/manuals/203221.pdf accessed Sep. 3, 2019 (Year: 2016), 24 pages.
SwankySmiles advertisement from Feb. 8, 2019; located at www.swankysmiles.com (click on Watch the Video). (Year: 2019).
"203221—SmileCareClub" video, uploaded to YouTube on Jun. 10, 2014, https://www.youtube.com/watch?v=B43vT_1GnR0, 33 pages of screenshots.
"Affordable Clear Braces—Smile Care Club" video, uploaded to YouTube on Mar. 30, 2015, https://www.youtube.com/watch?v=Qk-VhbH1RVM, 97 pages of screenshots.
"Clear Braces . . . At Home??! Review—Before & After—Cost" video, uploaded to YouTube on Oct. 7, 2014, https://www.youtube.com/watch?v=9wrwhRTPjtk&t, 132 pages of screenshots.
"Smile Care Club Unboxing, Review, Tutorial" video, uploaded to YouTube on May 1, 2015, https://www.youtube.com/watch?v=p7Y5fMRnJWE, 126 pages of screenshots.
"Speak Out Game—Ellen Show with Khloe Kardashian and Kevin Hart", uploaded to YouTube on Oct. 11, 2016, https://www.youtube.com/watch?v=RDILAiBFRLY, 50 pages of screenshots.
"Step 1! working on my Smile . . . Smile Care Club" video, uploaded to YouTube on Jan. 4, 2015, https://www.youtube.com/watch?v=T_F3Xt4Og7w, 87 pages of screenshots.
Do It Yourself Dental Impression Kit, Apr. 30, 2016, 2 pages.
ITero Element Orthodontic Patient Video, Uploaded to YouTube Apr. 4, 2016, https://www.youtube.com/watch?v=Ca69CuWqHCw, 33 pages of screenshots.
Smile Care Club Review, URL: https://www.youtube.com/watch?v=jpAjhJqi6vc, Mar. 26, 2016, 260 pages of screenshots.
Smile Care Club, "Impression Kit", Jul. 21, 2014, available for retrieval at URL https://vimeo.com/wmvproductions/review/115725718/28854a7f49, 43 pages of screenshots.
Smile Care Club, "Impressions—New Box", 2015, available for retrieval at URL https://vimeo.com/wmvproductions/review/137176701/d45be82d56, 24 pages of screenshots.
Smile Care Club, "Impressions—Old Box", 2015, available for retrieval at URL https://vimeo.com/wmvproductions/review/137176599/0b8020929d, 21 pages of screenshots.
Smile Care Club, "Impressions ReEdit", 2016, available for retrieval at URL https://vimeo.com/wmvproductions/review/168249998/0b75310374, 32 pages of screenshots.
Smile Care Club, "Impressions", 2015, available for retrieval at URL https://vimeo.com/wmvproductions/review/136533463/1a8515abf5, 10 pages of screenshots.
Smile Care Club, "Promo", 2014, available for retrieval at URL https://vimeo.com/wmvproductions/review/115725719/9c8235cdf2, 25 pages of screenshots.
Summerfelt, Fred F., "Teledentisty-Assisted, Affiliated Practice for Dental Hygienists: An Innovative Oral Health Workforce Model", Journal of Dental Education, vol. 75, No. 6, Jun. 2011, pp. 733-742.
SwankySmiles advertisement from Feb. 8, 2019, located at www.swankysmiles.com, 5 pages of screenshots.
Buschang et al., "Comparative Time Efficiency of Aligner Therapy and ConventionaL Edgewise Braces", Angle Orthodontist, vol. 84, No. 3, 2014, 6 pages.
Mouthpiece Guy et al.: "Mouthpiece Guy vs. The Competition: Impression Kits", www.youtube.com/watch?v=tYOjMtYWQOQ&feature=youtu.be, Feb. 23, 2018, 20 pages of screenshots.
"Why I am Straightening My Teeth With SmileDirectClub", Gluesticks Blog, https://gluesticksblog.com/smiledirectclub-review/, Aug. 26, 2015, 19 pages.
Beers et al., "Computer-assisted treatment planning and analysis", Orthod Caniofacial Res 6(Suppl. 1), 2003; 117-125.
Bhambal et al., "Teledentistry: potentials unexplored!", J. Int Oral Health, Oct. 2010, vol. 2 (Issue 3).

(56) References Cited

OTHER PUBLICATIONS

Cooper et al.."Knowledge, attitudes, and confidence levels of dental hygiene students regarding teledentistry: A pilot study." The Internet Journal of Allied Health Sciences and Practice. Oct. 2007, vol. 5 No. 4.

Ercoli et al., "A comparative study of two different clear aligner systems", Progress in Orthodontics, 2014.

Fabels et al., "Interexaminer and intraexaminer reliabilites of 3-dimensional orthodontic digital setups", American Journal of Orthodontics and Dentofacial Orthopedics, Dec. 2014, vol. 146, Issue 6.

Forever Aligned Club, "Straight Teeth Forever", https://www.foreveralignedclub.com/straight-teeth-forever/, May 26, 2017, 3 pages.

Garino et al., "The iTero Intraoral Scanner in Invisalign Treatment: A Two-year Report", JCO, Feb. 2014.

Groth et al., "Three-Dimensional Printing Technology", JCO, 2014.

Hayashi et al., "Assessment of the accuracy and reliability of new 3-dimensional scanning devices", American Journal of Orthodontics and Dentofacial Orthopedics, Oct. 2013, vol. 144, Issue 4.

Jain et al., "Teledentistry: Upcoming Trend in Dentistry", J Adv Med Dent Scie 2013; 1(2): 112-115.

James Hunt; SmileDirectClub impression kit, https://www.youtube.com/watch?v=3u2KI9Mphey, uploaded Jan. 16, 2017, 19 pages of screenshots.

Jampani et al., "Applications of teledentistry: A literature review and update", Journal of Int Society of Preventive & Community Dentistry, Jul.-Dec. 2011; 1(2): 37-44.

Jones, Perry "The ITero optical scanner for use with Invisalign: A descriptive review", ineedce.com, Feb. 2012.

Kravitz et al., "Intraoral Digital Scanners", JCO, 2014, vol. 48, No. 6.

Kuncio, Daniel A. "Invisalign: Current guidelines for Effective Treatment", NY State Dental Journal, Mar. 2014.

Lau et al., "Computerised Imaging, Virtual Treatment Planning and Orthodontic Treatment of Dental Malocclusions Using the Invisalign Appliance", The Hong Kong Medical Diary, vol. 9, No. 10, Oct. 2004.

Lin et al., "3D CAD for Design of Invisible Tooth Aligner", proceedings of the 2005 IEEE Int Conf on Mechanics, Jul. 10-12, Taipei, Taiwan.

Martin et al., "Orthodonticscanners: what's available?", Journal of Orthodontics, vol. 000, 2014, 000-000.

Martorelli et al., "A comparison between customized clear and removable orthodontic appliances manufactured using RP and CNC techniques", Elsevier, Dental Materials 29 (2013).

Monika et al., "Teledentistry: An Overview." J Adv Med Dent Scie Res 2015;3(2):88-91.

Relode, "Startup Story and Hiring Help from SmileDirect Club Founder Doug Hudson"; https://www.relode.com/blog/startup-story-and-hiring-help-from-smiledirectclub-founder-doug-hudson, Aug. 11, 2015, 3 pages.

Shailee et al., "Teledentistry the future of dental practice", Indian J Dent Adv 2013; 5(2): 1195-1199.

Smiledirectclub; Frequent Questions https://web.archive.org/web/20170409175711/https://smiledirectclub.com/faq/ Apr. 9, 2017, 7 pages.

Snapcorrect, "What Does My Impression Evaluation Kit Include", https://support.snapcorrect.com/support/solutions/articles/32000019500-what-does-my-impression-evaluation-kit-include, Sep. 18, 2017 1 page.

Snapcorrect, "What Does the 'Return by' Sticker Date Mean", https://support.snapcorrect.com/support/solutions/articles/32000022084-what-does-the-return-by-sticker-date-mean, Feb. 5, 2018 1 page.

Snapcorrect, Snap Correct Impressions, https://www.youtube.com/watch?v=yywqlDSabew, uploaded Oct. 6, 2017, 6 pages of screenshots.

Snapcorrect, SnapCorrect Truly Invisible Aligners, https://youtube.com/watch?v=yywqlDSabew, uploaded Jul. 27, 2017, 8 pages of screenshots.

Summerfelt, Fred F."Teledentistry-Assisted, Affiliated Practice for Dental Hygienists: An Innovative Oral Health Workforce Model", Journal of Dental Education, 2011.

Szuhanek et al., "Application of Thermoplastic Materials in the Fabrication of Orthodontic Aligners", Materiale Plastice, 52, No. 3, 2015.

Szuhanek et al., "The Role of Digital Setup in the Orthodontic Treatment with Plastic Aligners", Materiale Plastice, 52, No. 4, 2015.

Taneva et al., "3D Scanning, Imaging, and Printing in Orthodontics", IntechOpen, 2015.

Thukral et al., "Invisalign: Invisible Orthodontic Treatment—A Review." J Adv Med Dent Scie Res 2015;3(5):S42-S44.

Candid Care Co., https:/www.candidco.com/how-it-works/, webpage printed as existed on Sep. 2, 2018, located using the Internet Archive WayBack Machine, 10 pages.

From Home Dental, Web page: https://web.archive.org/web/20161021220200/https://fromhomedental.com, Oct. 21, 2016, 4 Pages.

Decision on Appeal for U.S. Appl. No. 15/725,430, dated Sep. 23, 2021, 11 Pages.

Align Technology, Inc., "Invisalign Outcome Simulator 4.1," 2017, https://rdentlab.com/resources/clinical-information-guides/ (50 pages).

Align Technology, Inc., "iTero Element 2 and Flex Brochure for Orthodontists," 2018, https://global.itero.com/en-GB/training/literature (6 pages).

Dental Review, "New Itero Element 2 and iTero Element Flex," 2018, https://www.dentalreview.news/technology/24-dental-cad-cam-technology /3 25 5-new-itero-element-2-and-itero-element-flex (4 pages).

Federal Circuit Affirmance on the '522 patent Case No. 2021-1446 dated Aug. 17, 2021.

CVS Health and Smile Direct Club Team Up to Expand Access and Affordability to Innovative Solution for Achieving A Straighter Smile (Apr. 25, 2019). PR Newswire Retrieved from https://dialog.proquest.com/professional/docview/2213815454?accountid=131444 (Year: 2019).

Kravitz et al. (Teledentistry, Do-It-Yourself Orthodontics, and Remote Treatment Monitoring—JCO/Dec. 2016—vol. L No. 12) (Year: 2016).

Nelson, Brandy et al. (Why I am Straightening My Teeth with SmileDirectClub—Gluesticks Blog—https://gluesticksblog.com/smiledirectclub-review/) (Year: 2015).

\* cited by examiner

MY ACCOUNT
WELCOME BACK, MAGGIE!

USER:

YOUR NEXT STEP:

WHERE'S YOUR CAMERA? WITHOUT PHOTOS OF YOUR TEETH YOUR SMILE IS IN LIMBO. WE CAN'T BUILD YOUR CUSTOM TREATMENT PLAN AND WE CAN'T MOVE FORWARD. GET THAT CAMERA AND LET'S GET THOSE PHOTOS UPLOADED. IF YOU'RE HAVING ISSUES UPLOADING YOUR PHOTOS YOU CAN EMAIL THEM TO SUPPORT@COMPANY.COM

YOU'RE SCHEDULED FOR AN APPOINTMENT AT THE DENTIST AT 11:00 AM CDT, TUESDAY, MARCH 14, 2017.

THANK YOU FOR BOOKING YOUR SCAN. WE ARE LOCATED AT ADDRESS.

HELPFUL HINTS:
- YOU CAN ALWAYS CALL US AT 555-555-5555 IF YOU NEED HELP WITH DIRECTIONS.
- MAKE SURE TO BRUSH YOUR TEETH BEFORE YOUR APPOINTMENT.
  - ARRIVE A LITTLE EARLY FOR PARKING
  - THE SMILESHOP IS LOCATED INSIDE THE BUILDING.

MAGGIE

COMPLETE YOUR PHOTO ASSESSMENT — 1602

FEEL FREE TO CALL US AT 555-555-5555 FOR QUESTIONS REGARDING SCHEDULING.

*FIG. 27*

YOU'RE ON YOUR WAY TO A BETTER SMILE.

THE BELOW INFORMATION WILL HELP OUR DENTAL PROFESSIONALS EVALUATE YOUR SMILE AND CREATE YOUR CUSTOM TREATMENT PLAN.

I HAVE A BONDED RETAINER

| YES | NO |
|---|---|

I HAVE BRIDGEWORK

| YES | NO |
|---|---|

1800

1802

I HAVE CROWNS

| YES | NO |

I HAVE AN IMPACTED TOOTH

| YES | NO |

I HAVE AN IMPLANT

| YES | NO |

I HAVE PRIMARY (BABY) TEETH

| YES | NO |

I HAVE VENEERS

| YES | NO |

*FIG. 29B*

TREATMENT OPTIONS:

✓ ------
BOTH
UPPER
LOWER

| | | |
|---|---|---|
| I HAVE BRIDGEWORK: | ○ YES | ○ NO |
| I HAVE CROWNS: | ○ YES | ○ NO |
| I HAVE AN IMPACTED TOOTH: | ○ YES | ○ NO |
| I HAVE AN IMPLANT: | ○ YES | ○ NO |
| I HAVE PRIMARY (BABY) TEETH: | ○ YES | ○ NO |
| I HAVE VENEERS: | ○ YES | ○ NO |
| DO YOU FEEL PAIN IN ANY OF YOUR TEETH?: | ○ YES | ○ NO |
| DO YOU CURRENTLY HAVE ANY HEAD, NECK, OR JAW INJURIES?: | ○ YES | ○ NO |
| DO YOU HAVE ANY SORES OR LUMPS IN OR NEAR YOUR MOUTH?: | ○ YES | ○ NO |
| DO YOU CURRENTLY EXPERIENCE: JAW CLICKING, PAIN, DIFFICULTY OPENING AND/OR CLOSING OR DIFFICULTY CHEWING?: | ○ YES | ○ NO |
| HAVE YOU NOTICED ANY LOOSENING OF YOUR TEETH OR DO YOU HAVE UNTREATED PERIODONTAL DISEASE?: | ○ YES | ○ NO |

| | | |
|---|---|---|
| DO YOU HAVE ANY KNOWN ALLERGIES TO ANY DENTAL MATERIALS?: | ○ YES | ○ NO |
| I HAVE A HISTORY OF IV BISPHOSPHONATE TREATMENT.: | ○ YES | ○ NO |
| I AM CURRENTLY ON ACUTE CORTICOSTEROIDS OR IN IMMUNOSUPPRESSION, CHEMOTHERAPY, OR RADIATION OF HEAD/NECK.: | ○ YES | ○ NO |
| I HAVE HAD A BONE MARROW TRANSPLANT OR TREATMENT OF HEMATOLOGICAL MALIGNANCIES (BLOOD CANCERS) WITHIN THE PAST 2 YEARS.: | ○ YES | ○ NO |

CHIEF COMPLAINT:

[ SUBMIT ]  [ CANCEL ]

HISTORY

| QUESTION | ANSWER |
|---|---|
| ALLOW REFERRAL | NONE |
| HAS BONDED RETAINER | NO |
| HAS BRIDGEWORK | NO |
| HAS CROWNS | NO |
| HAS IMPACTED TOOTH | NO |
| HAS IMPLANT | NO |
| HAS PRIMARY TOOTH | NO |
| HAS VENEERS | NO |

EDIT HISTORY

CASE

CONTACT AS NEEDED

| | |
|---|---|
| CASE # | CFA5D9990BD4D2 |
| CASE ID | 116640 |
| PATIENT | *****<br>DOB: *****<br>MRN: M269FA0A8B9A23 |
| CUSTOMER | ***** |
| SHIPPING ADDRESS | |
| PHONE | 410-212-7736 (SHIPPING)<br>410-212-7736 (OTHER) |
| GENDER | UNKNOWN |
| TRAY SIZE | MEDIUM |
| STATUS/REASON | SETUP READY FOR REVIEW |
| CHIEF COMPLAINT | CUSTOMER IS CONCERNED WITH CLOSING THE SPACING ON BOTH UPPER AND LOWER TEETH. WANTS TO BE ABLE SMILE IN PICTURE. ALSO, CUSTOMER SINGS AND DOESN'T LIKE TO OPEN HIS MOUTH DUE TO THE SPACING OF HIS TEETH. |

PRE-AUTH:   SCAN STORE SMILE PAY
VISA [ ] EXP [ ]
☐ CASE PRIORITY MESSAGE
NO PRIORITY MESSAGE FOR THIS CASE

[VIEW PHOTO ASSESSMENT] [ADD PATIENT INSURANCE] [VIEW EMAILS]

[SUBMIT]

*FIG. 34B*

| JOURNAL | | |
|---|---|---|
| DATE | NOTE | AUDIENCE |
| MONDAY, MARCH 6, 2017 12:28 P.M. UTC | E-MAILED *** TO REVIEW THE TP BY: **@* | STAFF |
| FRIDAY, MARCH 3, 2017 12:28 P.M. UTC | FRENECTOMY CONSENT: EMAIL_VIEWED BY:ECHOSIGN | |
| FRIDAY, MARCH 3, 2017 12:28 P.M. UTC | FRENECTOMY CONSENT: EMAIL_VIEWED BY:ECHOSIGN | |
| THURSDAY, MARCH 2, 2017 10:15 P.M. UTC | STATUS CHANGED FROM SETUP IN PROGRESS TO SETUP READY FOR REVIEW BY: ****@* | ALL |
| THURSDAY, MARCH 2, 2017 10:14 P.M. UTC | NATHAN CRUTCH NEW SMILE PLAN REVISION UPLOADED BY:*@* | |
| THURSDAY, MARCH 2, 2017 4:07 P.M. UTC | TREATMENT PLAN REVISION REQUESTED BY: ****** | |
| THURSDAY, MARCH 2, 2017 4:07 P.M. UTC | STATUS CHANGED FROM SETUP READY FOR REVIEW TO SETUP IN PROGRESS BY: ****** | |
| THURSDAY, MARCH 2, 2017 3:35 P.M. UTC | STATUS CHANGED FROM SECOND OPINION (TREATMENT PLAN REJECTED) TO SETUP READY FOR REVIEW BY: ****@* | |
| THURSDAY, MARCH 2, 2017 3:35 P.M. UTC | CASE SUBMITTED TO *** BY: @* | |
| THURSDAY, MARCH 2, 2017 3:35 P.M. UTC | FRENECTOMY CONSENT: SIGNATURE_REQUESTED BY:ECHOSIGN | |
| THURSDAY, MARCH 2, 2017 3:35 P.M. UTC | FRENECTOMY CONSENT: CREATED BY:ECHOSIGN | |
| THURSDAY, MARCH 2, 2017 2:36 P.M. UTC | TREATMENT PLAN REJECTED BY: ****** | ALL |
| THURSDAY, MARCH 2, 2017 2:36 P.M. UTC | STATUS CHANGED FROM SETUP READY FOR REVIEW TO SECOND OPINION (TREATMENT PLAN REJECTED) BY: ****** | |
| THURSDAY, MARCH 2, 2017 12:31 P.M. UTC | HYGIENIST RECOMMENDATION:APPROVE (WAITING ON OFFICAL RESPONSE FROM DOCTOR) BY:***@* | ALL |
| THURSDAY, MARCH 2, 2017 2:45 A.M. UTC | STATUS CHANGED FROM SETUP IN PROGRESS TO SETUP READY FOR REVIEW BY: ****@* | |

SUBMIT JOURNAL ENTRY
NOTES
AUDIENCE
STAFF
SUBMIT

ALL CASE MESSAGES — 2316

TREATMENT PLAN REVISION 1
CREATED BY ****** ON 03-12-17 2:45AM

| | | NASHVILLE, TN 37219 |
|---|---|---|
| FROM: | ****** | |
| TO: | PROV | |
| DATE: | 03-02-17 10:15PM | |
| LAB ID: | CA734723 | |
| CASE: | CFA5D9990BD4D2 | |
| PATIENT: | ****** | |
| MRN: | M269FA0A8B9A23 | |

YOUR REVISION REQUEST HAS BEEN COMPLETED, PLEASE REVIEW THE NEW TREATMENT PLAN.

[REPLY]

TREATMENT PLAN REVISION 1
CREATED BY ****** ON 03-12-17 2:45AM

NASHVILLE, TN 37219

| FROM: | ****** |
|---|---|
| TO: | SUPPORT |
| DATE: | 03-02-17 2:36PM |
| LAB ID: | CA734723 |
| CASE: | CFA5D9990BD4D2 |
| PATIENT: | ****** |
| MRN: | M269FA0A8B9A23 |

TREATMENT PLAN REJECTED.
PERIODONTAL CLEARANCE
NEED PERIO CLEARANCE MUST HAVE CLEANING PRIOR TO ALIGNER TREATMENT

| FROM: | ****** |
|---|---|
| TO: | SUPPORT |
| DATE: | 03-02-17 2:36PM |
| LAB ID: | CA734723 |
| CASE: | CFA5D9990BD4D2 |
| PATIENT: | ****** |
| MRN: | M269FA0A8B9A23 |

NEED PERIO CLEARANCE MUST HAVE CLEANING PRIOR TO ALIGNER TREATMENT.

[REPLY]

| FROM: | ****** |
|---|---|
| TO: | PROV |
| DATE: | 03-02-17 2:41PM |

PLEASE NOTICE THAT SPACE WAS LEFT DISTAL FROM UPPER LATERALS, IN ORDER TO AVOID AFFECTING CANINE RELATIONSHIP.

[REPLY]

| FILES | | | |
|---|---|---|---|
| NAME | KIND | UPLOAD DATE | UPLOADED BY |
| NEW SMILE PLAN REVISION | TREATMENTPLAN | 03-02-2017 10:14PM(UTC) | *********** |
| NEW SMILE PLAN | TREATMENTPLAN | 03-02-2017 2:44AM(UTC) | *********** |
| LOWER | 3DSCAN | 03-01-2017 2:16AM(UTC) | ********** |
| UPPER | 3DSCAN | 03-01-2017 2:15AM(UTC) | ********** |
| BEFORE | OTHER | 02-28-2017 10:22PM(UTC) | ********* |
| | PURCHCONSENT | 02-28-2017 10:22PM(UTC) | ********* |
| | HXCONSENT | 02-28-2017 10:15PM(UTC) | ********* |

CASE DOCUMENTS

FRENECTOMY CONSENT
(03-02-2017 3:35PM)

VIEW DOCUMENTS
REMINDER  REMOVE

*FIG. 34F*

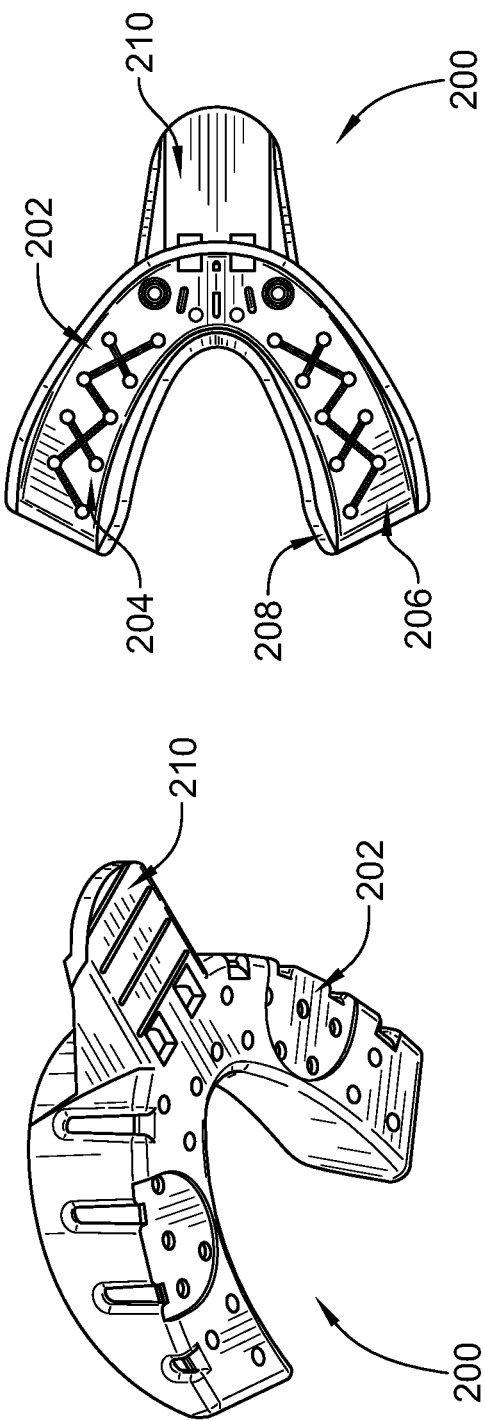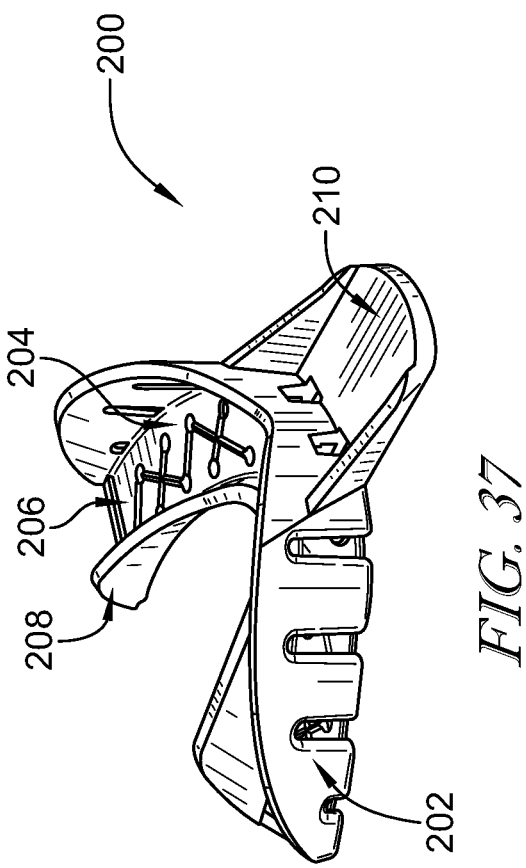

| FILES | | | | |
|---|---|---|---|---|
| NAME | KIND | UPLOAD DATE | UPLOADED BY | |
| 90 DAY PROGRESS NOTE | 90DAYNOTE | 06-14-2017 5:40 PM (UTC) | ERMINIA SARLEY | |
| 90 DAY PROGRESS PHOTO | 90DAYPHOTO | 06-14-2017 5:39 PM (UTC) | ERMINIA SARLEY | |
| UPPER | 3DSCAN | 02-18-2017 4:54 PM (UTC) | F792D1AFBO@399DCE4753.COM | |
| LOWER | 3DSCAN | 02-18-2017 4:53 PM (UTC) | F792D1AFBO@399DCE4753.COM | |
| LOWER | 3DSCAN | 02-20-2017 3:54 PM (UTC) | F792D1AFBO@399DCE4753.COM | |
| UPPER | 3DSCAN | 02-20-2017 3:57 PM (UTC) | F792D1AFBO@399DCE4753.COM | |

| 90 DAY REVIEW | | |
|---|---|---|
| SEND 90 DAY REVIEW TO PROVIDER PORTAL | | |
| DATE SENT | SENT BY | STATUS |
| WEDNESDAY, JUNE 14, 2017 5:41 P.M. UTC | *@* | READY |

*FIG. 38D*

ARRANGEMENTS FOR REMOTE ORTHODONTIC TREATMENT

CROSS-REFERENCE TO RELATED APPLICATIONS

This application is a divisional application of U.S. patent application Ser. No. 15/725,430, filed Oct. 5, 2017, which claims priority to U.S. Provisional Patent Application No. 62/522,847, filed Jun. 21, 2017, the contents of each of which are incorporated herein by reference in their entirety.

TECHNICAL FIELD

The present disclosure relates to a dental impression kit and, more specifically, to a system and method for application of a dental impression kit at home. The present disclosure also relates to an application server for remote orthodontic treatment and methods therefor.

BACKGROUND

A dental impression provides a negative imprint of the teeth and tissues in the mouth. The negative impression may then be utilized to produce a physical or digital reproduction of the teeth, e.g. dentures and orthodontics. Generally, a dental tray having a viscous, thixotropic impression material therein is fit over the dental arches of the patient. The impression material sets to a solid leaving an imprint of the structures in the mouth. When removed from the mouth, the impression provides a detailed and stable negative of the teeth. Optionally, the impression is processed using digital scanning methods to create the digital negative of the teeth.

Traditionally, dental impressions are made in a dental office and require significant time. The impressions are then delivered to an outside vendor that utilizes the impression to form a positive model of the teeth. If the dental impression includes any errors, e.g. incomplete impression of the teeth and tissues, the patient may be required to return to the dental office to have a second impression made.

As an alternative method to traditional orthodontic procedures, in less severe cases, dental impressions may be made with an at-home dental impression kit. Such kits are generally prescribed by a dental professional to qualified customers, e.g. in a dental office. The user may then administer the contents of the dental impression kit at home. After completing the dental impressions, the kit is returned to the dental professional. Some at-home kits may be difficult to administer and/or may result in poor quality dental impressions.

SUMMARY

According to one aspect of the disclosure, a method of administering the contents of a dental impression kit includes sending a dental impression kit to a user. The dental impression kit includes a container having a top layer containing an initial dental assembly and a bottom layer containing a redundant dental assembly. The bottom layer is positioned below the top layer. The dental impression kit has instructions positioned above the top layer. The instructions include an initial instruction and a redundant instruction. The method also includes instructing the user to administer the initial dental assembly according to the initial instruction. The method also includes instructing the user to remove the top layer from the container to expose the bottom layer. The method also includes instructing the user to administer the redundant dental assembly according to the redundant instruction.

In some embodiments, the initial dental assembly includes an initial dental tray, an initial base putty, and an initial catalyst putty. The method also includes instructing the user to mix the initial base putty of the initial dental assembly with the initial catalyst putty of the initial dental assembly to form an initial putty mixture. The method also includes instructing the user to position the initial putty mixture in the initial dental tray of the initial dental assembly. The method also includes instructing the user to position the initial dental tray of the initial dental assembly in the user's mouth to create an initial dental impression in the initial putty mixture. The method also includes instructing the user to mix the initial base putty of the initial dental assembly with the initial catalyst putty of the initial dental assembly for approximately 20 seconds. The method also includes instructing the user to position the initial putty mixture in the initial dental tray of the initial dental assembly within a time frame of approximately less than or equal to one minute from the time the initial base putty and the initial catalyst putty are opened. The method also includes instructing the user to retain the initial dental tray of the initial dental assembly within the user's mouth for a time period of approximately 2.5 to 3.5 minutes to create the initial dental impression.

In some embodiments, the redundant dental assembly includes a redundant dental tray, a redundant base putty, and a redundant catalyst putty. The method also includes instructing the user to mix the redundant base putty of the redundant dental assembly with the redundant catalyst putty of the redundant dental assembly to form a redundant putty mixture. The method also includes instructing the user to position the redundant putty mixture in the redundant dental tray of the redundant dental assembly. The method also includes instructing the user to position the redundant dental tray of the redundant dental assembly in a user's mouth to create a redundant dental impression in the redundant putty mixture. The method also includes instructing the user to mix the redundant base putty of the redundant dental assembly with the redundant catalyst putty of the redundant dental assembly for approximately 20 seconds. The method also includes instructing the user to position the redundant putty mixture in the redundant dental tray of the redundant dental assembly within a time frame of approximately less than or equal to one minute from the time the redundant base putty and the redundant catalyst putty are opened. The method also includes instructing the user to retain the redundant dental tray of the redundant dental assembly within the user's mouth for a time period of approximately 2.5 to 3.5 minutes to create the redundant dental impression.

The method also includes instructing the user to place the initial dental impression and the redundant dental impression in the container. The method also includes instructing the user to deliver the container having the initial dental impression and the redundant dental impression to a vendor.

In some embodiments, the kit includes a dental appliance positioned below the bottom layer and the instructions include an appliance instruction. The method also includes instructing the user to remove the bottom layer from the container to expose the dental appliance. The method also includes instructing the user to utilize the dental appliance according to the appliance instruction. The method also includes instructing the user to position the dental appliance within a user's mouth. The method also includes instructing the user to take photos of the user's mouth with the dental appliance positioned within the user's mouth. The method also includes instructing the user to upload the photos of the user's mouth to a web portal of a vendor.

In some embodiments, instructing the user to remove the top layer includes instructing the user to fold the top layer about at least one foldline connecting the top layer to the bottom layer.

According to another aspect of the disclosure, a dental impression kit includes a container having a top layer containing an initial dental assembly and a bottom layer containing a redundant dental assembly. The bottom layer is positioned below the top layer. The dental impression kit also includes instructions positioned above the top layer. The instructions instruct a user to administer the initial dental assembly according to an initial instruction. The instructions also instruct a user to remove the top layer from the container to expose the bottom layer. The instructions also instruct a user to administer the redundant dental assembly according to a redundant instruction.

In some embodiments, the initial dental assembly includes an initial dental tray, an initial base putty, and an initial catalyst putty. The instructions also instruct a user to mix the initial base putty of the initial dental assembly with the initial catalyst putty of the initial dental assembly to form an initial putty mixture. The instructions also instruct a user to position the initial putty mixture in the initial dental tray of the initial dental assembly. The instructions also instruct a user to position the initial dental tray of the initial dental assembly in the user's mouth to create an initial dental impression in the initial putty mixture. The instructions also instruct a user to mix the initial base putty of the initial dental assembly with the initial catalyst putty of the initial dental assembly for approximately 20 seconds. The instructions also instruct a user to position the initial putty mixture in the initial dental tray of the initial dental assembly within a time frame of approximately less than or equal to one minute from the time the initial base putty and the initial catalyst putty are opened. The instructions also instruct a user to retain the initial dental tray of the initial dental assembly within the user's mouth for a time period of approximately 2.5 to 3.5 minutes to create the initial dental impression.

In some embodiments, the redundant dental assembly includes a redundant dental tray, a redundant base putty, and a redundant catalyst putty. The instructions also instruct a user to mix the redundant base putty of the redundant dental assembly with the redundant catalyst putty of the redundant dental assembly to form a redundant putty mixture. The instructions also instruct a user to position the redundant putty mixture in the redundant dental tray of the redundant dental assembly. The instructions also instruct a user to position the redundant dental tray of the redundant dental assembly in a user's mouth to create a redundant dental impression in the redundant putty mixture. The instructions also instruct a user to mix the redundant base putty of the redundant dental assembly with the redundant catalyst putty of the redundant dental assembly for approximately 20 seconds. The instructions also instruct a user to position the redundant putty mixture in the redundant dental tray of the redundant dental assembly within a time frame of approximately less than or equal to one minute from the time the redundant base putty and the redundant catalyst putty are opened. The instructions also instruct a user to retain the redundant dental tray of the redundant dental assembly within the user's mouth for a time period of approximately 2.5 to 3.5 minutes to create the redundant dental impression.

In some embodiments, the instructions also instruct a user to place the initial dental impression and the redundant dental impression in the container. The instructions also instruct a user to deliver the container having the initial dental impression and the redundant dental impression to a vendor.

In some embodiments, the kit includes a dental appliance positioned below the bottom layer and the instructions include an appliance instruction. The instructions also instruct a user to remove the bottom layer from the container to expose the dental appliance. The instructions also instruct a user to utilize the dental appliance according to the appliance instruction. The instructions also instruct a user to position the dental appliance within a user's mouth. The instructions also instruct a user to take photos of the user's mouth with the dental appliance positioned within the user's mouth. The instructions also instruct a user to upload the photos of the user's mouth to a web portal of a vendor.

In some embodiments, the instructions also instruct a user to fold the top layer about at least one foldline connecting the top layer to the bottom layer to remove the top layer.

According to yet another aspect of the disclosure, a dental impression kit includes a container. A top layer is positioned within the container and contains an initial dental assembly. A bottom layer is positioned within the container and contains a redundant dental assembly. The bottom layer positioned below the top layer. The top layer is removable to expose the bottom layer. Instructions are positioned above the top layer. The instructions include an initial instruction and a redundant instruction. The initial dental assembly is administered according to the initial instruction. The redundant dental assembly is administered according to the redundant instruction.

In some embodiments, the kit includes an insert that is foldable to form the top layer and the bottom layer. In some embodiments, the top layer is connected to the bottom layer by at least one foldline. In some embodiments, the top layer is removable from the container by articulating the top layer about the foldline.

In some embodiments, the initial dental assembly includes an initial dental tray, an initial base putty, and an initial catalyst putty. The initial base putty of the initial dental assembly is configured to be mixed with the initial catalyst putty of the initial dental assembly to form an initial putty mixture. The initial putty mixture is configured to be positioned in the initial dental tray of the initial dental assembly to form an initial dental impression. In some embodiments, the initial catalyst putty comprises polyvinyl siloxane. In some embodiments, the initial base putty of the initial dental assembly and the initial catalyst putty of the initial dental assembly are configured to be mixed for approximately 20 seconds. In some embodiments, the initial putty mixture is configured to be positioned in the initial dental tray of the initial dental assembly within a time frame of approximately less than or equal to one minute from the time the initial base putty and the initial catalyst putty are opened. In some embodiments, the initial putty mixture is configured to set within a time period of approximately 2.5 to 3.5 minutes to create the initial dental impression.

In some embodiments, the redundant dental assembly includes a redundant dental tray, a redundant base putty, and a redundant catalyst putty. The redundant base putty of the redundant dental assembly is configured to be mixed with the redundant catalyst putty of the redundant dental assembly to form a redundant putty mixture. The redundant putty mixture is configured to be positioned in the dental tray of the redundant dental assembly to form a redundant dental impression. In some embodiments, the redundant catalyst putty comprises polyvinyl siloxane. In some embodiments, the redundant base putty of the redundant dental assembly with the redundant catalyst putty of the redundant dental assembly are configured to be mixed for approximately 20 seconds. In some embodiments, the redundant putty mixture is configured to be positioned in the dental tray of the redundant dental assembly within a time frame of approximately less than or equal to one minute from the time the redundant base putty and the redundant catalyst putty are opened. In some embodiments, the redundant putty mixture is configured to set within a time period of approximately 2.5 to 3.5 minutes to create the redundant dental impression.

In some embodiments, the initial dental impression and the redundant dental impression are configured to be positioned in the container, such that the container having the initial dental impression and the redundant dental impression is deliverable to a vendor.

In some embodiments, a dental appliance positioned below the bottom layer and the instructions include an appliance instruction. The dental appliance is utilized according to the appliance instruction. In some embodiments, the dental appliance is utilized to take photos of the user's mouth.

According to another aspect of the disclosure, an application server for remote orthodontic treatment includes a data repository, a staff portal, and a provider portal. The data repository is to receive a plurality of images, wherein the plurality of images represent teeth of a user. The staff portal is to provide the plurality of images to a first computing device. The staff portal is further to receive a first approval from the first computing device in response to provision of the plurality of images to the first computing device. The first approval is indicative of a second user approving the plurality of images for assessment by a provider. The provider portal is to provide the plurality of images to a second computing device in response to receipt of the first approval. The provider portal is further to receive a second approval from the second computing device in response to provision of the plurality of images to the second computing device, wherein the second approval is indicative of the provider assessing fitness of the user for treatment.

In some embodiments, the application server includes a user portal to receive a dental history questionnaire response from a third computing device, wherein the third computing device is associated with the user. To provide the plurality of images to the first computing device further includes to provide the dental history questionnaire response to the first computing device, and to provide the plurality of images to the second computing device further includes to provide the dental history questionnaire response to the second computing device. In some embodiments, the application server includes a user portal to receive the plurality of images from a third computing device, wherein the third computing device is associated with the user. In some embodiments, the plurality of images includes an upper, open view image, a lower, open view image, and a straight-on, closed view image. In some embodiments, the plurality of images may include an upper, closed view image, a left-side, closed view image, a right-side, closed view image, and/or a straight-on, full smile image. In some embodiments, to receive the plurality of images includes to receive 3D optical scan data.

In some embodiments, the data repository is further to receive a treatment plan for the user in response to receipt of the second approval. The treatment plan includes a sequence of three-dimensional models indicative of the teeth of the user. The treatment plan may be indicative of lower teeth of the user, upper teeth of the user, or both the upper and the lower teeth of the user. The provider portal is further to provide the treatment plan to the second computing device, and receive a third approval from the second computing device in response to provision of the treatment plan to the second computing device. The third approval is indicative of the provider approving the treatment plan. The application server further includes a user portal to provide a visualization of the treatment plan to a third computing device in response to receipt of the third approval, wherein the third computing device is associated with the user. In some embodiments, the application server further includes an optimizer to optimize the sequence of three-dimensional models to generate an optimized sequence of three-dimensional models. To provide the visualization to the third computing device includes to provide the optimized sequence of three-dimensional models to the third computing device.

According to another aspect of the disclosure, a method for remote orthodontic treatment includes receiving, by an application server, a plurality of images, wherein the plurality of images represent teeth of a user; providing, by the application server, the plurality of images to a first computing device; receiving, by the application server, a first approval from the first computing device in response to providing the plurality of images, wherein the first approval is indicative of a second user approving the plurality of images for assessment by a provider; providing, by the application server, the plurality of images to a second computing device in response to receiving the first approval; and receiving, by the application server, a second approval from the second computing device in response to providing the plurality of images, wherein the second approval is indicative of the provider assessing fitness of the user for treatment.

In some embodiments, the method further includes receiving, by the application server, a dental history questionnaire response from a third computing device. Providing the plurality of images to the first computing device further includes providing the dental history questionnaire response to the first computing device. Providing the plurality of images to the second computing device further includes providing the dental history questionnaire response to the second computing device. In some embodiments, receiving the plurality of images includes receiving the plurality of images from a third computing device, wherein the third computing device is associated with the user. In some embodiments, the plurality of images includes an upper, open view image, a lower, open view image, and a straight-on, closed view image. In some embodiments, receiving the plurality of images includes receiving 3D optical scan data.

In some embodiments, the method further includes receiving, by the application server, a treatment plan for the user in response to receiving the second approval, wherein the treatment plan includes a sequence of three-dimensional models indicative of the teeth of the user; providing, by the application server, the treatment plan to the second computing device; receiving, by the application server, a third approval from the second computing device in response to providing the treatment plan to the second computing device, wherein the third approval is indicative of the provider approving the treatment plan; and providing, by the application server, a visualization of the treatment plan to a third computing device in response to receiving the third approval, wherein the third computing device is associated with the user. In some embodiments, the method further includes optimizing, by the application server, the sequence of three-dimensional models to generate an optimized sequence of three-dimensional models; wherein providing the visualization to the third computing device includes providing the optimized sequence of three-dimensional models to the third computing device.

According to another aspect of the disclosure, one or more machine readable storage media include a plurality of instructions stored thereon that in response to being executed result in a computing device receiving a plurality of images, wherein the plurality of images represent teeth of a user; providing the plurality of images to a first computing device; receiving a first approval from the first computing device in response to providing the plurality of images, wherein the first approval is indicative of a second user approving the plurality of images for assessment by a provider; providing the plurality of images to a second computing device in response to receiving the first approval; and receiving a second approval from the second computing device in response to providing the plurality of images, wherein the second approval is indicative of the provider assessing fitness of the user for treatment.

In some embodiments, the one or more machine readable storage media further include a plurality of instructions stored thereon that in response to being executed result in the computing device receiving a dental history questionnaire response from a third computing device. Providing the plurality of images to the first computing device further includes providing the dental history questionnaire response to the first computing device. Providing the plurality of images to the second computing device further includes providing the dental history questionnaire response to the second computing device. In some embodiments, receiving the plurality of images includes receiving the plurality of images from a third computing device, wherein the third computing device is associated with the user. In some embodiments, the plurality of images includes an upper, open view image, a lower, open view image, and a straight-on, closed view image. In some embodiments, receiving the plurality of images includes receiving 3D optical scan data.

In some embodiments, the one or more machine readable storage media further include a plurality of instructions stored thereon that in response to being executed result in the computing device receiving a treatment plan for the user in response to receiving the second approval, wherein the treatment plan includes a sequence of three-dimensional models indicative of the teeth of the user; providing the treatment plan to the second computing device; receiving a third approval from the second computing device in response to providing the treatment plan to the second computing device, wherein the third approval is indicative of the provider approving the treatment plan; and providing a visualization of the treatment plan to a third computing device in response to receiving the third approval, wherein the third computing device is associated with the user. In some embodiments, the one or more machine readable storage media further include a plurality of instructions stored thereon that in response to being executed result in the computing device optimizing the sequence of three-dimensional models to generate an optimized sequence of three-dimensional models; wherein providing the visualization to the third computing device includes providing the optimized sequence of three-dimensional models to the third computing device.

BRIEF DESCRIPTION OF THE DRAWINGS

The foregoing and other features of the various embodiments of the methods and apparatuses described herein will become more apparent from the following detailed description and the accompanying drawings in which:

FIG. 27 is a screen shot of an account status user interface that may be generated by the application server of FIGS. 22-23;

FIGS. 29A-29E are screen shots of a dental history questionnaire user interface that may be generated by the application server of FIGS. 22-23;

FIGS. 30A and 30B are screen shots of a photo assessment user interface that may be generated by the application server of FIGS. 22-23;

FIGS. 31A-31E are screen shots of a provider portal user interface that may be generated by the application server of FIGS. 22-23;

FIGS. 34A-34F are screen shots of a staff portal user interface that may be generated by the application server of FIGS. 22-23;

FIGS. 35-37 are views of another embodiment of a dental tray; and

FIGS. 38A-38D are screen shots of a check-in process user interface that may be generated by the application server of FIGS. 22-23.

DETAILED DESCRIPTION OF THE DRAWINGS

Figure 1:
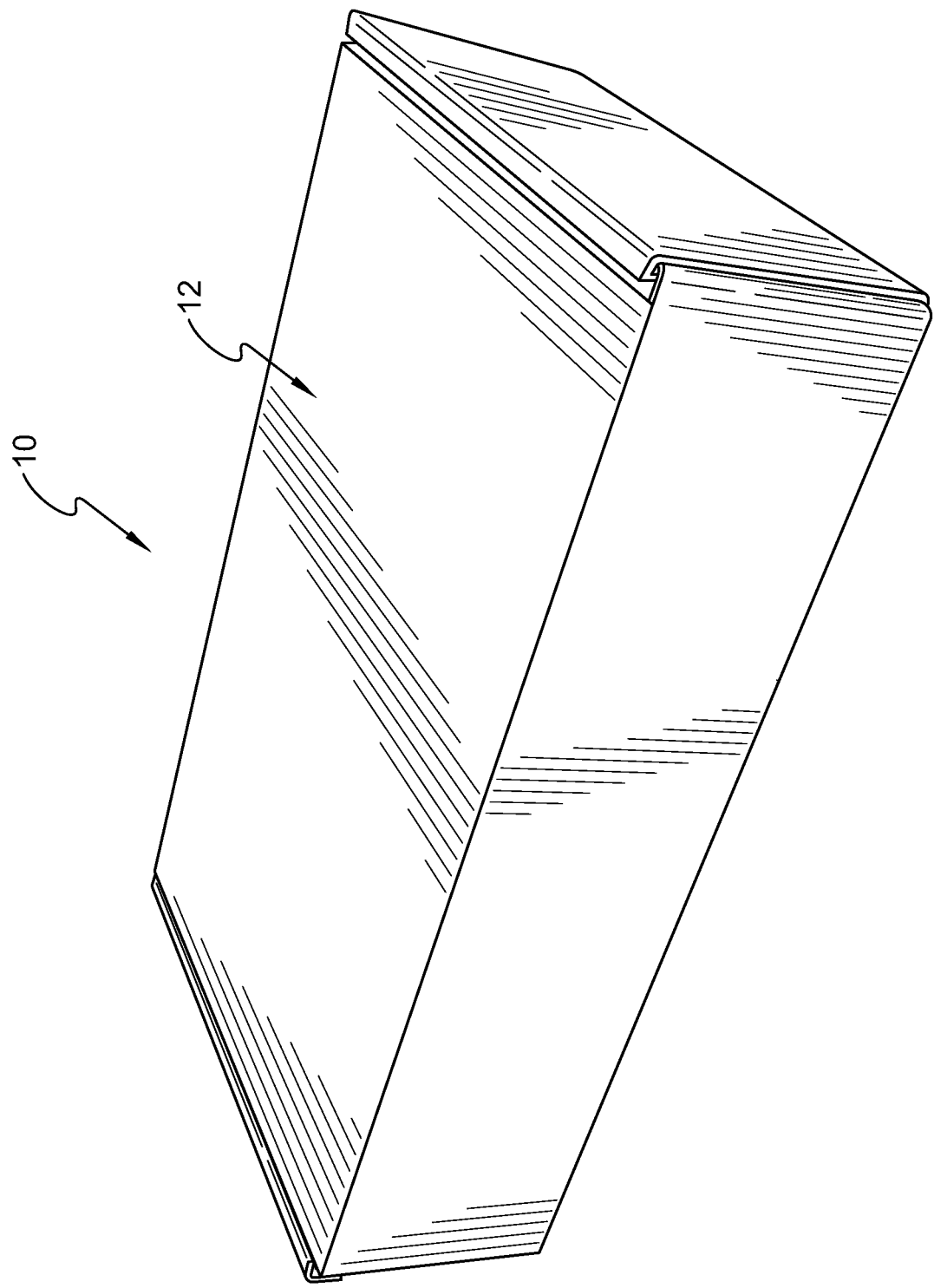
FIG. 1 is a perspective view of a container that contains the contents of a dental impression kit.

While the concepts of the present disclosure are susceptible to various modifications and alternative forms, specific exemplary embodiments thereof have been illustrated by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, a dental impression kit 10 is shown having dental assemblies (discussed in more detail below) therein. The dental impression kit 10 may be ordered by a customer and shipped in a container or box 12, shown in FIG. 1, from a vendor. After administering the dental impression kit 10 at home, the customer may ship the dental impression kit 10 in the box 12 back to the vendor for analysis. The box 12 is sized for standard shipping and is likewise sized for delivery into the customer's mailbox. Accordingly, additional fees for shipment of the dental impression kit 10 in the box 12 may not be required.

Figure 2:
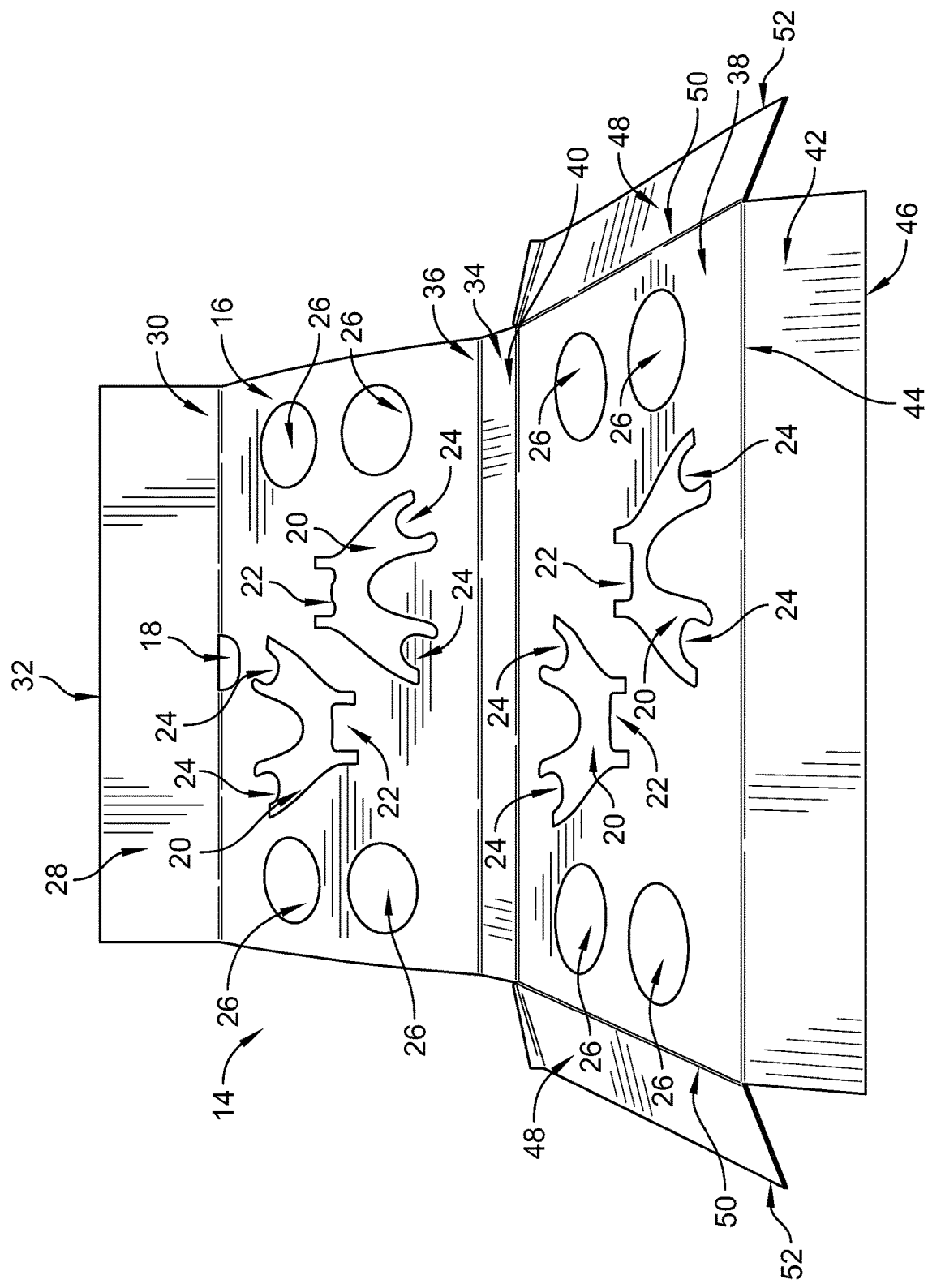
FIG. 2 is a perspective view of an insert that is positioned within the container shown in FIG. 1.

Referring to FIG. 2, the box 12 includes an insert 14 therein that is configured to retain the dental assemblies. The insert 14 includes a top layer 16 having a plurality of cutouts formed therein. A front cutout 18 is sized and shaped to receive a user's finger to lift the top layer 16 from the box 12. A pair of tray cutouts 20 are sized and shaped to retain dental trays (described below). The tray cutouts 20 include a flange 22 that is sized and shaped to retain a front flange of the dental tray. A pair of flanges 24 retain rear ends of the dental tray. Circular cutouts 26 are sized and shaped to retain containers of putty (described below).

A front flap 28 is joined to the top layer 16 along a fold line 30. The front flap 28 is configured to be folded such that an end 32 of the front flap 28 engages a bottom of the box 12, when the insert 14 is positioned within the box 12. The front flap 28 supports the top layer 16 within the box 12. A center flap 34 extends from the top layer 16 along a fold line 36. The center flap 34 is also connected to a second or bottom layer 38 along a fold line 40. When the insert 14 is positioned within the box 12, the center flap 34 supports the top layer 16 within the box.

The bottom layer 38 is configured to be positioned below the top layer 16, when the insert 14 is positioned within the box 12. The bottom layer 38 also includes a plurality of cutouts formed therein. A pair of tray cutouts 20 are sized and shaped to retain dental trays. The tray cutouts 20 include a flange 22 that is sized and shaped to retain a front flange of the dental tray. A pair of flanges 24 retain rear ends of the dental tray. Circular cutouts 26 are sized and shaped to retain containers of putty.

A front flap 42 extends from the bottom layer 38 along a fold line 44. The front flap 42 is configured to be folded such that an end 46 of the front flap 42 engages a bottom of the box 12, when the insert 14 is positioned within the box 12. A pair of side flaps 48 extends from the bottom layer 38 along fold lines 50. The side flaps 48 are configured to be folded such that an end 52 of each side flap 48 engages a bottom of the box 12, when the insert 14 is positioned within the box 12. Accordingly, the front flap 42 and the side flaps 48 support the bottom layer 38 within the box 12, when the insert 14 is positioned within the box 12.

In some embodiments, the top layer 16 and the bottom layer 38 are not integrally formed. In such an embodiment, the top layer 16 is configured to be positioned on top of the bottom layer 38 such that the top layer is individually removable while the bottom layer 38 remains within the box 12.

Figure 3:
FIG. 3 is a perspective view of the container shown in FIG. 1 in an open configuration to expose an instruction manual.

Referring to FIG. 3, when the box 12 is opened, an instruction manual 54 is positioned at a top of the box contents. The instruction manual 54 provides step-by-step instructions for administering the contents of the dental impression kit 10. A method for administering the dental impression kit 10 according to the instructions is described in more detail with respect to FIG. 10.

Figure 4:
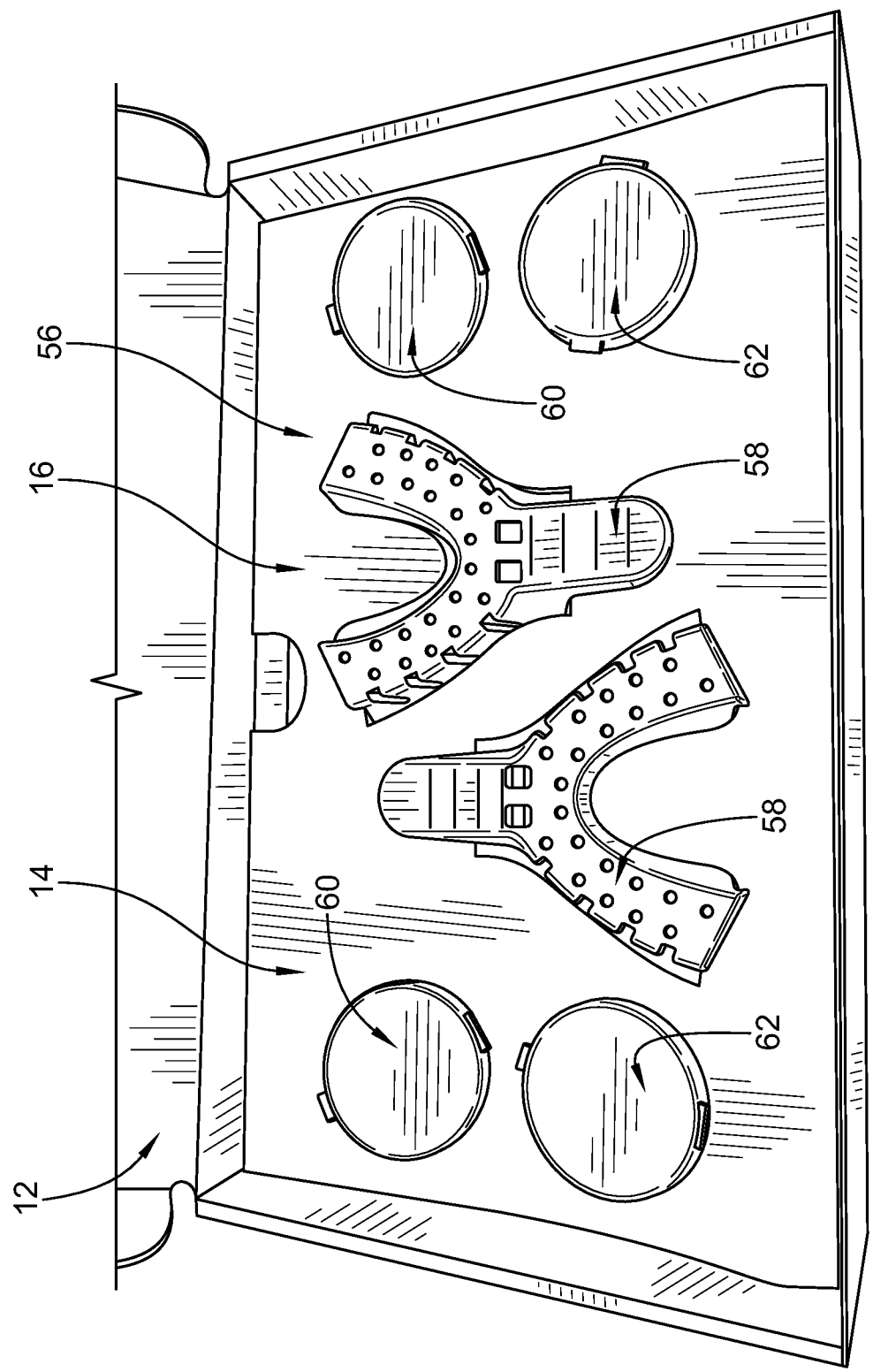
FIG. 4 is a perspective view of a top layer of the insert shown in FIG. 2 and having part of the dental impression kit therein.
Figure 7:
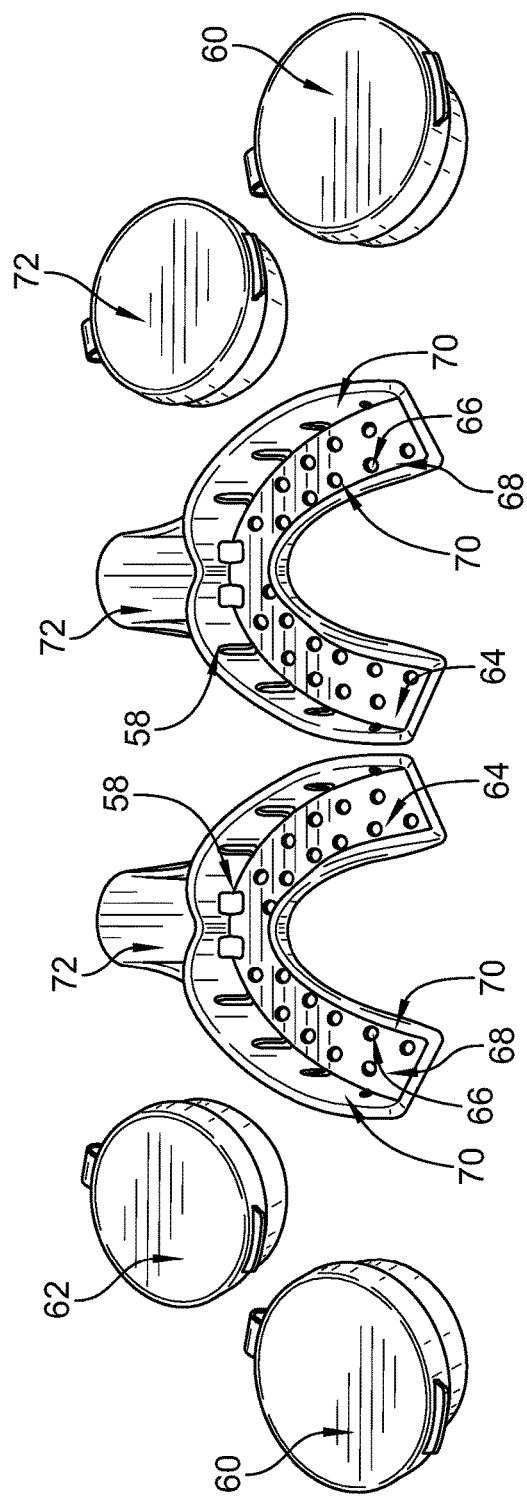
FIG. 7 is a perspective view of part of the dental impression kit including dental trays, base putty containers, and catalyst putty containers.

Referring to FIG. 4, when the instruction manual 54 is removed from the box 12, the top layer 16 of the insert 14 is exposed. The top layer 16 includes the contents of an initial dental assembly 56. Referring to FIG. 7, the initial dental assembly 56 includes two initial dental trays 58, two containers of an initial base putty 60, and two containers of an initial catalyst putty 62. The instruction manual 54 includes initial instructions for administering the initial dental assembly 56. Generally, in use, a container of initial base putty 60 is mixed with a container of initial catalyst putty 62 to form a putty mixture. The putty mixture is then positioned in one of the initial dental trays 58 to form a dental impression of the upper teeth. The second container of initial base putty 60 is then mixed with the second container of initial catalyst putty 62 to form another putty mixture that is positioned in the second initial dental tray 58 to form a dental impression of the lower teeth. This process is explained in more detail below with respect to FIG. 10.

Still referring to FIG. 7, the initial dental trays 58 include a substantially arched mouth insert 64 that is sized and shaped to be inserted into the user's mouth. Particularly, the insert 64 is sized and shaped to be received into either an upper portion or a lower portion of the user's mouth. The insert 64 includes a cavity 66 defined by a bottom wall 68 and a pair of sidewalls 70 extending upward from the bottom wall 68. The cavity 66 is sized to receive the putty mixture. When the initial dental tray 58 is inserted into the user's mouth, the user bites down on the initial dental tray 58 so that the user's teeth are within the cavity 66 and bite into the putty mixture. A flange 72 extends from a front of the initial dental tray 58. The flange 72 is configured to be gripped by the user to insert and remove the initial dental tray 58 from the user's mouth.

In some embodiments, the initial catalyst putty 62 is a polyvinyl siloxane that provides a predetermined period of time to set when mixed with the initial base putty 60. The predetermined period of time is based on a period of time necessary for a user to administer the dental impression kit 10 at home. That is, the predetermined period of time is selected to allow the user enough time to prepare the putty mixture and dental impression, while also preventing the putty mixture from deforming when the initial dental tray 58 having the putty mixture therein is removed from the user's mouth. In some embodiments, the initial base putty 60 and the initial catalyst putty 62 may be required to be at room temperature before mixing.

Referring back to FIG. 4, after the initial dental assembly 56 is used to form an initial set of dental impressions of both the upper and lower teeth, the user may grip the top layer 16 by the front cutout 18 and lift the top layer 16 from the box 12. Specifically, the top layer 16 folds back along the fold line 36 to expose the bottom layer 38.

Figure 5:
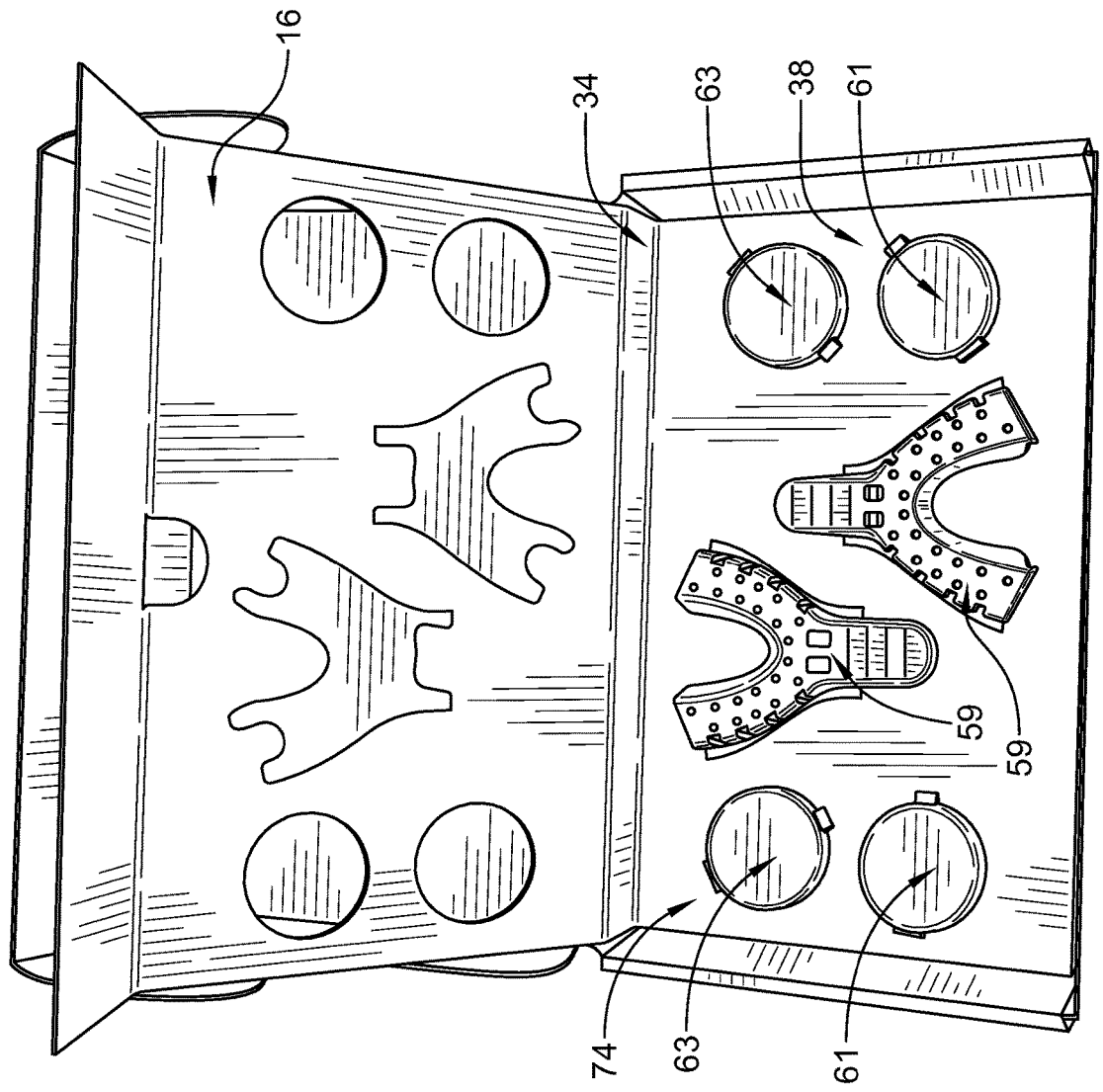
FIG. 5 is a perspective view of a bottom layer of the insert shown in FIG. 2 and having part of the dental impression kit therein.

FIG. 5 shows, the top layer 16 folded back to expose the bottom layer 38. Notably, the top layer 16 is still connected to the bottom layer 38 by the center flap 34; however, the top layer 16 is folded back so that the bottom layer 38 may be accessed. The bottom layer 38 includes a redundant dental assembly 74. The redundant dental assembly 74 is identical to the initial dental assembly 56, described with respect to FIG. 7, and includes two redundant dental trays 59 that are identical to the initial dental trays 58 described with respect to FIG. 7, two containers of a redundant base putty 61 that are identical to the containers of initial base putty 60 described with respect to FIG. 7, and two containers of a redundant catalyst putty 63 that are identical to the containers of initial catalyst putty described with respect to FIG. 7. The instruction manual 54 includes redundant instructions for administering the redundant dental assembly 74. The redundant dental assembly 74 is utilized to form a second set of dental impressions of the upper and lower teeth (as described below). Accordingly, the redundant dental assembly 74 provides redundancy in administering the dental impression kit 10. This redundancy enables the user to "practice" forming the dental impression with the initial dental assembly 56. Alternatively or in addition to, the redundancy provides for two sets of dental impressions if one of the impressions is not properly achieved.

Figure 6:
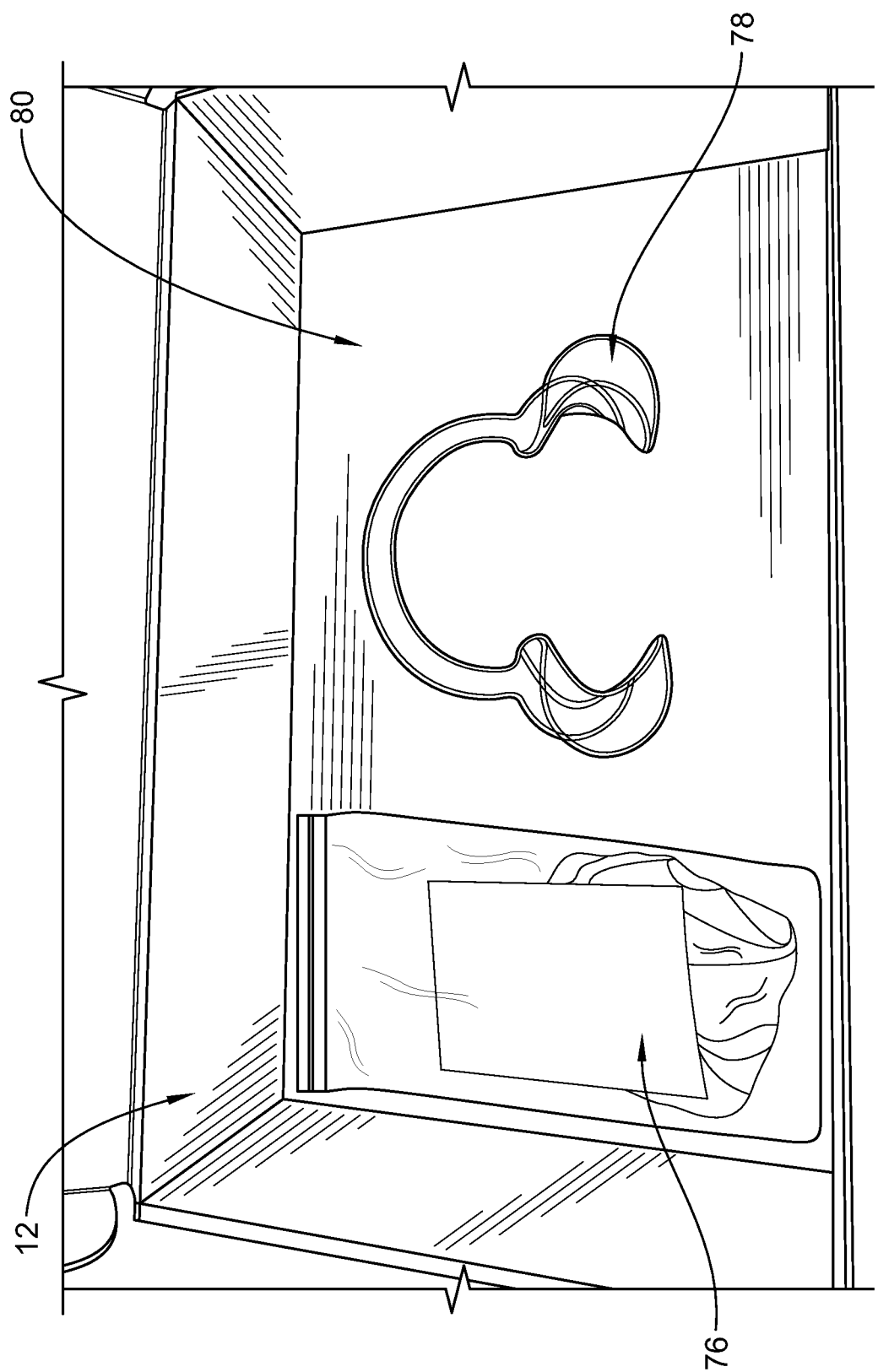
FIG. 6 is a perspective view of a bottom of the container shown in FIG. 1 and having part of the dental impression kit therein.

Referring to FIG. 6, a pair of gloves 76 and a dental appliance 78 are included at a bottom 80 of the box 12. Particularly, the pair of gloves 76 and the dental appliance 78 are positioned below the insert 14. When opening the dental impression kit 10, the user may first remove the instruction manual 54 and the insert 14 to gain access to the pair of gloves 76 and the dental appliance 78. The insert 14 may then be positioned back into the box so that the user may appropriately follow the instructions in the instruction manual 54, as described in more detail below.

Figure 8:
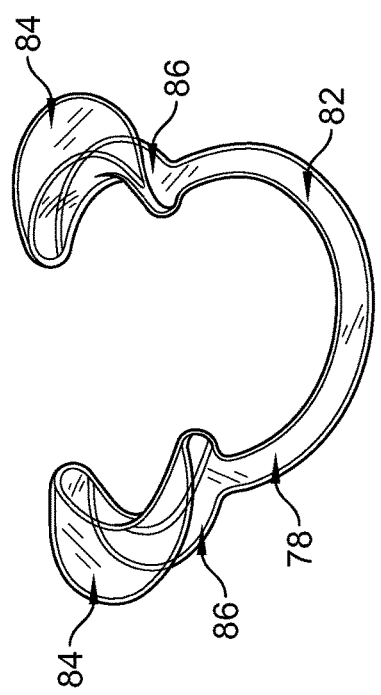
FIG. 8 is a perspective view of a dental appliance that is included in the dental impression kit.

Referring to FIG. 8, the dental appliance 78 includes a handle 82 having a pair of flanges 84 at each end. The flanges 84 are generally U-shaped and form a cavity 86. The instruction manual 54 includes appliance instructions for utilizing the dental appliance 78. The cavity 86 is configured to receive the user's lips at the sides of the user's mouth. The dental appliance 78 is configured to separate the user's lips to open the user's mouth. In this position, the user may photograph his/her teeth, as described in more detail below.

Figure 9:
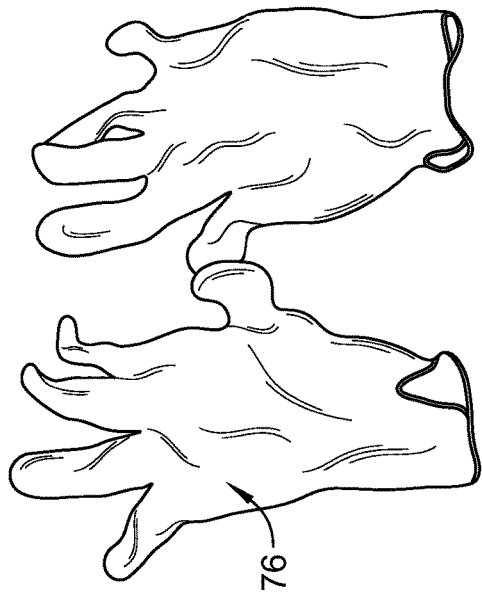
FIG. 9 is a perspective view of gloves that are included in the dental impression kit.

FIG. 9 shows the pair of gloves 76. In some embodiments, the gloves 76 are formed from a non-latex, hypo-allergenic material. The gloves 76 may also be sized and stretchable for any user's hands. The gloves 76 are used to protect the user's hands from the initial base putty 60 and the initial catalyst putty 62. The gloves 76 also prevent contamination of the initial base putty 60 and the initial catalyst putty 62.

Figure 10:
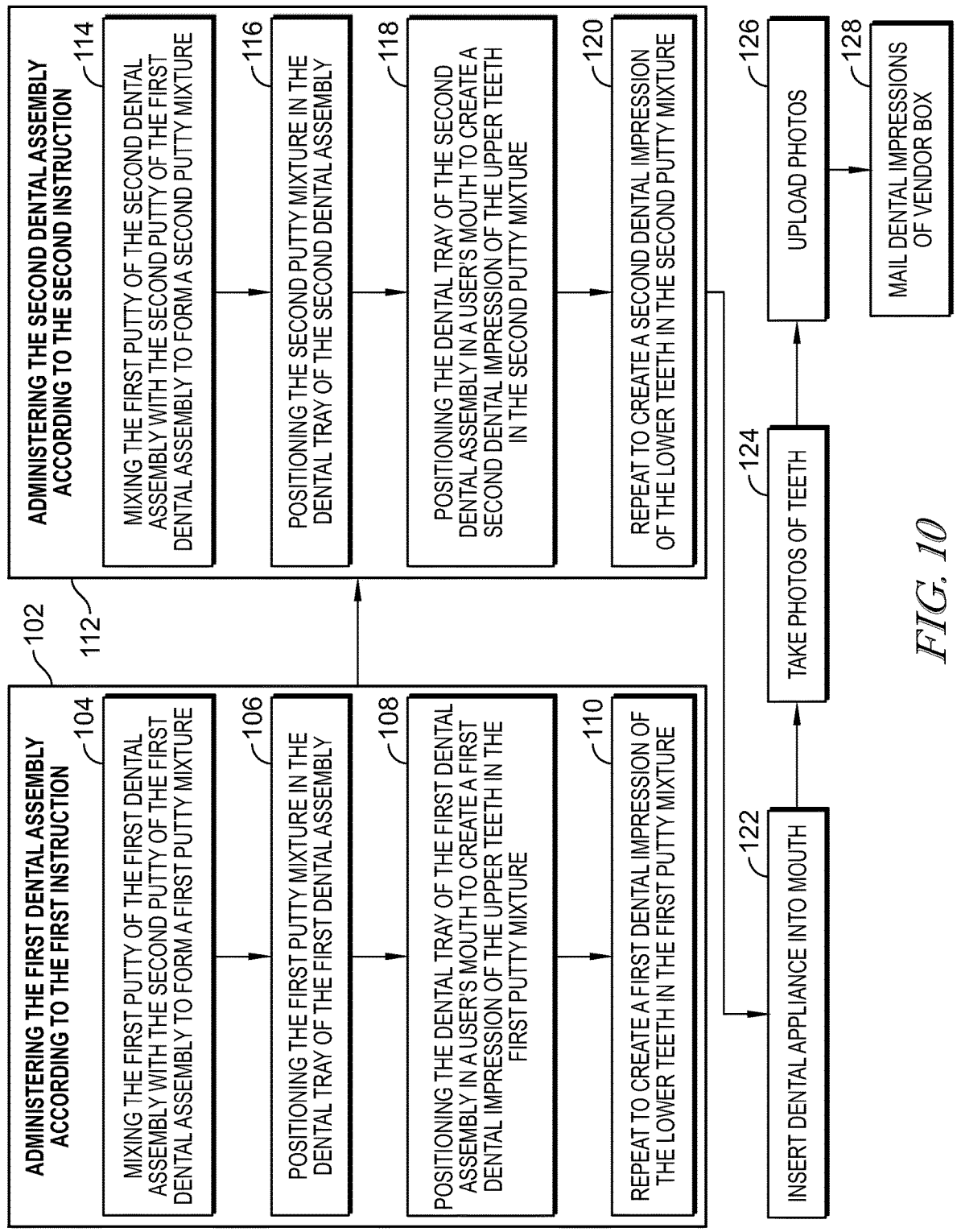
FIG. 10 is a flowchart of a method for administering the dental impression kit shown in FIGS. 1-9.

Referring to FIG. 10, a method 100 for administering the dental impression kit 10 includes receiving from a vendor the dental impression kit 10 in the box 12 in the mail. The box 12 is opened so that the user may obtain the instruction manual 54 for the dental impression kit 10. After removing the instruction manual 54, the entire insert 14 may be removed to expose the gloves 76 and the dental appliance 78. After the gloves 76 and dental appliance 78 are removed from the box 12, the insert 14 is positioned back into the box 12 so that the instruction manual 54 may be properly followed. The user is instructed to wash his/her hands and put the gloves 76 on before proceeding.

With the insert 14 positioned back into the box 12, the top layer 16 is exposed. The initial dental assembly 56 is then administered, at step 102, by following the initial instruction of the instruction manual 54. At step 104, the initial base putty 60 is mixed with the initial catalyst putty 62 to form an initial putty mixture. In some embodiments, the initial base putty 60 is mixed with the initial catalyst putty 62 for approximately 20 seconds to form the initial putty mixture. In other embodiments, the initial base putty 60 is mixed with the initial catalyst putty 62 for a time period required by the putty type and/or environmental conditions. For example, the mixing time may vary based on geographical region or the time of year, e.g. summer or winter. At step 106, the initial putty mixture is then positioned within the cavity 66 of the initial dental tray 58. In some embodiments, the user is instructed to position the initial putty mixture within the cavity 66 of the initial dental tray 58 within a time frame of approximately less than or equal to one minute from the time the initial base putty 60 and the initial catalyst putty 62 are opened. In other embodiments, the initial putty mixture is positioned within the cavity 66 of the initial dental tray 58 within a time period required by the putty type and/or environmental conditions. For example, the time may vary based on geographical region or the time of year, e.g. summer or winter. With the initial putty mixture positioned within the cavity 66 of the initial dental tray 58, the user then inserts the initial dental tray 58 into his/her mouth and bites down so that the user's upper teeth are positioned within the initial putty mixture to form an initial dental impression, at step 108. In some embodiments the initial dental tray 58 is retained within the user's mouth for a time period of approximately 2.5 to 3.5 minutes to create the initial dental impression. In other embodiments, the initial dental tray 58 is retained within the user's mouth for a time period required by the putty type and/or environmental conditions. For example, the time may vary based on geographical region or the time of year, e.g. summer or winter. At step 110, steps 104-108 are repeated using the second initial dental tray 58, the second container of initial base putty 60, and the second container of initial catalyst putty 62 to form an initial dental impression of the user's lower teeth.

After the initial set of dental impressions has been made, the user folds the top layer 16 back to expose the bottom layer 38 and the redundant dental assembly 74. The redundant dental assembly 74 is then administered, at step 112, by following the redundant instruction of the instruction manual 54. At step 114, the redundant base putty 61 is mixed with the redundant catalyst putty 63 to form a redundant putty mixture. In some embodiments, the redundant base putty 61 is mixed with the redundant catalyst putty 63 for approximately 20 seconds to form the redundant putty mixture. In other embodiments, the redundant base putty 61 is mixed with the redundant catalyst putty 63 for a time period required by the putty type and/or environmental conditions. For example, the time may vary based on geographical region or the time of year, e.g. summer or winter. The redundant putty mixture is then positioned within the cavity 66 of the redundant dental tray 59, at step 116. In some embodiments, the user is instructed to position the redundant putty mixture within the cavity 66 of the redundant dental tray 59 within a time frame of approximately less than or equal to one minute from the time the redundant base putty 61 the redundant catalyst putty 63 are opened. In other embodiments, the redundant putty mixture is positioned within the cavity 66 of the redundant dental tray 59 within a time period required by the putty type and/or environmental conditions. For example, the time may vary based on geographical region or the time of year, e.g. summer or winter. With the redundant putty mixture positioned within the cavity 66 of the redundant dental tray 59, the user then inserts the redundant dental tray 59 into his/her mouth and bites down so that the user's upper teeth are positioned within the redundant putty mixture to form a redundant dental impression, at step 118. In some embodiments the redundant dental tray 59 is retained within the user's mouth for a time period of approximately 2.5 to 3.5 minutes to create the redundant dental impression. In other embodiments, the redundant dental tray 59 is retained within the user's mouth for a time period required by the putty type and/or environmental conditions. For example, the time may vary based on geographical region or the time of year, e.g. summer or winter. At step 120, steps 114-118 are repeated using the second redundant dental tray 59, the second container of redundant base putty 61, and the second container of redundant catalyst putty 63 to form a redundant dental impression of the user's lower teeth.

After administering the initial dental assembly 56 and the redundant dental assembly 74, the user has created two sets of dental impressions of both his/her upper teeth and his/her lower teeth. The insert 14 may be removed from the box 12 and discarded. The dental appliance 78 is then inserted into the user's mouth to separate the user's lips and expose the user's teeth, at step 122. With the dental appliance 78 in his/her mouth, the user takes a series of photos of his/her teeth in accordance with an appliance instruction in the instruction manual 54, at step 124. These photos may then be uploaded to the vendor's website via a web portal or the like, at step 126. The user then positions both sets of dental impressions, i.e. the upper and lower initial dental impressions from the initial dental assembly 56 and the upper and lower redundant dental impressions from the redundant dental assembly 74 into the empty box 12. It should be noted that the dental impressions are not removed from the dental trays 58, 59. That is, the dental trays 58, 59 with the dental impressions therein are positioned in the box 12. The box is then sealed with a sticker included within the dental impression kit 10. At step 128, the box 12 with the dental impressions sealed therein is mailed back to the vendor using a return mailing label that is included in the dental impression kit 10.

Figure 11:
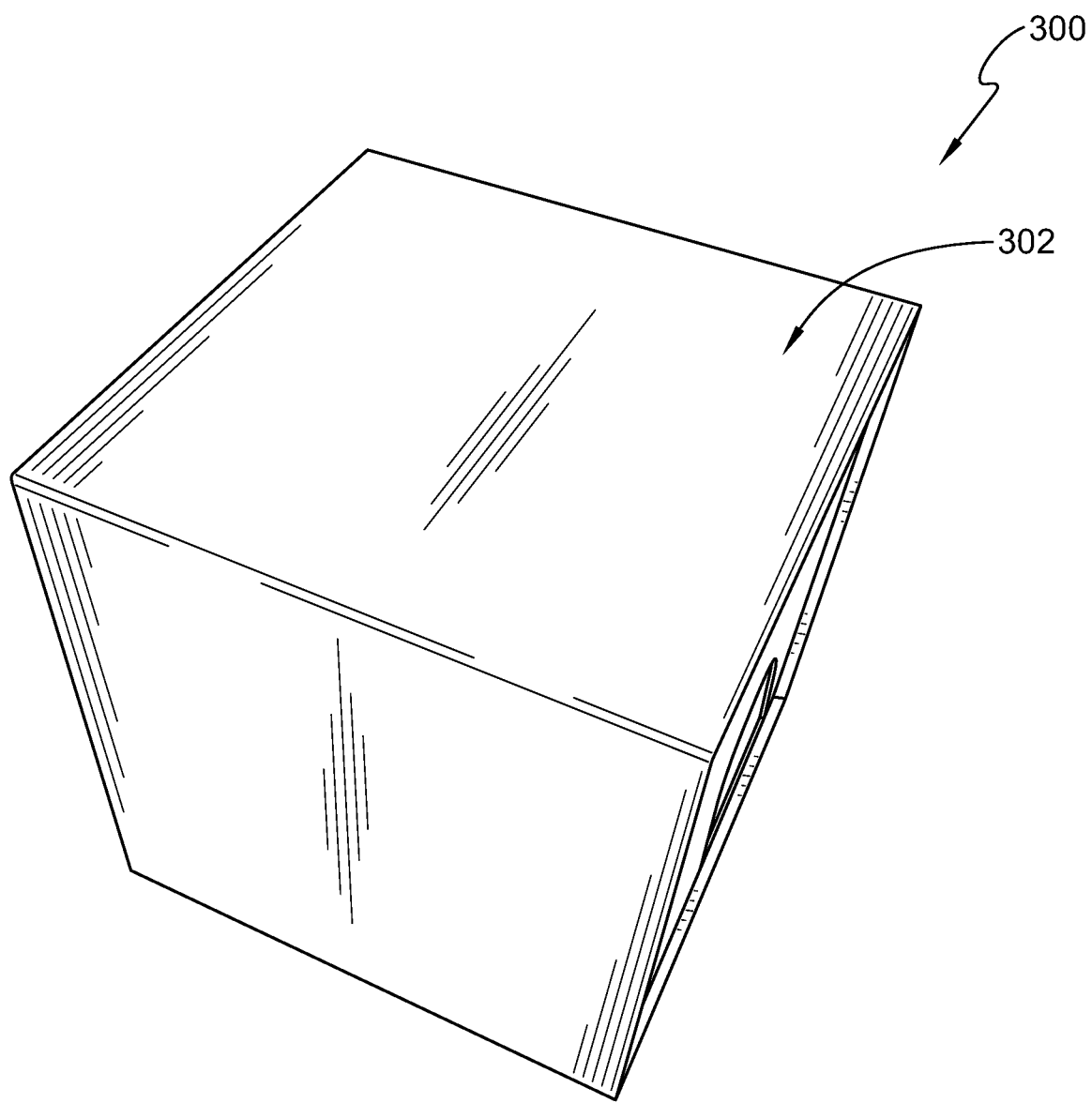
FIG. 11 is a perspective view of another container that contains the contents of a dental impression kit.

Referring to FIG. 11, a dental impression kit 300 is shown having dental assemblies (discussed in more detail below) therein. The dental impression kit 300 may be ordered by a customer and shipped in a container or box 302, shown in FIG. 11, from a vendor. After administering the dental impression kit 300 at home, the customer may ship the dental impression kit 300 in the box 302 back to the vendor for analysis. The box 302 is sized for standard shipping and is likewise sized for delivery into the customer's mailbox. Accordingly, additional fees for shipment of the dental impression kit 300 in the box 302 may not be required.

Figure 12:
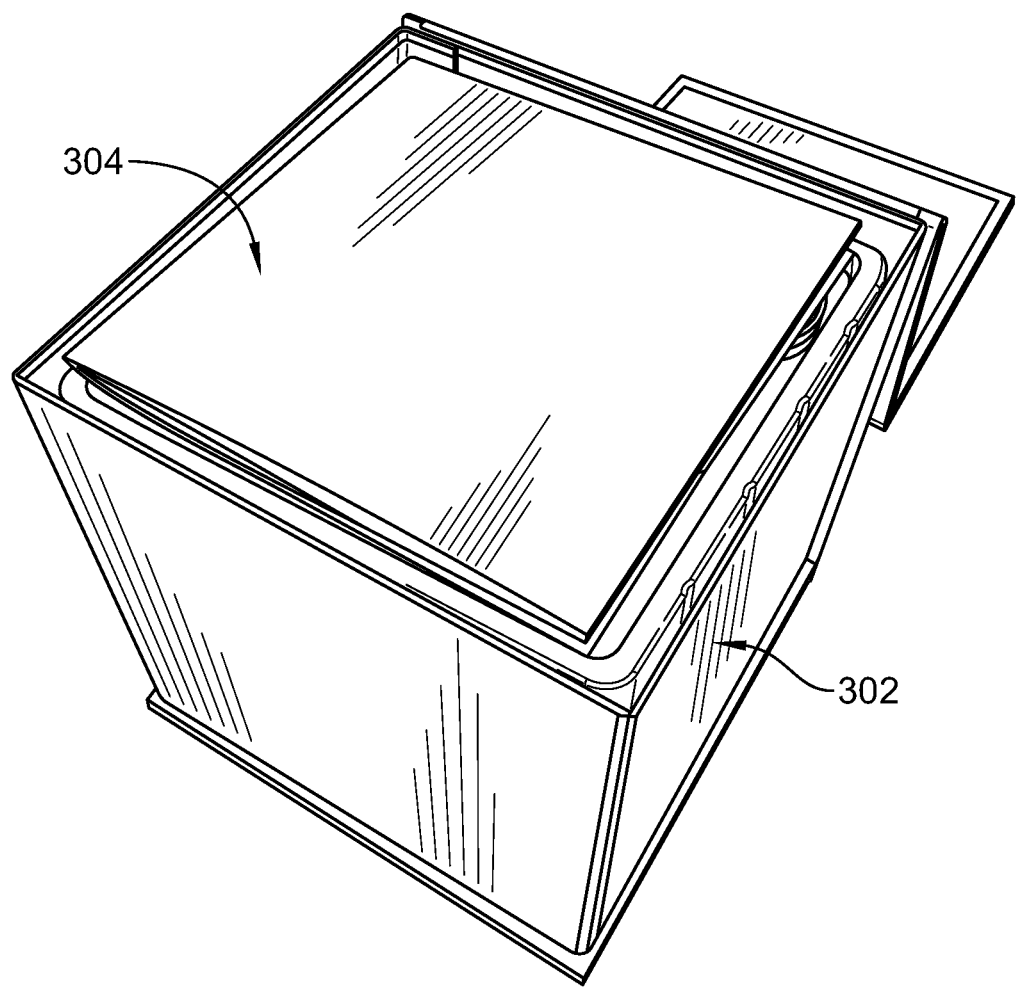
FIG. 12 is a perspective view of the container shown in FIG. 11 opened.
Figure 13:
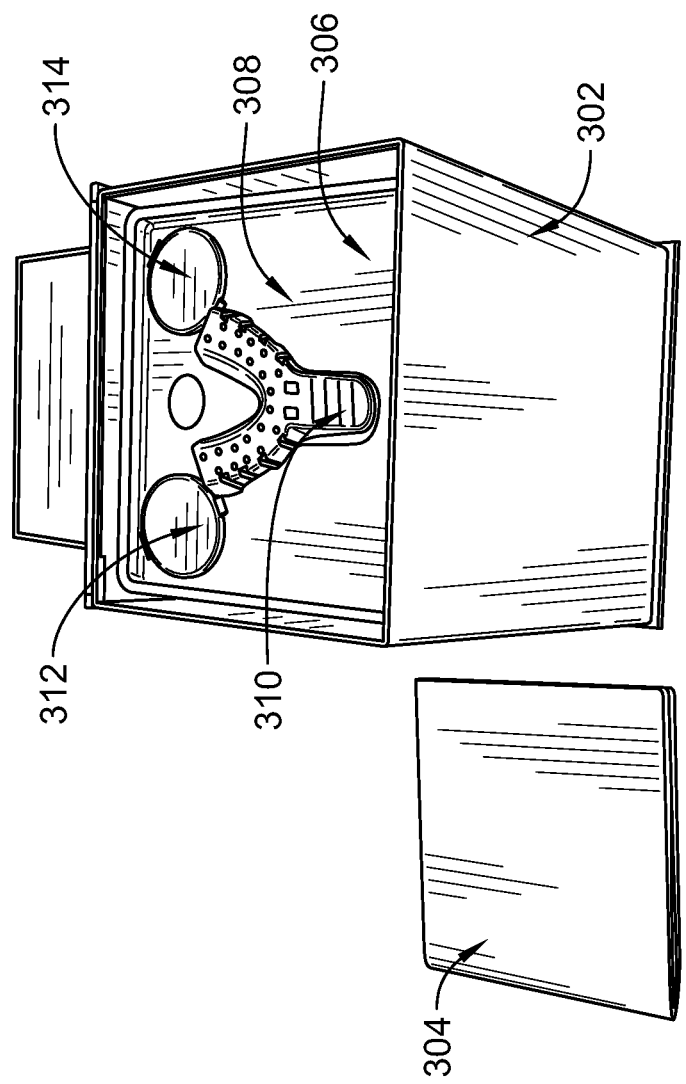
FIG. 13 is a perspective view of an initial dental assembly insert that is positioned within the container shown in FIG. 11.

Referring to FIG. 12, when the box 302 is opened, an instruction manual 304 is positioned at a top of the box contents. The instruction manual 304 provides step-by-step instructions for administering the contents of the dental impression kit 300. Referring to FIG. 13, when the instruction manual 304 is removed from the box 302, an insert 306 is exposed that includes the contents of an upper initial dental assembly 308. The initial upper dental assembly 308 includes an initial upper dental tray 310, a container of an initial upper base putty 312, and a container of an initial upper catalyst putty 314. The instruction manual 304 includes initial instructions for administering the initial upper dental assembly 308. Generally, in use, the initial upper base putty 312 is mixed with the initial upper catalyst putty 314 to form a putty mixture. The putty mixture is then positioned in the initial upper dental tray 310 to form a dental impression of the upper teeth.

Figure 14:
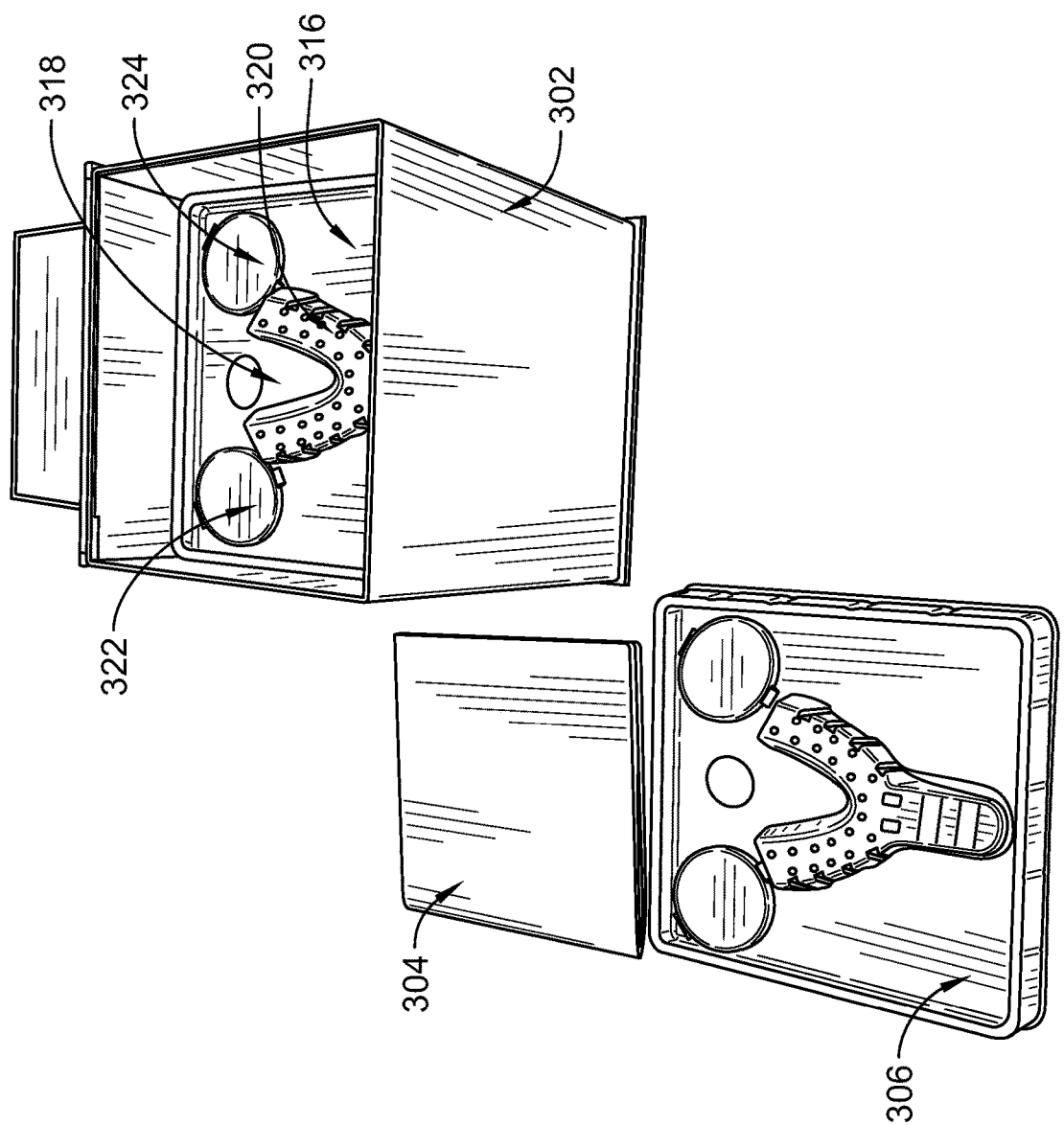
FIG. 14 is a perspective view of another initial dental assembly insert that is positioned within the container shown in FIG. 11.

Referring to FIG. 14, when the insert 306 is removed, another insert 316 is exposed that includes the contents of an initial lower dental assembly 318. The initial lower dental assembly 318 includes an initial lower dental tray 320, a container of an initial lower base putty 322, and a container of an initial lower catalyst putty 324. The instruction manual 304 includes initial instructions for administering the initial lower dental assembly 318. Generally, in use, the initial lower base putty 322 is mixed with the initial lower catalyst putty 324 to form a putty mixture. The putty mixture is then positioned in the initial lower dental tray 320 to form a dental impression of the lower teeth.

Figure 15:
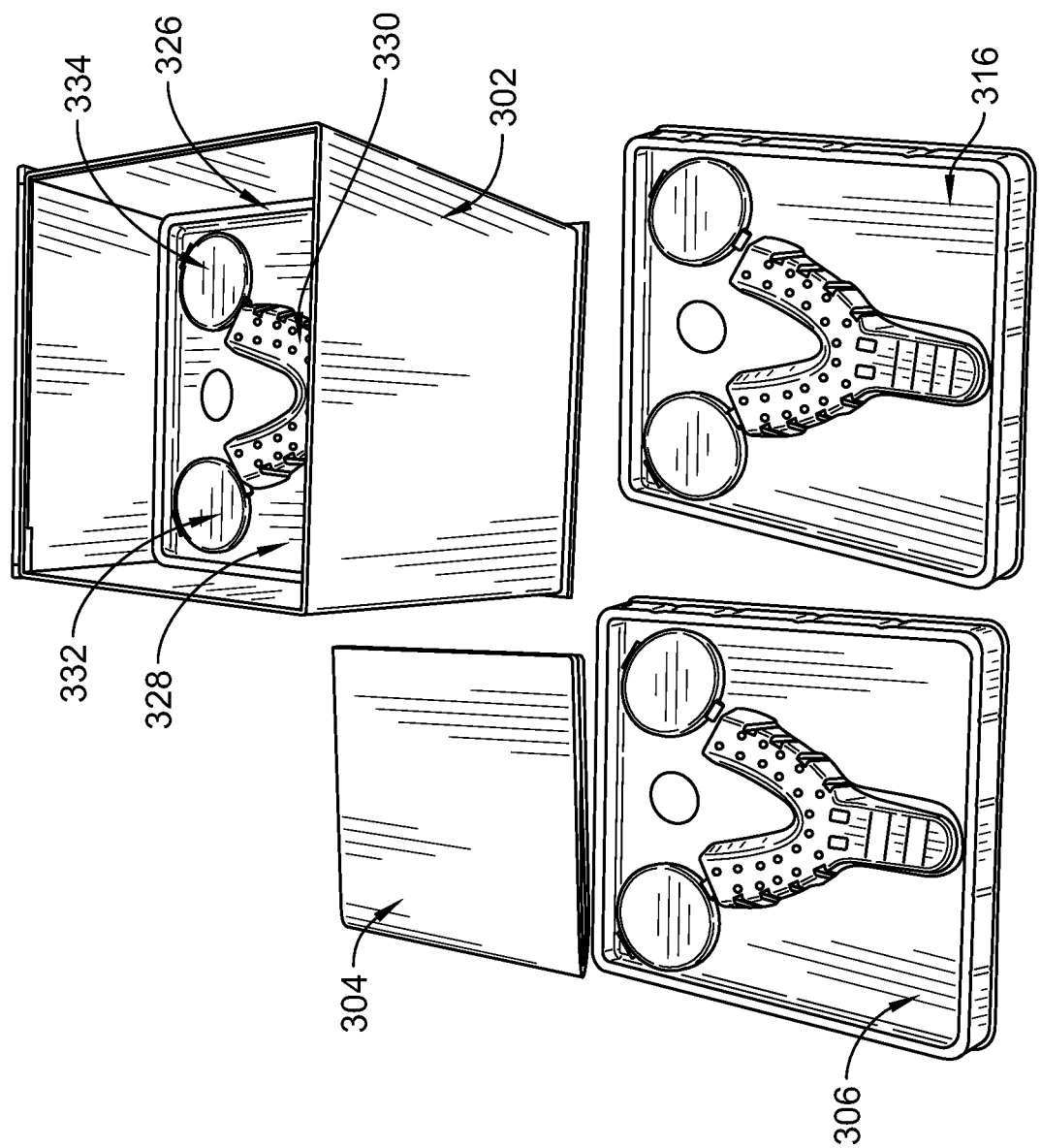
FIG. 15 is a perspective view of a redundant dental assembly insert that is positioned within the container shown in FIG. 11.

Referring to FIG. 15, when the insert 316 is removed from the box 302, an insert 326 is exposed that includes the contents of a redundant upper dental assembly 328. The redundant upper dental assembly 328 includes a redundant upper dental tray 330, a container of a redundant upper base putty 332, and a container of a redundant upper catalyst putty 334. The instruction manual 304 includes redundant instructions for administering the redundant upper dental assembly 328. Generally, in use, the redundant upper base putty 332 is mixed with the redundant upper catalyst putty 334 to form a putty mixture. The putty mixture is then positioned in the redundant upper dental tray 330 to form a dental impression of the upper teeth.

Figure 16:
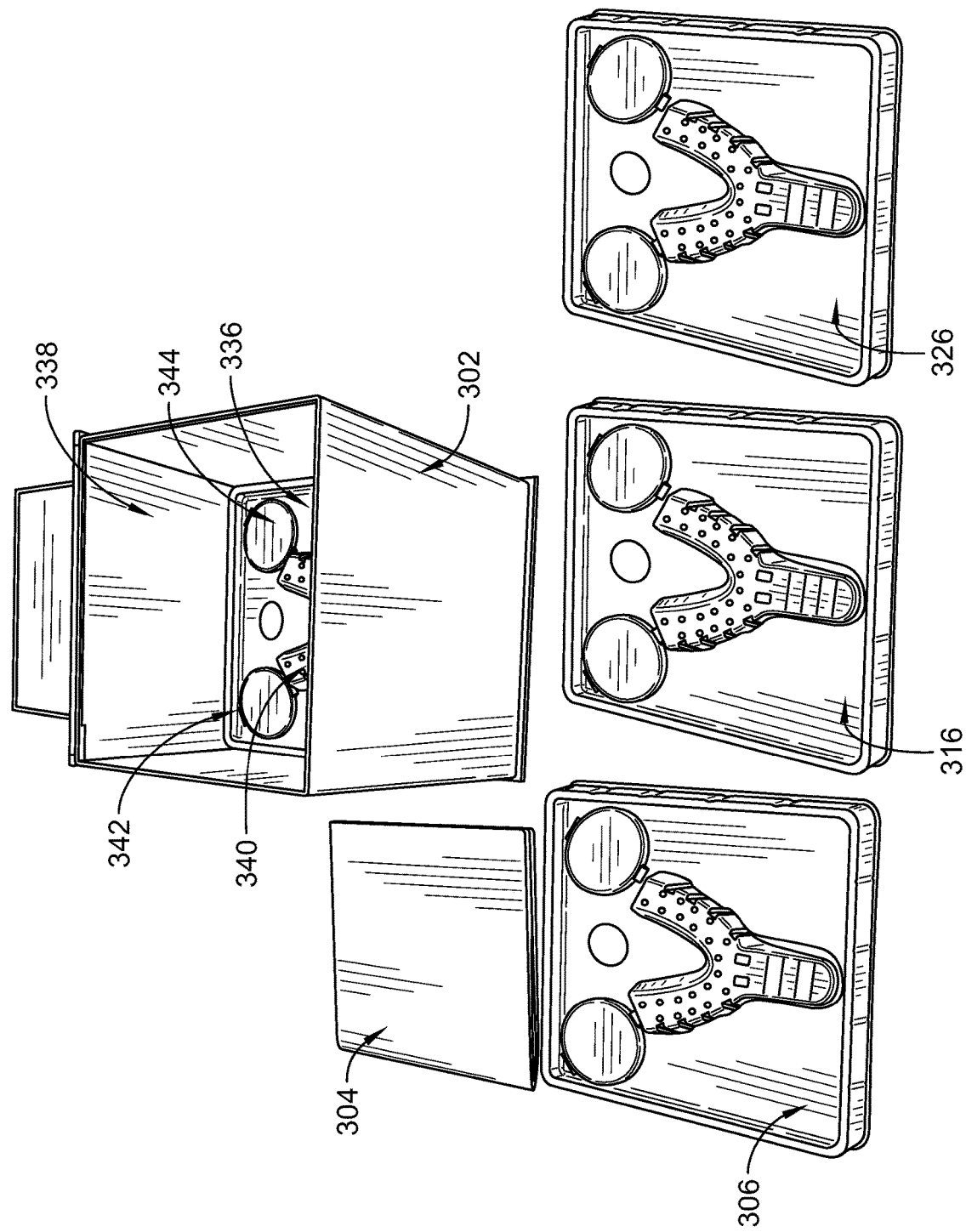
FIG. 16 is a perspective view of another redundant dental assembly insert that is positioned within the container shown in FIG. 11.

Referring to FIG. 16, when the insert 326 is removed, another insert 336 is exposed that includes the contents of a redundant lower dental assembly 338. The redundant lower dental assembly 338 includes a redundant lower dental tray 340, a container of a redundant lower base putty 342, and a container of a redundant lower catalyst putty 344. The instruction manual 304 includes redundant instructions for administering the redundant lower dental assembly 338. Generally, in use, the redundant lower base putty 342 is mixed with the redundant lower catalyst putty 344 to form a putty mixture. The putty mixture is then positioned in the redundant lower dental tray 340 to form a dental impression of the lower teeth.

Figure 17:
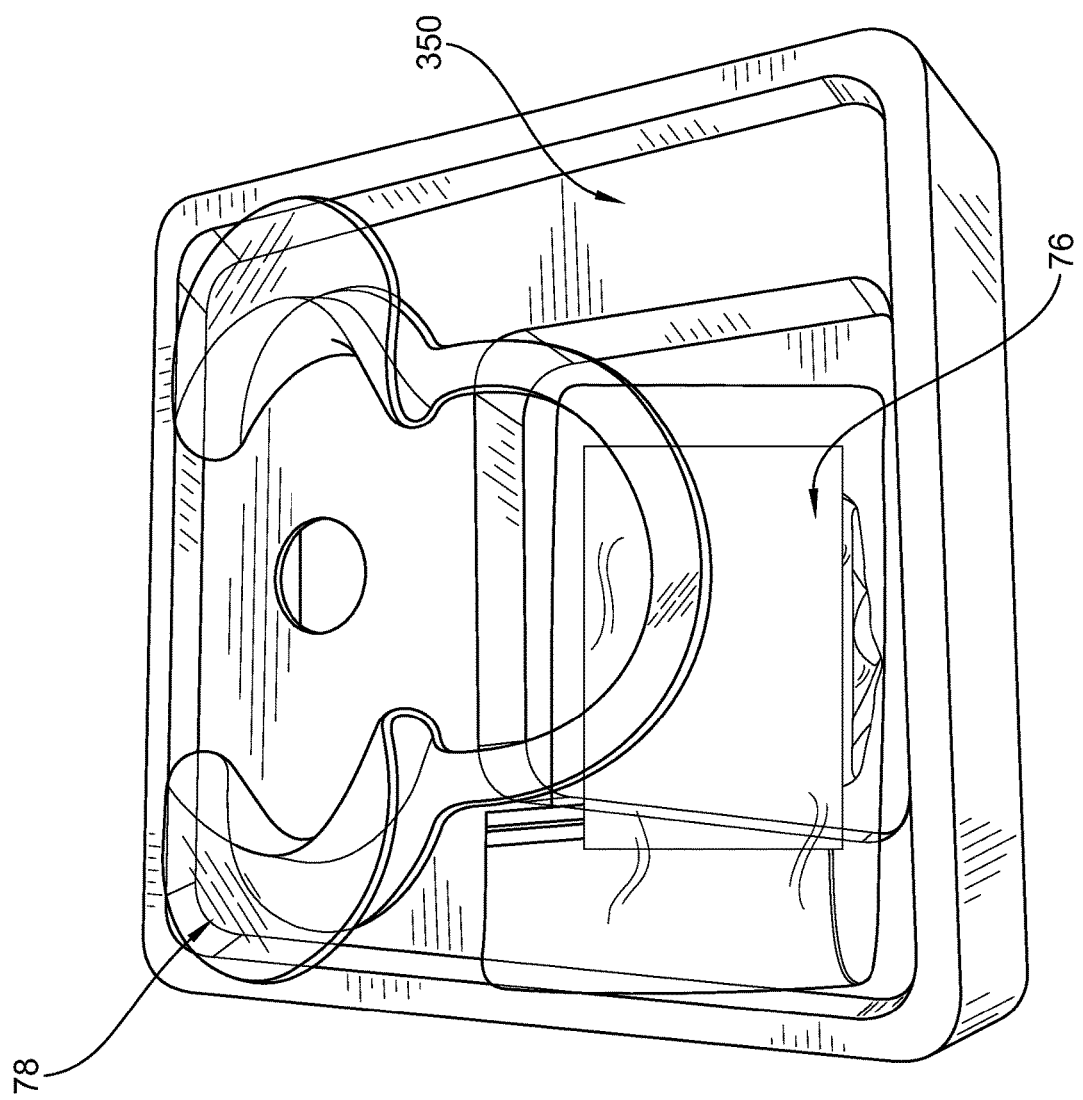
FIG. 17 is a perspective view of a dental appliance insert that is positioned within the container shown in FIG. 11.

Referring to FIG. 17, another insert 350 includes a pair of gloves 76 and a dental appliance 78. The insert 350 is positioned below the insert 336. When opening the dental impression kit 10, the user may first remove the instruction manual 54 and the inserts 306, 316, 326, and 336 to gain access to the pair of gloves 76 and the dental appliance 78. The inserts 306, 316, 326, and 336 may then be positioned back into the box so that the user may appropriately follow the instructions in the instruction manual 54, as described in more detail below.

Figure 18:
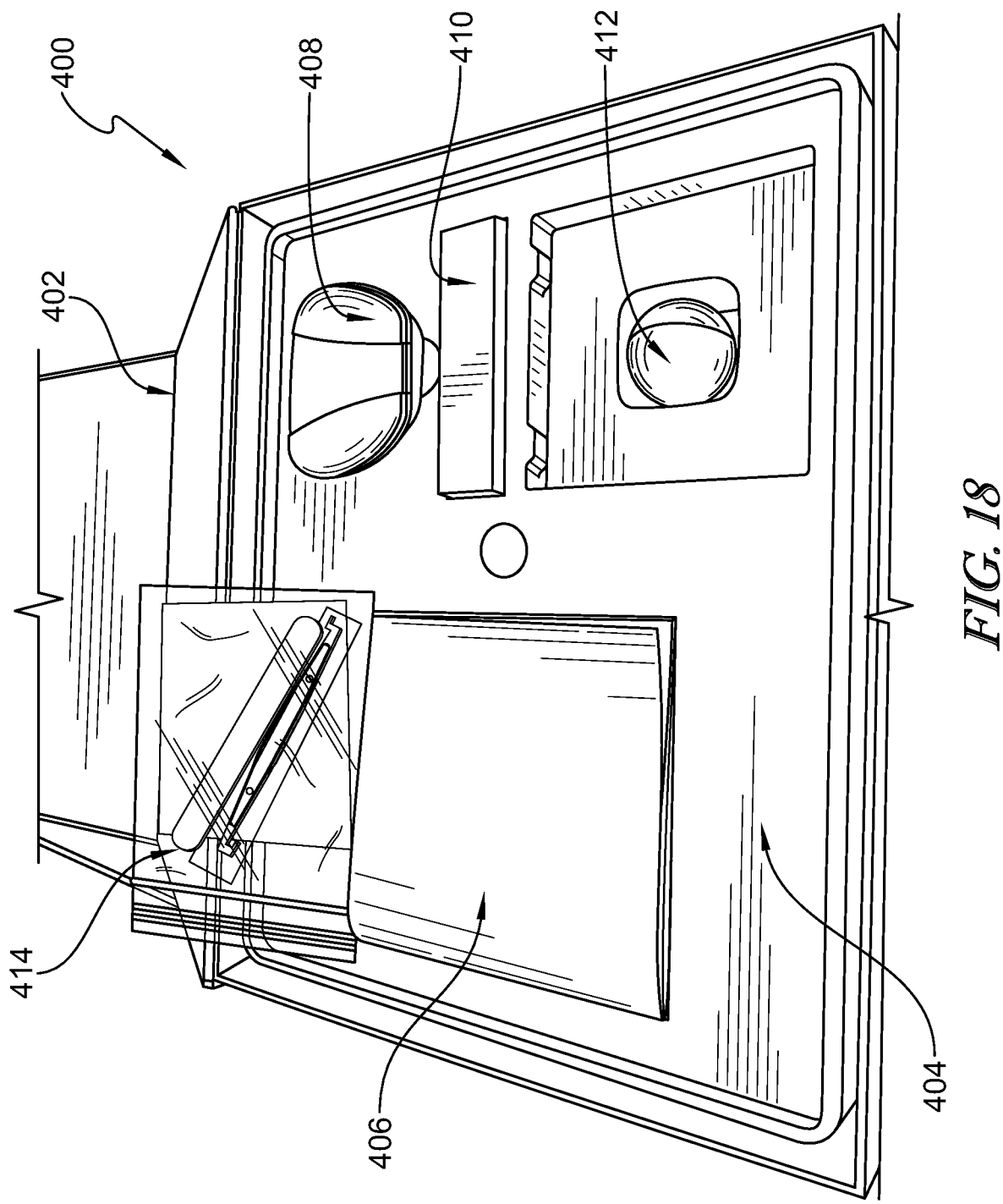
FIG. 18 is a perspective view of a dental aligner kit having a top insert.

Referring to FIG. 18, an alignment kit 400 is mailed to the user after the user specific aligners have been created by the vendor. The alignment kit 400 includes a container 402 having a top insert 404. The top insert 404 includes an instruction manual 406 that provides instructions for administering the alignment kit 400. The top insert 404 also includes a case 408 for retaining aligners (described below), a case of tooth whitening 410 to be used with the aligners, and lip balm 412. A tool kit 414 is also provided in the top insert 404.

Figure 19:
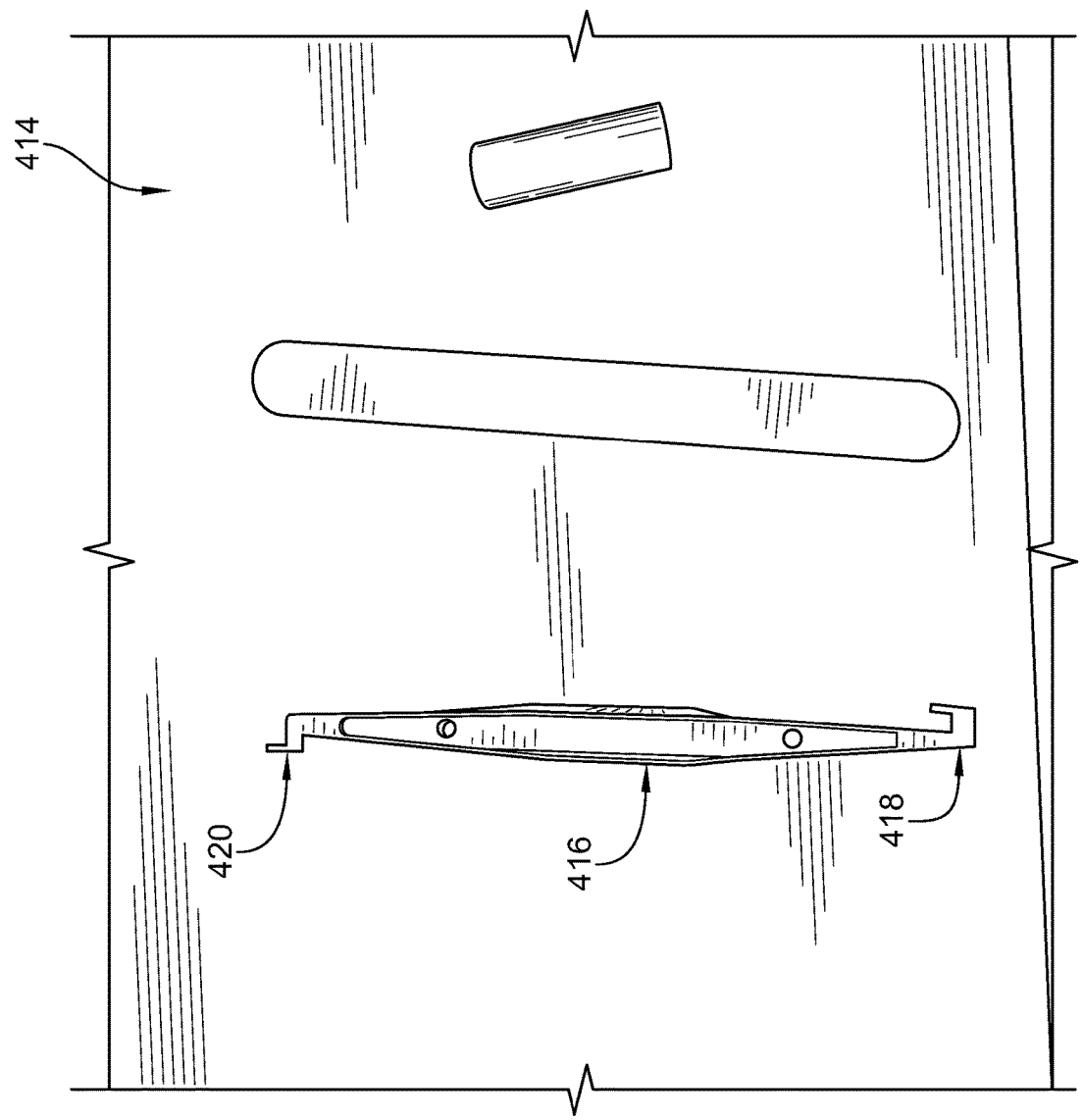
FIG. 19 is a plan view of a dental tool kit of the dental aligner kit shown in FIG. 18.

Referring to FIG. 19, the tool kit 414 includes an extractor 416 for removing aligners from the user's mouth. The extractor 416 includes a first hook 418 for pulling upper aligners off of the user's upper teeth. A second hook 420 pushes lower aligners off the user's lower teeth. The tool kit 414 also includes a file 422 for smoothing out edges of the aligners for the user's comfort. At least one rubber pellet 424 is also provided for aiding the insertion of the aligners. When the user positions the aligner's in his/her mouth, the user may chew on the rubber pellets 424 to push the aligners into position on the user's upper and lower teeth.

Figure 20:
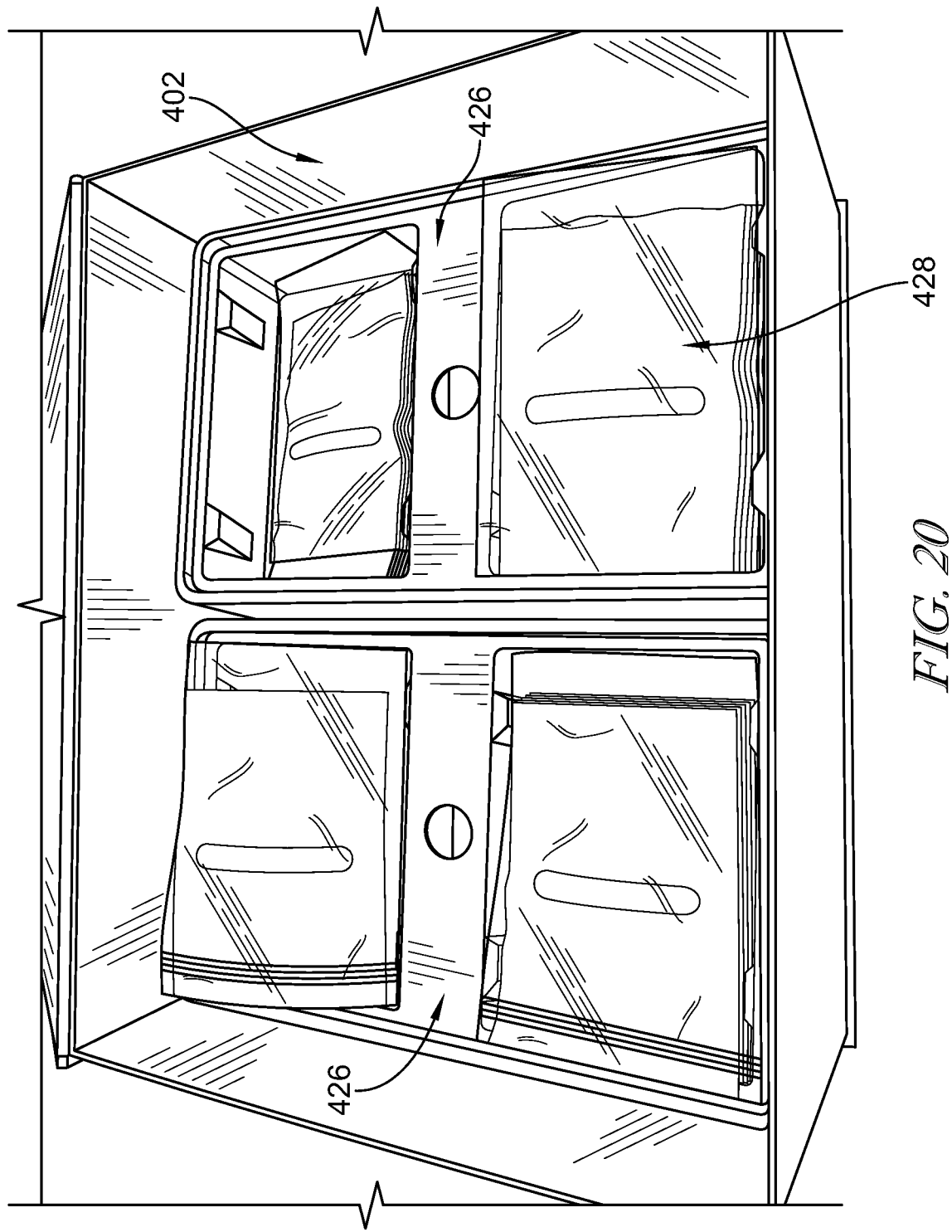
FIG. 20 is a perspective view of first lower inserts of the dental aligner kit shown in FIG. 18.
Figure 21:
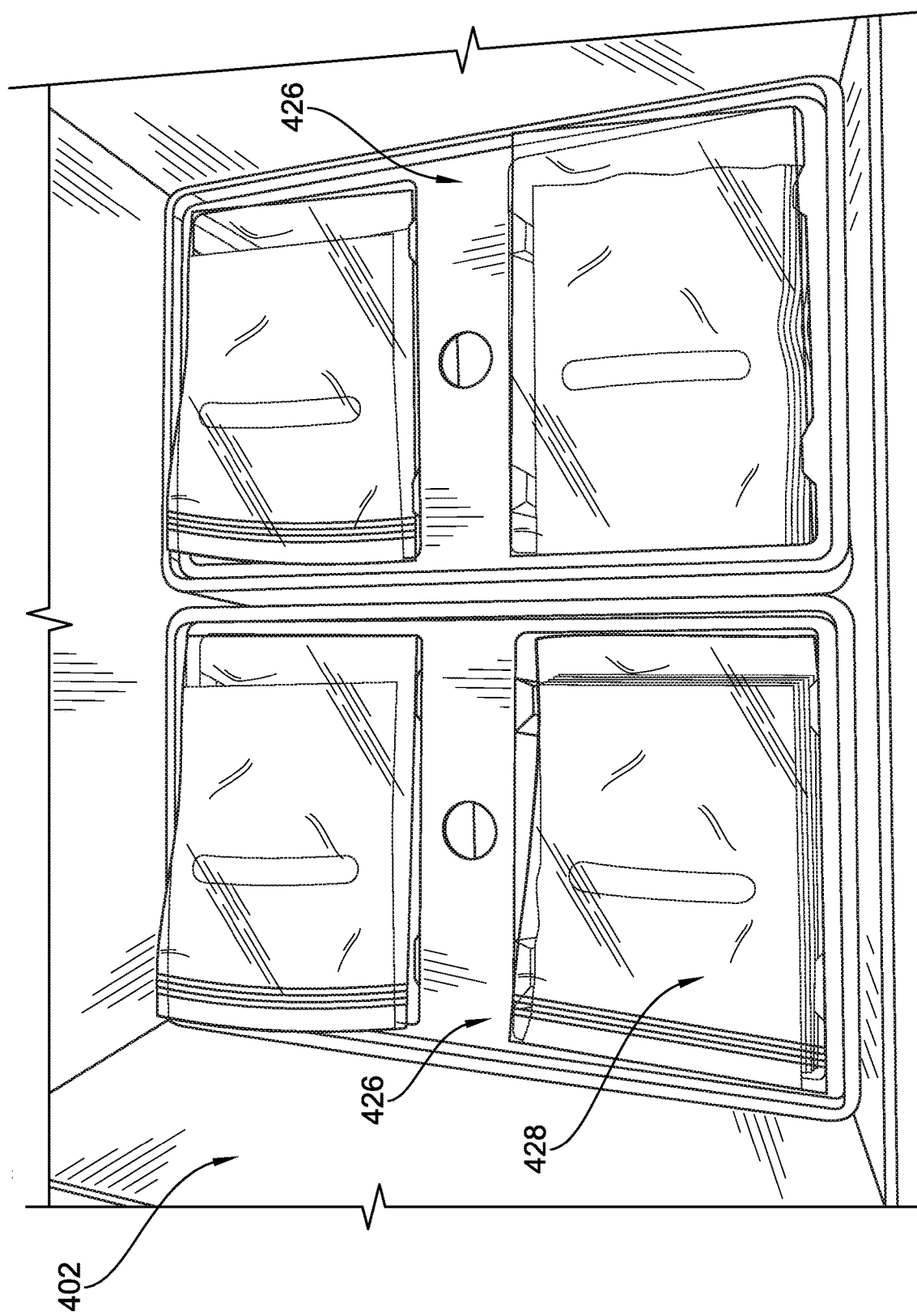
FIG. 21 is a perspective view of second lower inserts of the dental aligner kit shown in FIG. 18.

Referring to FIG. 20, when the top insert 404 is removed from the container 402, at least two lower inserts 426 are exposed. The lower inserts 426 include the aligners 428 that will be inserted in the user's mouth. Referring to FIG. 21, the additional lower inserts 426 may be positioned below the first layer of lower inserts 426.

Figure 22:
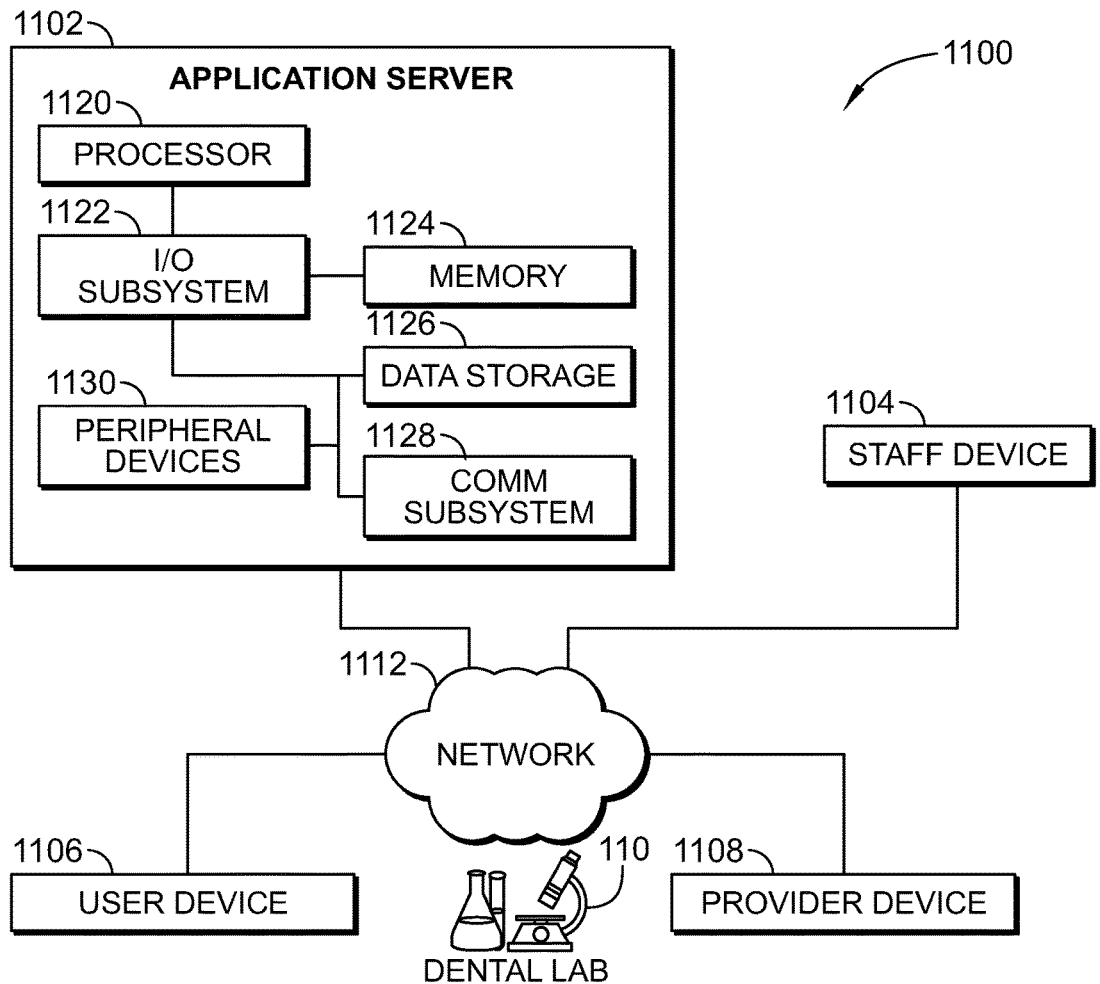
FIG. 22 is a simplified block diagram of at least one embodiment of a system for remote orthodontic treatment and assessment.

Referring now to FIG. 22, in an illustrative embodiment, a system 1100 for remote orthodontic assessment and treatment includes an application server 1102 in communication over a network 1112 with multiple other computing devices, such as one or more staff devices 1104, user devices 1106, provider devices 1108, and/or dental labs 1110. In use, as described further below, the application server 1102 allows a user (using a user device 1106) to order a dental impression kit 10, as described above, and then upload images of the user's mouth and teeth to the application server 1102. The application server 1102 allows a staff professional/hygienist to review and approve the images using the staff device 1104, and then allows a provider (e.g., an orthodontist) to perform a photo assessment using the provider device 1108. After the photo assessment is approved, the application server 1102 receives a 3D treatment plan from the dental lab 1110, and the application server 1102 allows the provider to approve the treatment plan using the provider device 1108. After approval, the application server 1102 allows the user to view the 3D treatment plan using the user device 1106. The application server 1102 optimizes the 3D treatment plan for viewing on the user device 1106. Thus, the system 1100 may allow for remote orthodontic treatment and assessment, without requiring the user to visit the provider's physical offices. Accordingly, the system 1100 may improve the cost and/or availability of orthodontic services. Additionally, by optimizing the 3D treatment plan, the system 1100 provides an improved user experience for viewing treatment plans without the aid of an orthodontist.

The application server 1102 may be embodied as any type of computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As such, the application server 1102 may be embodied as a single server computing device or a collection of servers and associated devices. For example, in some embodiments, the application server 1102 may be embodied as a "virtual server" formed from multiple computing devices distributed across the network 1112 and operating in a public or private cloud. Accordingly, although the application server 1102 is illustrated in FIG. 1 and described below as embodied as a single server computing device, it should be appreciated that the application server 1102 may be embodied as multiple devices cooperating together to facilitate the functionality described below. As shown in FIG. 1, the application server 1102 illustratively include a processor 1120, an input/output subsystem 1122, a memory 1124, a data storage device 1126, and a communication subsystem 1128, and/or other components and devices commonly found in a server computer or similar computing device. Of course, the application server 1102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 1124, or portions thereof, may be incorporated in the processor 1120 in some embodiments.

The processor 1120 may be embodied as any type of processor capable of performing the functions described herein. The processor 1120 may be embodied as a single or multi-core processor(s), digital signal processor, microcontroller, or other processor or processing/controlling circuit. Similarly, the memory 1124 may be embodied as any type of volatile or non-volatile memory or data storage capable of performing the functions described herein. In operation, the memory 1124 may store various data and software used during operation of the application server 1102, such as operating systems, applications, programs, libraries, and drivers. The memory 1124 is communicatively coupled to the processor 1120 via the I/O subsystem 1122, which may be embodied as circuitry and/or components to facilitate input/output operations with the processor 1120, the memory 1124, and other components of the application server 1102. For example, the I/O subsystem 1122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 1122 may form a portion of a system-on-a-chip (SoC) and be incorporated, along with the processor 1120, the memory 1124, and other components of the application server 1102, on a single integrated circuit chip.

The data storage device 1126 may be embodied as any type of device or devices configured for short-term or long-term storage of data such as, for example, memory devices and circuits, memory cards, hard disk drives, solid-state drives, or other data storage devices. The communication subsystem 1128 of the application server 1102 may be embodied as any communication circuit, device, or collection thereof, capable of enabling communications between the application server 1102 and other remote devices over a network. The communication subsystem 1128 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the application server 1102 may also include one or more peripheral devices 1130. The peripheral devices 1130 may include any number of additional input/output devices, interface devices, and/or other peripheral devices. For example, in some embodiments, the peripheral devices 1130 may include a display, touch screen, graphics circuitry, keyboard, mouse, speaker system, microphone, network interface, and/or other input/output devices, interface devices, and/or peripheral devices.

As described further below, the staff device 1104 is configured to upload, review, and otherwise manage data stored by the application server 1102. The staff device 1104 may be embodied as any type of device capable of performing the functions described herein, such as, without limitation, a smartphone, a cellular phone, a tablet computer, a notebook computer, a laptop computer, a desktop computer, a consumer electronic device, a wearable computing device, a smart appliance, and/or any other computing device capable of performing the functions described herein. Accordingly, the staff device 1104 may include a processor, an I/O subsystem, a memory, a data storage device, communication circuitry, and/or other components and devices commonly found in a notebook computer or similar computing device. The individual components of the staff device 1104 may be similar to the corresponding components of the application server 1102, the description of which is applicable to the corresponding components of the staff device 1104 and is not repeated herein so as not to obscure the present disclosure.

As described further below, the user device 1106 is configured to allow a user to send and receive images, questionnaire responses, and other data with the application server 1102. The user device 1106 may be embodied as any type of device capable of performing the functions described herein, such as, without limitation, a smartphone, a cellular phone, a tablet computer, a notebook computer, a laptop computer, a desktop computer, a consumer electronic device, a wearable computing device, a smart appliance, and/or any other computing device capable of performing the functions described herein. Accordingly, the user device 1106 may include a processor, an I/O subsystem, a memory, a data storage device, communication circuitry, and/or other components and devices commonly found in a smartphone or similar computing device. The individual components of the user device 1106 may be similar to the corresponding components of the application server 1102, the description of which is applicable to the corresponding components of the user device 1106 and is not repeated herein so as not to obscure the present disclosure.

As described further below, the provider device 1108 is configured to allow a provider to review image assessments and treatment plans and to otherwise access the application server 1102. The provider device 1108 may be embodied as any type of device capable of performing the functions described herein, such as, without limitation, a smartphone, a cellular phone, a tablet computer, a notebook computer, a laptop computer, a desktop computer, a consumer electronic device, a wearable computing device, a smart appliance, and/or any other computing device capable of performing the functions described herein. Accordingly, the provider device 1108 may include a processor, an I/O subsystem, a memory, a data storage device, communication circuitry, and/or other components and devices commonly found in a notebook computer or similar computing device. The individual components of the provider device 1108 may be similar to the corresponding components of the application server 1102, the description of which is applicable to the corresponding components of the provider device 1108 and is not repeated herein so as not to obscure the present disclosure.

The dental lab 1110 may be embodied as any dental analysis and/or manufacturing facility that is capable of generating orthodontic treatment plans or otherwise performing the functions described herein. In particular, the dental lab 1110 may include or otherwise have access to one or more computing devices capable of executing software to generate orthodontic treatment plans.

As discussed in more detail below, the application server 1102, the staff device 1104, the user device 1106, and the provider device 1108 may be configured to transmit and receive data with each other and/or other devices of the system 1100 over the network 1112. The network 1112 may be embodied as any number of various wired and/or wireless networks. For example, the network 1112 may be embodied as, or otherwise include, a wired or wireless local area network (LAN), and/or a wired or wireless wide area network (WAN). As such, the network 1112 may include any number of additional devices, such as additional computers, routers, and switches, to facilitate communications among the devices of the system 1100. In the illustrative embodiment, the network 1112 is embodied as a local Ethernet network.

Figure 23:
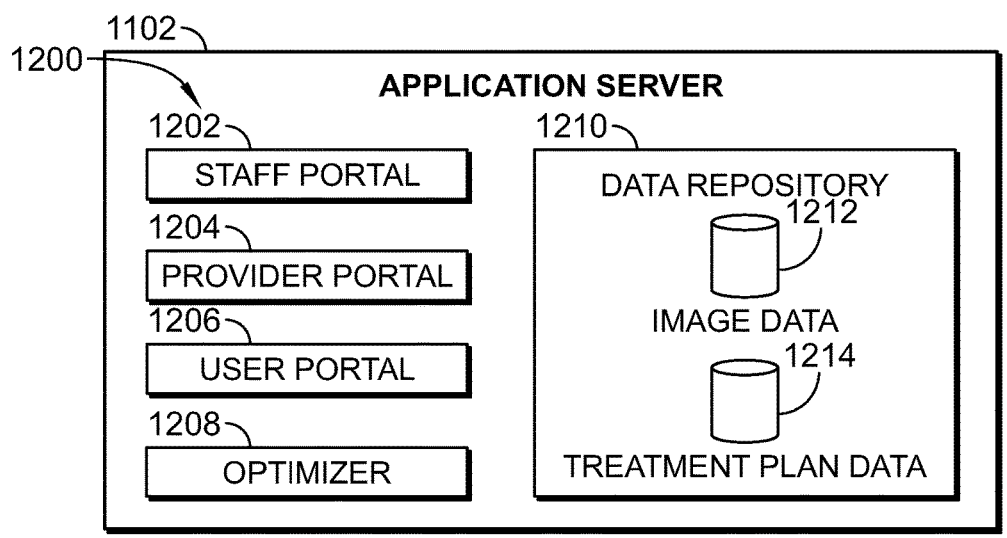
FIG. 23 is a simplified block diagram of at least one embodiment of an environment that may be established by an application server of FIG. 22.

Referring now to FIG. 23, in an illustrative embodiment, the application server 1102 establishes an environment 1200 during operation. The illustrative environment 1200 includes a staff portal 1202, a provider portal 1204, a user portal 1206, an optimizer 1208, and a data repository 1210. The various components of the environment 1200 may be embodied as hardware, firmware, software, or a combination thereof. As such, in some embodiments, one or more of the components of the environment 1200 may be embodied as circuitry or collection of electrical devices (e.g., staff portal circuitry 1202, provider portal circuitry 1204, user portal circuitry 1206, optimizer circuitry 1208, and/or data repository circuitry 1210). It should be appreciated that, in such embodiments, one or more of the staff portal circuitry 1202, the provider portal circuitry 1204, the user portal circuitry 1206, the optimizer circuitry 1208, and/or the data repository circuitry 1210 may form a portion of one or more of the processor 1120, the I/O subsystem 1122, and/or other components of the application server 1102. Additionally, in some embodiments, one or more of the illustrative components may form a portion of another component and/or one or more of the illustrative components may be independent of one another.

The data repository 1210 is configured to manage and store case data related to each user. The data repository 1210 may be configured to receive multiple images that represent the teeth of a user. The data repository 1210 may be further configured to receive a treatment plan for the user. The treatment plan may include a sequence of three-dimensional models indicative of the teeth of the user. Thus, the data repository 1210 may store, among other data, image data 1212 and/or treatment plan data 1214.

The staff portal 1202 is configured to manage data access and other communications with the staff devices 1104. In particular, the staff portal 1202 may be configured to provide the images that represent the teeth of the user to a staff device 1104. The staff portal 1202 is further configured to receive an approval from the staff device 1104 indicating that a person (e.g., a staff professional person and/or hygienist) has approved the images for assessment by a provider (e.g., an orthodontist).

The provider portal 1204 is configured to manage data access and other communications with the provider devices 1108. In particular, the provider portal 1204 may be configured to provide the images to a provider device 1108 in response receiving the approval from the staff device 1104. The provider portal 1204 may be further configured to receive an approval from the provider device 1108 indicating that the provider successfully performed an assessment of the fitness of the user for treatment. A treatment plan may be received in response to that approval, and the provider portal 1204 may be further configured to provide the treatment plan to the provider device 1108 and to receive an approval from the provider device 1108 indicating that the provider approved the treatment plan.

The user portal 1206 is configured to manage data access and other communications with the user devices 1106. In particular, the user portal 1206 may be configured to receive the images indicative of the teeth of the user from a user device 1106. In some embodiments, the images may include an upper, open view image, a lower, open view image, and a straight-on, closed view image. The user portal 1206 may be further configured to receive a dental history questionnaire response from the user device 1106. The dental history questionnaire response may be included with the images to the staff device 1104 and/or to the provider device 1108. The user portal 1206 is further configured to provide a visualization of the treatment plan to the user device 1106 in response to receiving approval of the treatment plan from the provider device 1108.

The optimizer 1208 is configured to optimize the sequence of three-dimensional models to generate an optimized sequence of three-dimensional models. The visualization of the treatment plan may use the optimized sequence of three-dimensional models.

Figure 24A:
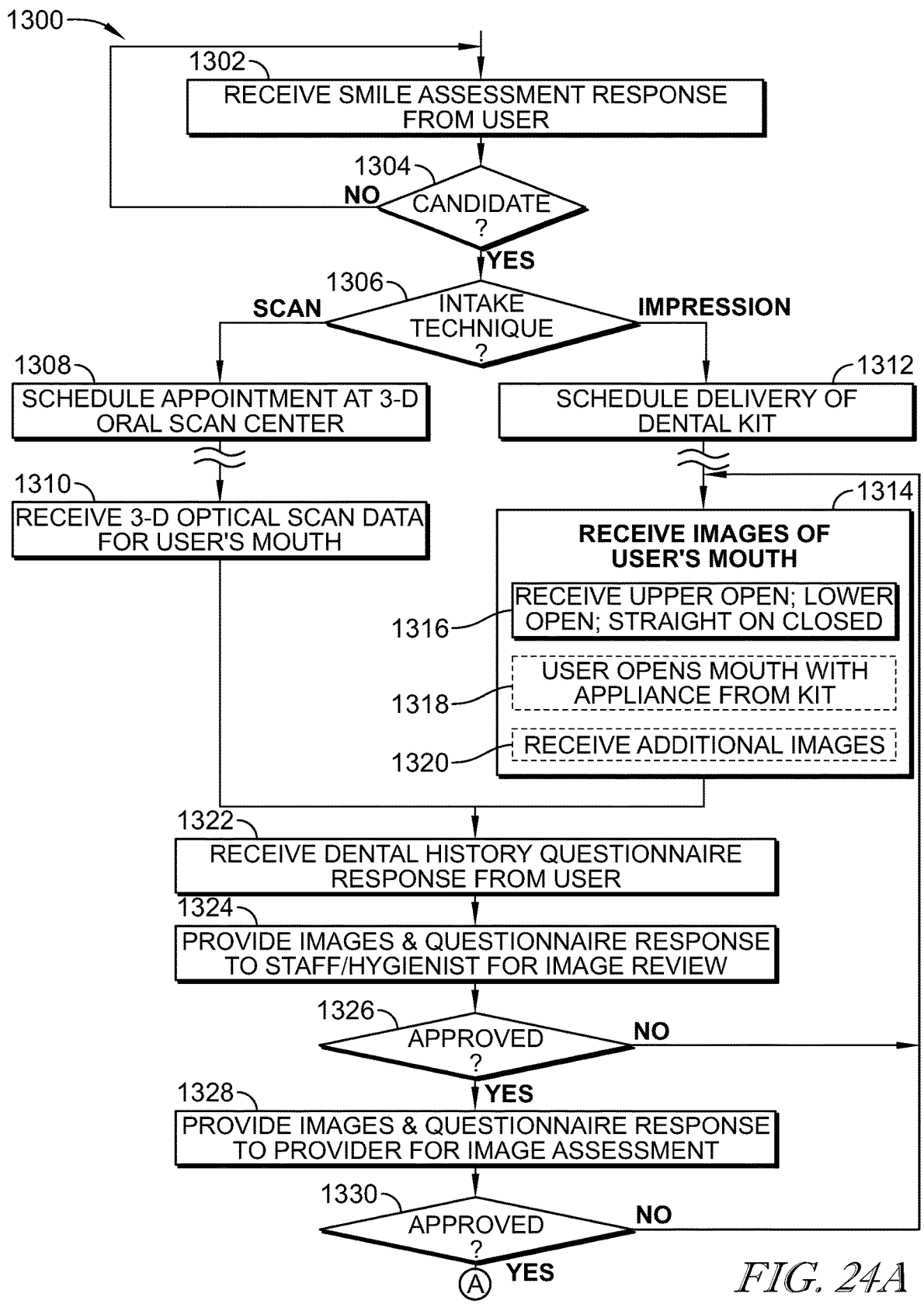
FIGS. 24A and 24B are a simplified flow diagram of at least one embodiment of a method for remote orthodontic treatment and assessment that may be executed by the application server of FIGS. 22-23.
Figure 24B:
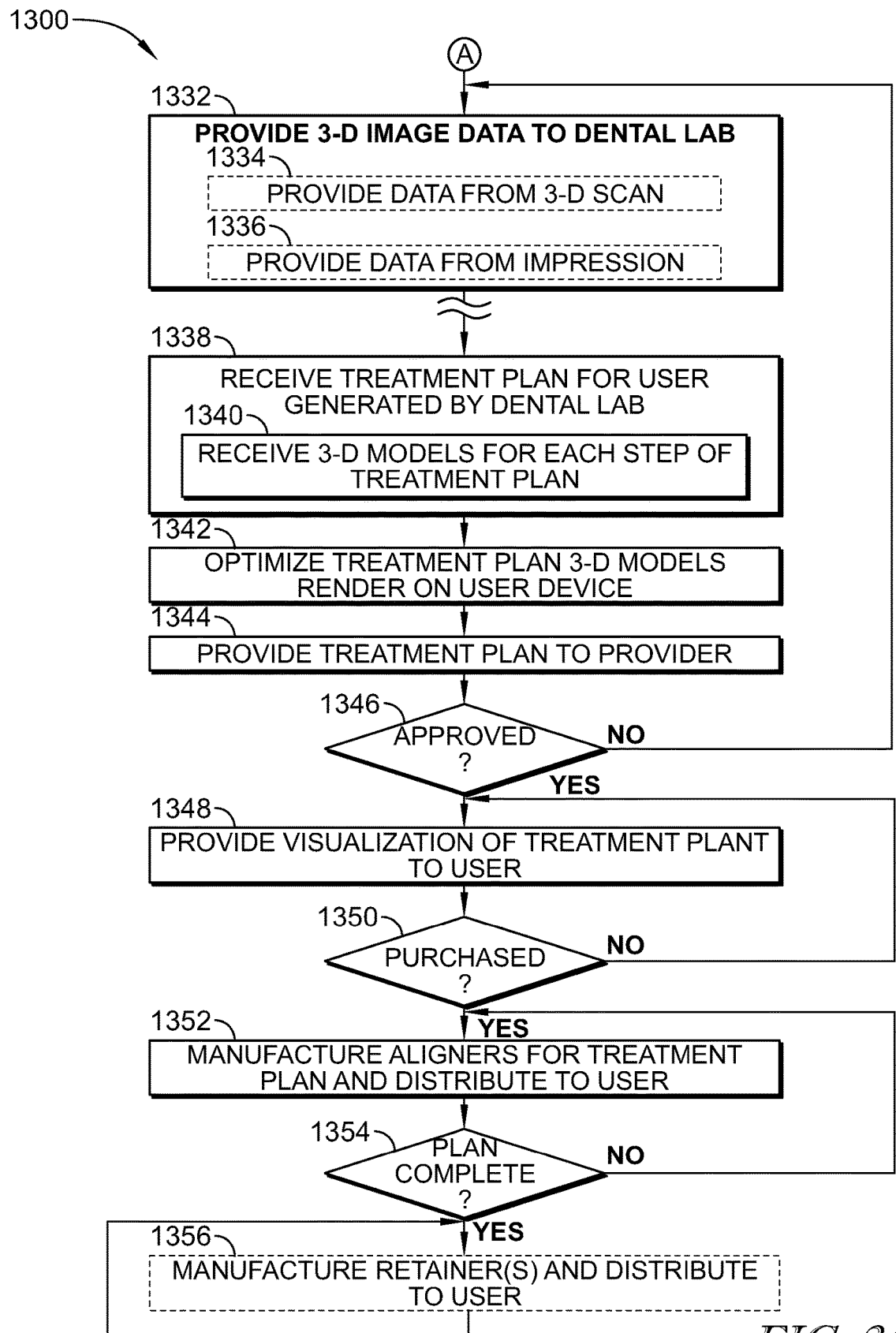

Referring now to FIGS. 24A and 24B, in use, the application server 1102 may execute a method 1300 for remote orthodontic treatment and assessment. It should be appreciated that, in some embodiments, the operations of the method 1300 may be performed by one or more components of the environment 1200 of the application server 1102 as shown in FIG. 23. The method 1300 begins in block 1302, in which the application server 1102 receives a smile assessment response from a user device 1106. The smile assessment response may be embodied as a web form, electronic message, or other data submitted by the user device 1106 that is indicative of whether the user is a potential candidate for orthodontic treatment. For example, the smile assessment response may include answers to questions indicating the current condition of the user's mouth and the user's chief complaint (i.e., the user's biggest concern with his or her smile). The smile assessment response may be submitted in response to a web form or other web page that includes appropriate questions and instructions. One potential embodiment of a smile assessment web page is described below in connection with FIG. 26. After receiving the smile assessment response, in block 1304 the application server 1102 determines whether the user is a potential candidate for orthodontic treatment based on the smile assessment response. If the application server 1102 determines that the user is not a good candidate, the method 1300 loops back to block 1302, in which the application server 1102 may receive additional smile assessment responses from the same user device 1106 and/or other user devices 1106. If the application server 1102 determines that the user is a good candidate, the method 1300 advances to block 1306.

In block 1306, the application server 1102 determines an appropriate intake technique for the user. In the illustrative embodiment, potential intake techniques include performing a three-dimensional (3D) scan of the user's teeth and mouth at an oral scan center, or delivering a dental impression kit 10, as described above. The application server 1102 may allow the user to select an intake technique using the user device 1106, for example by selecting an option from a web page. In some embodiments, the application server 1102 may determine whether the user is located near an oral scan center and, if near a scan center, present the user with the scan option. If the application server 1102 determines to use the dental impression kit 10, the method 1300 branches to block 1312, described below. If the application server 1102 determines to use the 3D scan, the method 1300 branches to block 1308.

In block 1308, the application server 1102 allows the user to schedule an appointment at a 3D oral scan center. The application server 1102 may use any technique to schedule the appointment. For example, the application server 1102 may provide a web application or other interface to the user device 1106 to allow the user to select a date and time for the appointment. The application server 1102 may store the appointment information and provide reminders to the user as appropriate. At the appointment, a professional uses a 3D camera to capture a 3D optical scan of the user's mouth. The professional may be a hygienist or other trained professional, but is typically not an orthodontist. After the 3D scan appointment, in block 1310 the application server 1102 receives 3D optical scan data for the user's mouth. The 3D optical scan data may be embodied as any data file or collection of data files that include images of the patient's mouth as well as corresponding depth or other spatial information. After receiving the 3D optical scan data, the method 1300 advances to block 1322, described below.

Referring back to block 1306, if the application server 1102 determines to use the dental impression kit 10, the method 1300 branches to block 1312, in which the application server 1102 schedules delivery of a dental impression kit 10 to the user. After the user has received the dental impression kit 10, in block 1314 the application server 1102 receives images of the user's mouth and teeth. The user device 1106 may upload the images to the application server 1102, for example, through a web interface. In some embodiments, the application server 1102 may establish an account for the user. The application server 1102 may present the user with an account status user interface that provides access to an interface for uploading images. Images may be updated at any time after the account is created, for example after purchasing the dental impression kit 10, during use of the dental impression kit 10, and/or after creating a scan appointment. One potential embodiment of an account status user interface is described below in connection with FIG. 27. As part of the image upload web interface, the application server 1102 may provide instructions to the user on which views to capture and upload, and in some embodiments may provide tips to improve image quality. For example, the instructions may recommend that the user has another person assist in taking the images and/or may recommend using a flash or a bright light source such as a bathroom light or a window on a sunny day. As described above, the dental impression kit 10 may also include an instruction manual 54 that includes similar instructions and/or tips. In block 1316, the application server 1102 receives images for three views of the user's mouth: a view of the upper teeth with the mouth open, a view of the lower teeth with the mouth open, and a view of the teeth from straight on with the mouth closed. One potential embodiment of a web interface to provide instructions to the user and to upload images is described further below in connection with FIGS. 27A-27C. In some embodiments, in block 1318 the user may use the dental appliance 78 to separate the user's lips and open the user's mouth while taking the images, as described above. In some embodiments, in block 1320 the application server 1102 may receive additional images of the user's mouth and teeth, such as an upper, closed view; a left side, closed view; a right side, closed view; and/or a straight-on, full-smile view. As described further below, the additional images may be requested by a staff professional, a hygienist, and/or a provider while performing an image assessment. For example, the additional images may be requested for complicated cases. After receiving the images, the method 1300 advances to block 1322.

In block 1322, the application server 1102 receives a dental history questionnaire response from the user device 1106. The dental history questionnaire response may be embodied as any web form, electronic message, or other data submitted by the user device 1106. The dental history questionnaire response may include information related to the user's dental history that may be used by a staff professional, hygienist, and/or provider to determine the user's fitness for treatment. One potential embodiment of a dental history questionnaire is described below in connection with FIGS. 28A-28E.

In block 1324, the application server 1102 provides images of the user's mouth and teeth as well as the dental history questionnaire response to a staff professional and/or hygienist for review and approval. For example, the application server 1102 may establish a staff portal web site that is accessible by the staff device 1104. Because the images of the user's mouth and teeth and the dental history questionnaire response may include personal health information, the application server 1102 may restrict access to the staff portal or other user interfaces to authorized users (e.g., authorized staff professionals and/or hygienists). The staff professional/hygienist may review the images and questionnaire data to determine whether the images are sufficient to allow the provider to determine the user's fitness for treatment. For example, the staff professional/hygienist may determine whether each of the images are of the correct view and/or are of sufficient quality. The staff professional/hygienist may indicate whether each image is approved and may also request that the user provide additional views or other images. One potential embodiment of a web interface provided by the application server 1102 to perform the image review is described below in connection with FIGS. 29A and 29B. In block 1326, the application server 1102 determines whether the staff professional/hygienist approved the images. If not, the method 1300 may loop back to block 1314, in which the application server 1102 receives additional images from the user device 1106. If the staff professional/hygienist approved the images, the method 1300 advances to block 1328.

In block 1328, the application server 1102 provides images of the user's mouth and teeth as well as the dental history questionnaire response to a provider for assessment and approval. For example, the application server 1102 may establish a provider portal web site that is accessible by the provider device 1108. Because the images of the user's mouth and teeth and the dental history questionnaire response may include personal health information, the application server 1102 may restrict access to the provider portal or other user interfaces to authorized users (e.g., authorized providers). The provider may review the images and questionnaire data to determine the user's fitness for treatment. For example, the provider may determine whether the user's mouth and/or desired treatment outcome are fit for treatment with invisible plastic aligners. Continuing that example, the user may not be fit for treatment, for example, if the user's mouth and/or desired treatment outcome requires pulling teeth, interproximal reduction, or performing other procedures that cannot be achieved with aligners. To perform the assessment, the provider may access a provider portal with a web interface similar to the web interface shown in FIGS. 29A and 29B. Features of the provider portal are also described below in connection with FIGS. 30A-30E. In block 1330, the application server 1102 determines whether the provider approved the images. If not, the method 1300 may loop back to block 1314, in which the application server 1102 receives additional images from the user device 1106. If the provider approved the images, the method 1300 advances to block 1332, shown in FIG. 24B.

Referring now to FIG. 24B, in block 1332 the application server 1102 provides 3D image data for the user's mouth to the dental lab 1110. The application server 1102 may use any technique to provide the data, for example by transferring data over the network 1112 to a server or other computing device of the dental lab 1110. The 3D image data may be generated using any appropriate technique. In some embodiments, in block 1334 the application server 1102 provides data generated during a 3D optical scan, which was received by the application server 1102 as described above in connection with block 1310. In some embodiments, in block 1336 the application server 1102 provides data generated based on impressions created using the dental impression kit 10, which was scheduled for delivery as described above in connection with block 1312. In some embodiments, the dental impressions themselves may be provided to the dental lab 1110, and the dental lab 1110 may generate the 3D image data based on the impressions (and/or on the images provided by the user). After receiving the 3D image data, the dental lab 1110 may use typical dental software to generate a treatment plan.

After the dental lab 1110 creates the treatment plan, in block 1338 the application server 1102 receives the treatment plan generated by the dental lab 1110. The treatment plan may be embodied as any data indicative of a series of steps used to correct or otherwise modify the positions of the user's teeth. In particular, the treatment plan may represent the user's teeth and how they move through the duration of the treatment plan. The treatment plan may be directed to the user's upper teeth, lower teeth, or both upper and lower teeth. In block 1340, the application server 1102 receives a 3D model of the user's mouth and teeth for each step of the treatment plan. Thus, the treatment plan may indicate the position of the user's teeth as they are modified over the course of treatment. The 3D models of the treatment plan may be embodied as STL files, OBJ files, or any other data file that is indicative of a three-dimensional object and/or scene.

In block 1342, the application server 1102 optimizes the treatment plan 3D models to render on the user device 1106. The application server 1102 may perform optimization to reduce the size of corresponding data files or to otherwise improve rendering performance on the user device 1106. One potential embodiment of a method for optimizing the treatment plan 3D models is described below in connection with FIG. 25.

After optimizing the treatment plan 3D models, in block 1344 the application server 1102 provides the treatment plan to the provider for approval. For example, the application server 1102 may establish a provider portal web site that is accessible by the provider device 1108. Because the treatment plan may include personal health information, the application server 1102 may restrict access to the provider portal or other user interfaces to authorized users (e.g., authorized providers). Using the provider portal, the provider may review 3D images of the steps of the treatment plan, and may approve the plan, reject the plan, request modifications to the plan, or otherwise review the treatment plan. One potential embodiment of a user interface for the provider portal is described below in connection with FIGS. 30A-30E. In block 1346, the application server 1102 determines whether the provider has approved the treatment plan. If not, the method 1300 loops back to block 1332, in which the dental lab 1110 may modify the treatment plan or otherwise generate a new treatment plan. If the treatment plan is approved, the method 1300 advances to block 1348.

In block 1348, the application server 1102 provides a visualization of the treatment plan to the user. For example, the application server 1102 may establish a user portal web site that is accessible by the user device 1106. Because the treatment plan may include personal health information, the application server 1102 may restrict access to the user portal or other user interfaces to the authorized user. The visualization may allow the user to view the 3D models of the user's mouth and teeth for each step of the treatment process from multiple angles. As described above in connection with block 1342, the 3D models of the treatment plan are optimized for rendering by the user device 1106, which provides the user with a responsive user interface. As described above, the application server 1102 may establish an account for the user, and an account status user interface may provide access to the treatment plan visualization user interface. One potential embodiment of an account status user interface is described below in connection with FIG. 32. One potential embodiment of a treatment plan visualization user interface is described below in connection with FIG. 33.

In block 1350, the application server 1102 determines whether the user has purchased the approved treatment plan. The user may purchase the treatment plan, for example, through an account user interface provided by the application server 1102 to the user device 1106. If the user has not purchased the approved treatment plan, the method 1300 loops back to block 1348, in which the application server 1102 may continue to provide the visualization of the treatment plan to the user. If the treatment plan is purchased, the method 1300 advances to block 1352.

In block 1352, one or more aligners are manufactured for the treatment plan and distributed to the user. Any appropriate technique may be used to manufacture and distribute the aligners. For example, the aligners may be manufactured by 3D printing physical models of the user's teeth and then molding plastic aligners using the physical models of the user's teeth. Multiple aligners may be distributed to the user each month. For example, the user may be sent three aligners each month, with the first aligner to be worn for one week, the second aligner to be worn for one week, and the third aligner to be worn for two weeks. During the manufacturing and distribution process, the application server 1102 may coordinate access to order information, the treatment, plan, and other data associated with the user. In block 1354, it is determined whether the treatment plan is complete. For example, a treatment plan may have a duration of five months. If the plan is not complete, the method 1300 loops back to block 1352 to continue manufacturing and distributing aligners. If the plan is complete, the method 1300 may advance to block 1356, in which one or more retainers may be manufactured and distributed to the user. In some embodiments, the application server 1102 may perform a check-in process after a predetermined amount of time has elapsed during treatment, for example a 90-day check in process. As part of the check-in process, the patient may answer a questionnaire and submit photos that are reviewed by a dental professional. Thus, the application server 1102 may monitor the progress of the patient during treatment. One potential embodiment of a user interface for the check-in progress is shown in FIGS. 37A-37D. The method 1300 may loop back to block 1356 to continue manufacturing and distributing retainers, or in some embodiments may be completed. It should be understood that the method 1300 illustrates techniques for remote orthodontic treatment and assessment for a single user; it should be understood that the application server 1102 may execute multiple instances of the method 1300 for multiple users.

Figure 25:
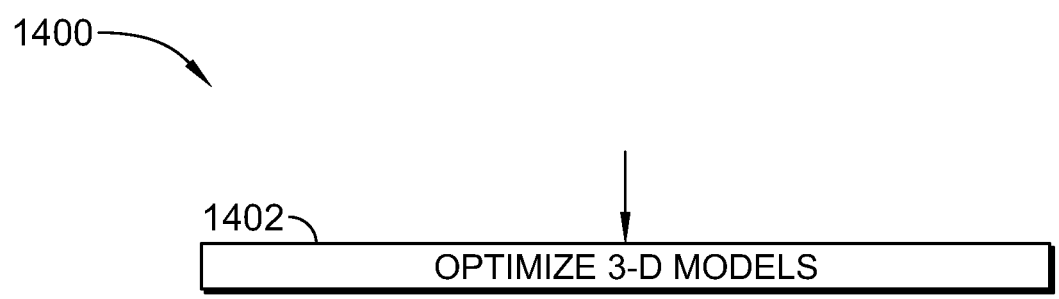
FIG. 25 is a simplified flow diagram of at least one embodiment of a method for 3D model optimization that may be executed by the application server of FIGS. 22-23.

Referring now to FIG. 25, in use, the application server 1102 may execute a method 1400 for 3D model optimization. The method 1400 may be executed, for example, in connection with block 1342 of the method 1300, described above in connection with FIG. 24B. It should be appreciated that, in some embodiments, the operations of the method 1400 may be performed by one or more components of the environment 1200 of the application server 1102 as shown in FIG. 23. The method 1400 begins in block 1402, in which the application server 1102 optimizes the 3-D models of a treatment plan.

Figure 26:
FIG. 26 is a screen shot of a smile assessment user interface that may be generated by the application server of FIGS. 22-23.

Referring now to FIG. 26, a user interface 1500 for a smile assessment is shown. The user interface 1500 may be used to receive a smile assessment response as described above in connection with block 1302 of FIG. 24A. The illustrative user interface 1500 is a web page provided by the application server 1102 to the user device 1106; however, it should be understood that the user interface 1500 may be embodied as native application, managed application, or other interface of the user device 1106. As shown, the user interface 1500 includes multiple input elements 1502 that allow the user to provide information regarding current condition of the user's mouth and the user's chief complaint. The user interface 1500 includes a submit button 1504 that, when selected by the user, provides the smile assessment response to the application server 1102. In some embodiments, the user interface 1500 may include additional input elements 1506 (not shown) to collect additional information, such as user contact information, account information, or other information.

Referring now to FIG. 27, a user interface 1600 for account status is shown. The illustrative user interface 1600 is a web page provided by the application server 1102 to the user device 1106; however, it should be understood that the user interface 1600 may be embodied as native application, managed application, or other interface of the user device 1106. The user interface 1600 may be used to display the status of the user's account, including indicating additional information required from the user or otherwise indicating the next step to be performed by the user. For example, the illustrative user interface 1600 indicates that the user still needs to upload photos. The user interface 1600 includes a button 1602 that, when selected by the user, launches a user interface for uploading the photos. It should be understood that the user interface 1600 may include information and/or actions for other steps, such as scheduling a 3D scan appointment, reminding the user of a 3D scan appointment, indicating that images were received and are being reviewed, indicating that a treatment plan is being created, or other status information.

Figure 28A:
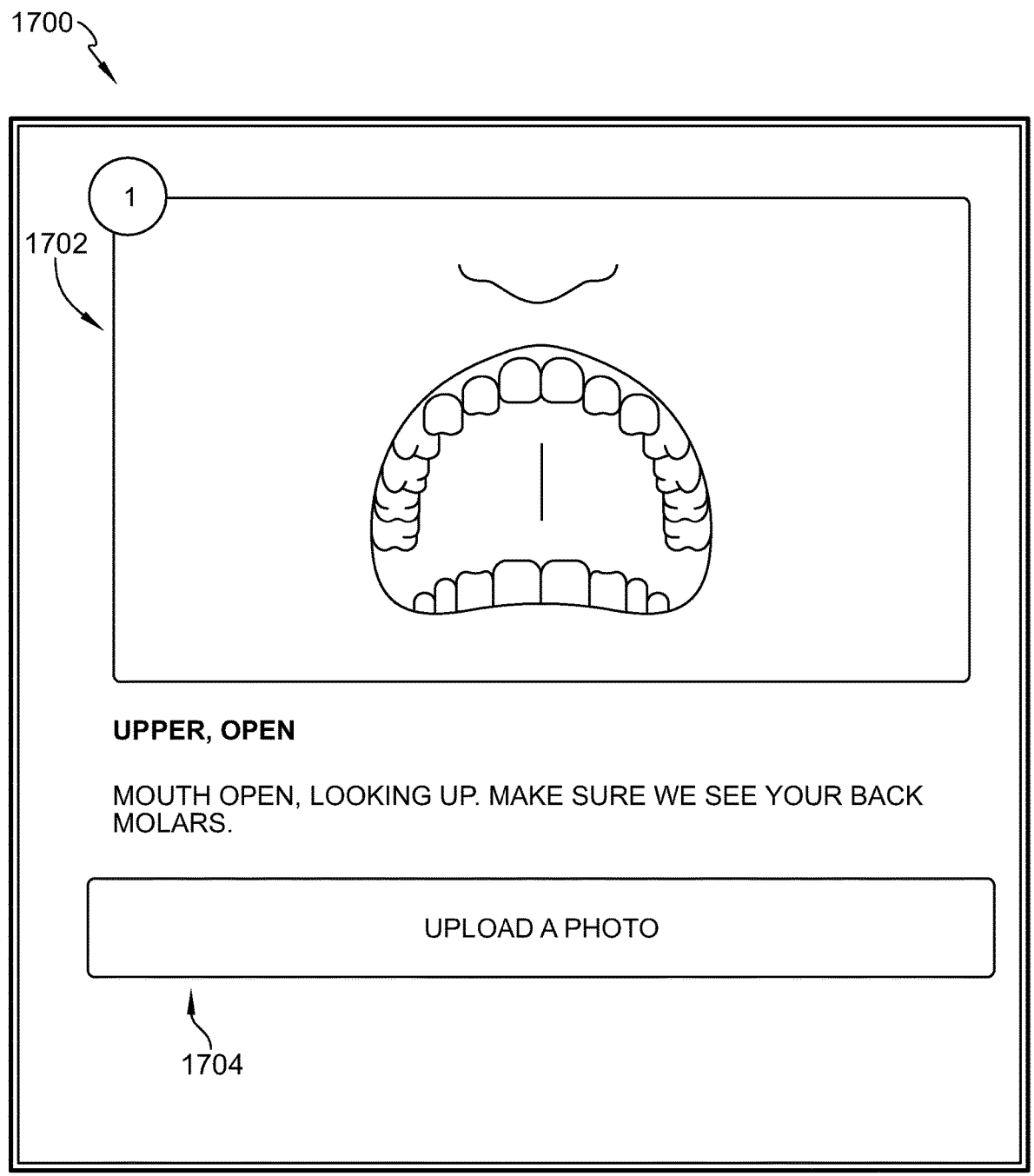
FIGS. 28A-28C are screen shots of an image upload user interface that may be generated by the application server of FIGS. 22-23.
Figure 28B:
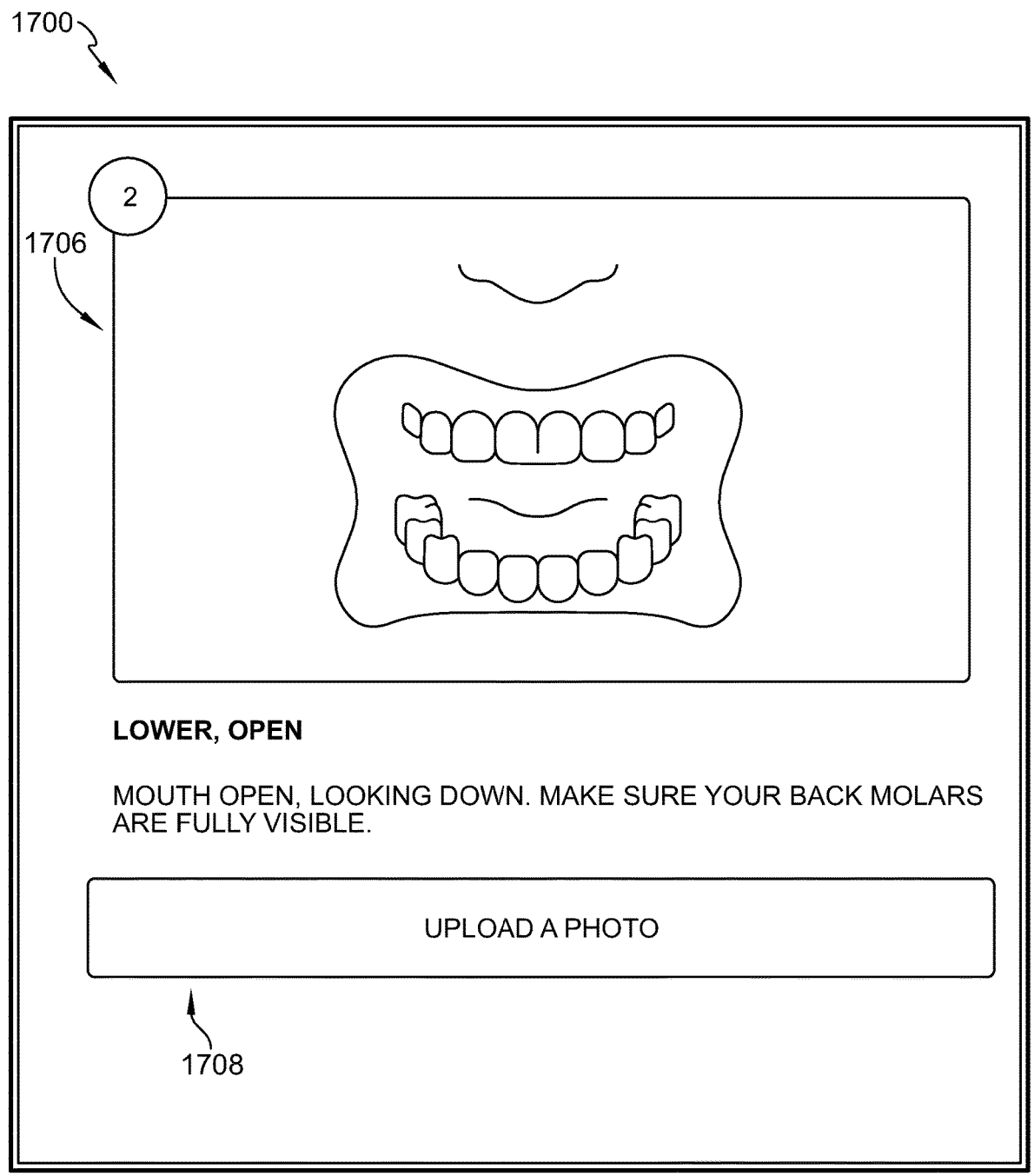
Figure 28C:
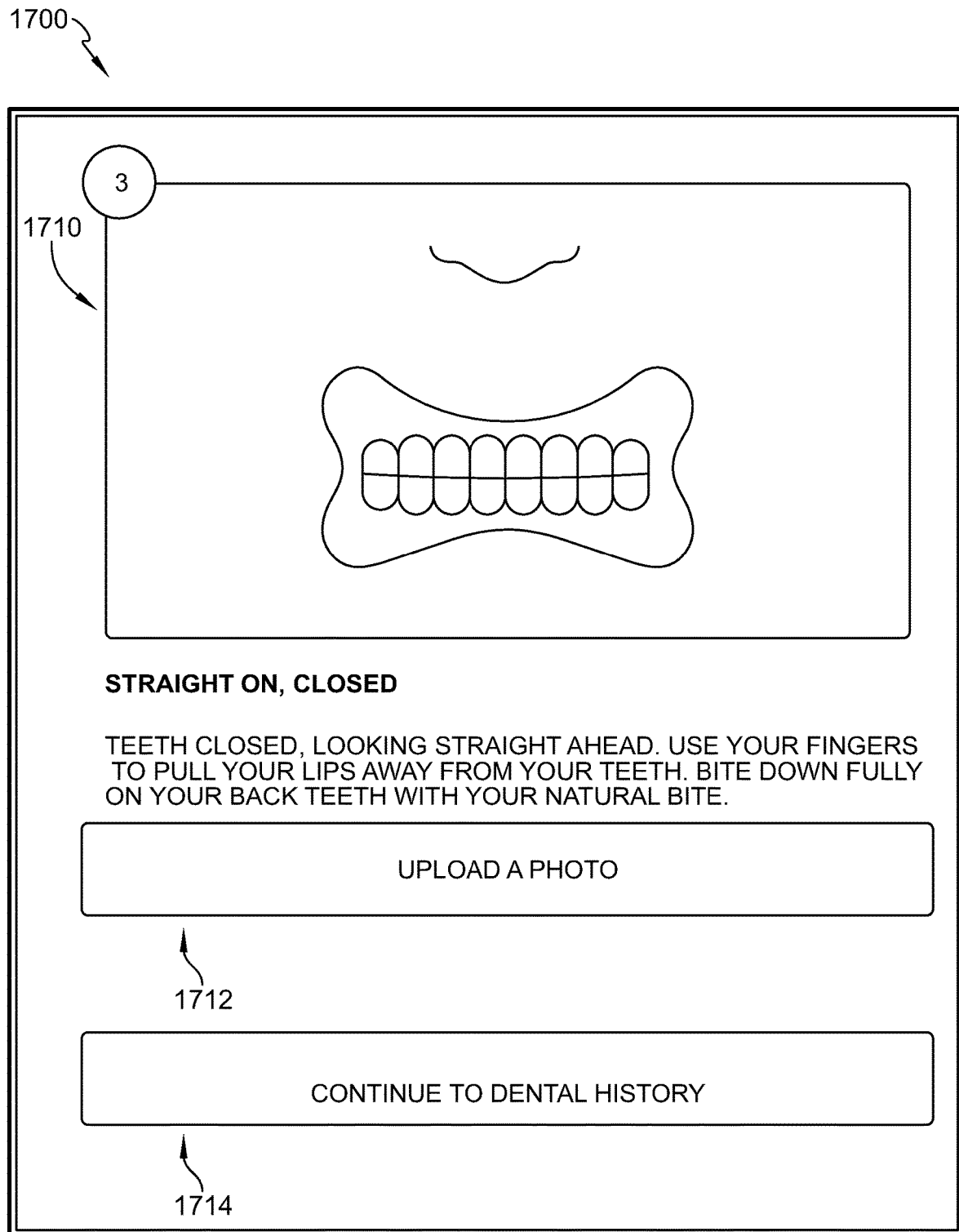

Referring now to FIGS. 27A-27C, a user interface 1700 for uploading images of the user's mouth and teeth is shown. The user interface 1700 may be used to receive images from the user device 1106 as described above in connection with block 1314 of FIG. 24A. The illustrative user interface 1700 is a web page provided by the application server 1102 to the user device 1106; however, it should be understood that the user interface 1700 may be embodied as native application, managed application, or other interface of the user device 1106. As shown, the user interface 1700 includes instructions 1702, 1706, 1710 and corresponding submit buttons 1704, 1708, 1712 for the three images that are used for photo assessment. In particular, the instructions 1702 and submit button 1704 shown in FIG. 28A are for an upper, open view; the instructions 1706 and submit button 1708 shown in FIG. 28B are for a lower, open view; and the instructions 1710 and submit button 1712 shown in FIG. 28C are for a straight-on, closed view. The user interface 1700 further includes a button 1714 to cause the user device 1106 to move on to the dental history questionnaire.

Referring now to FIGS. 28A-28C, a user interface 1800 for a dental history questionnaire is shown. The user interface 1800 may be used to receive a dental history questionnaire response as described above in connection with block 1322 of FIG. 24A. The illustrative user interface 1800 is a web page provided by the application server 1102 to the user device 1106; however, it should be understood that the user interface 1800 may be embodied as native application, managed application, or other interface of the user device 1106. As shown, the user interface 1800 includes multiple input elements 1802 that allow the user to provide information regarding the user's dental history. The user interface 1800 also includes a submit button 1804 that, when selected by the user, provides the dental history questionnaire response to the application server 1102. Referring now to FIGS. 28D-28E, another potential embodiment of a user interface 1800 for a dental history questionnaire is shown.

Figure 29A:
Figure 29C:
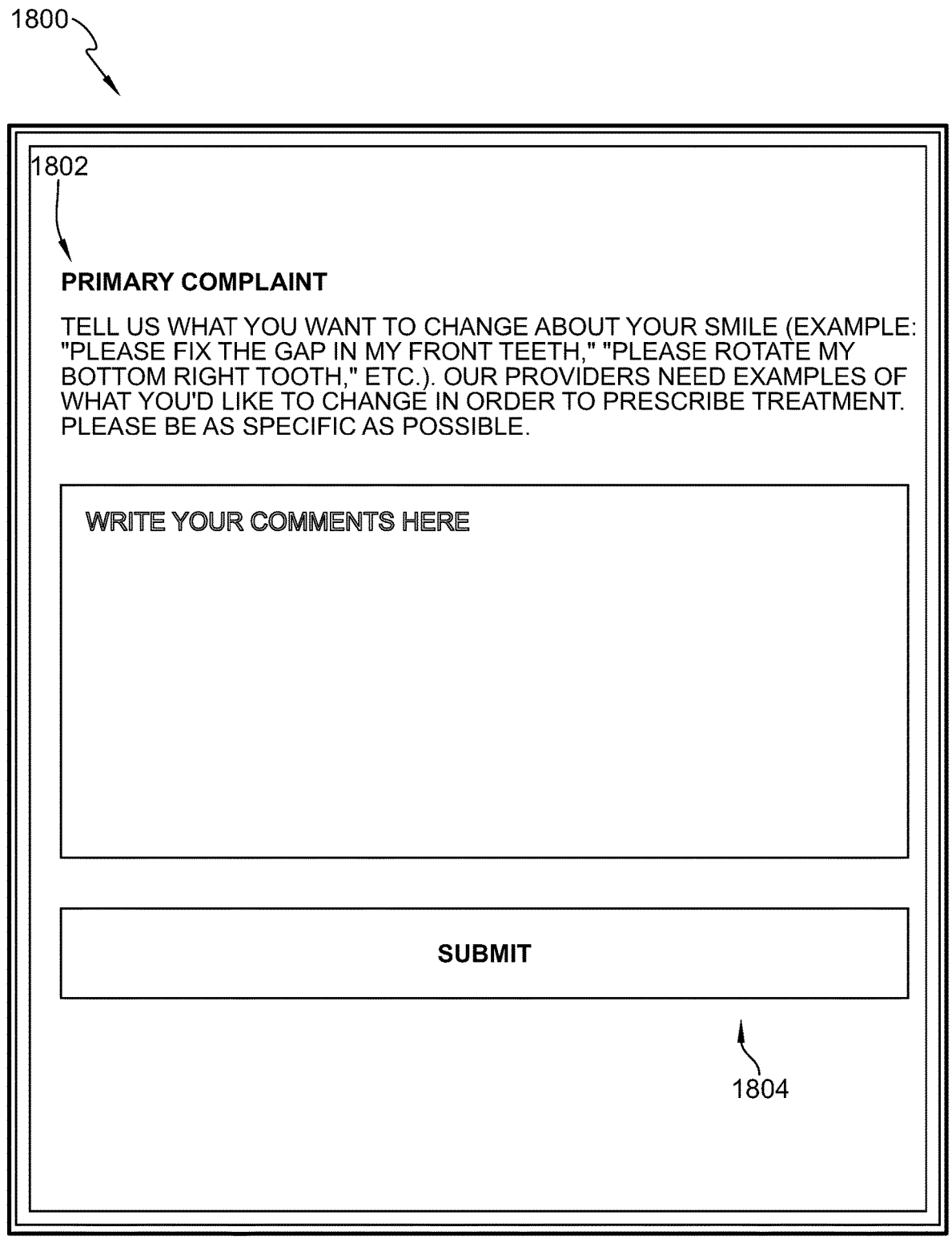

Referring now to FIGS. 29A and 29B, a user interface 1900 for photo assessment review is shown. The user interface 1900 may be used to provide data to the staff professional/hygienist and to receive approval as described above in connection with blocks 1322, 1324 of FIG. 24A. The illustrative user interface 1900 is a web page provided by the application server 1102 to the staff device 1104; however, it should be understood that the user interface 1900 may be embodied as native application, managed application, or other interface of the staff device 1104 and/or application server 1102. Additionally or alternatively, in some embodiments the user interface 1900 may be embodied as an embedded view within a staff portal user interface provided by the application server 1102.

Figure 30A:
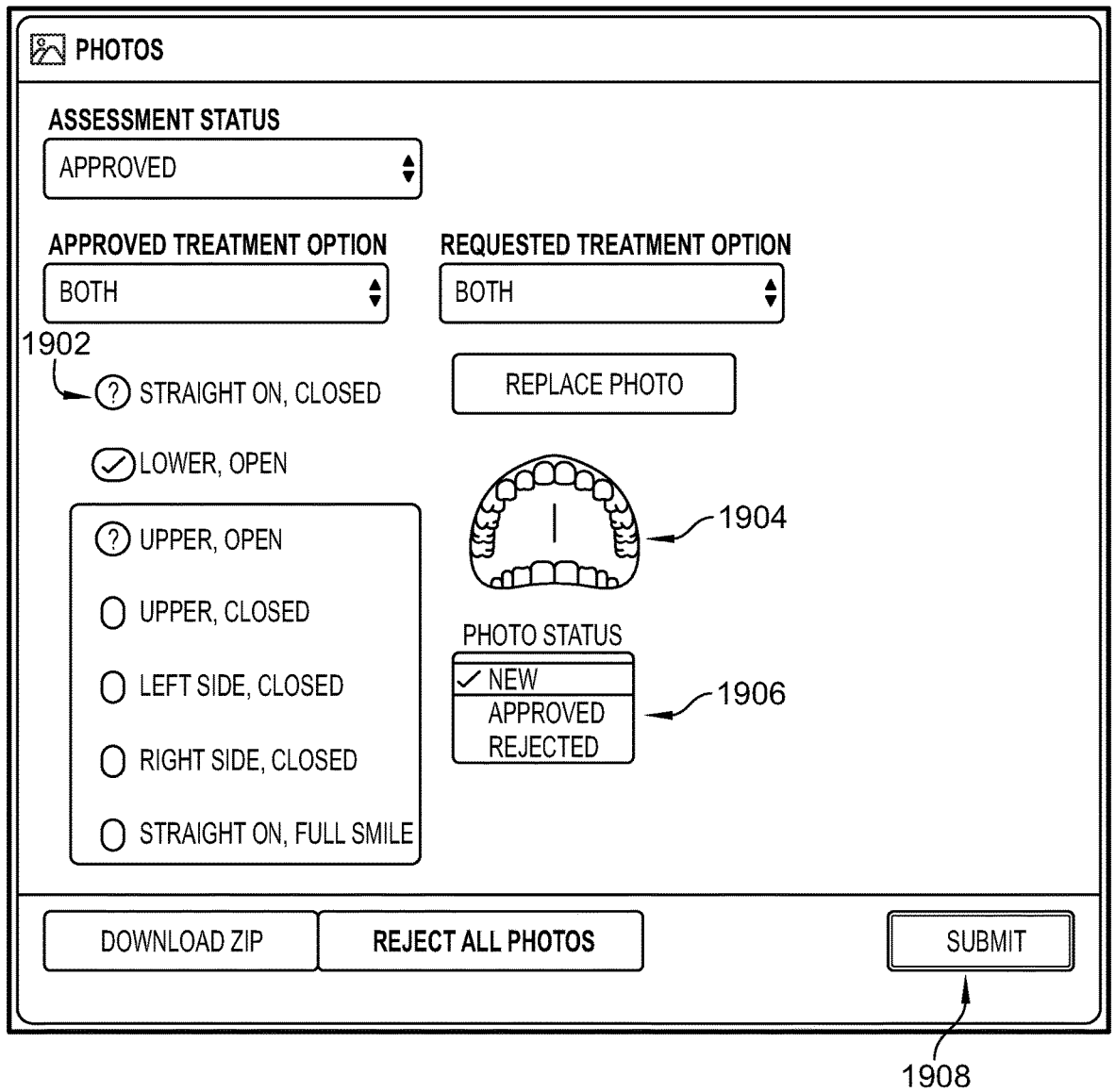

As shown in FIG. 30A, the user interface 1900 includes multiple indicator elements 1902 for the different views. Each indicator element 1902 may indicate whether the image for the associated view has been approved, rejected, or is pending review. As shown, the user interface 1900 includes indicator elements 1902 for seven potential views, including the three views described above in connection with FIGS. 27A-27C, as well as four additional views that may be requested for complex cases. The user interface 1900 further includes an image thumbnail 1904 for the selected view (which is illustratively a line drawing but could include a photographic image) and a popup list 1906 used to approve or reject the selected image. The user interface 1900 includes a submit button 1908 that, when selected by the staff professional/hygienist, provides the approval to the application server 1102. The user interface 1900 also includes a view 1910, shown in FIG. 30B, that displays the dental history questionnaire response for the user. The staff professional/hygienist may review data displayed in the view 1910 when performing the photo review.

Figure 31A:
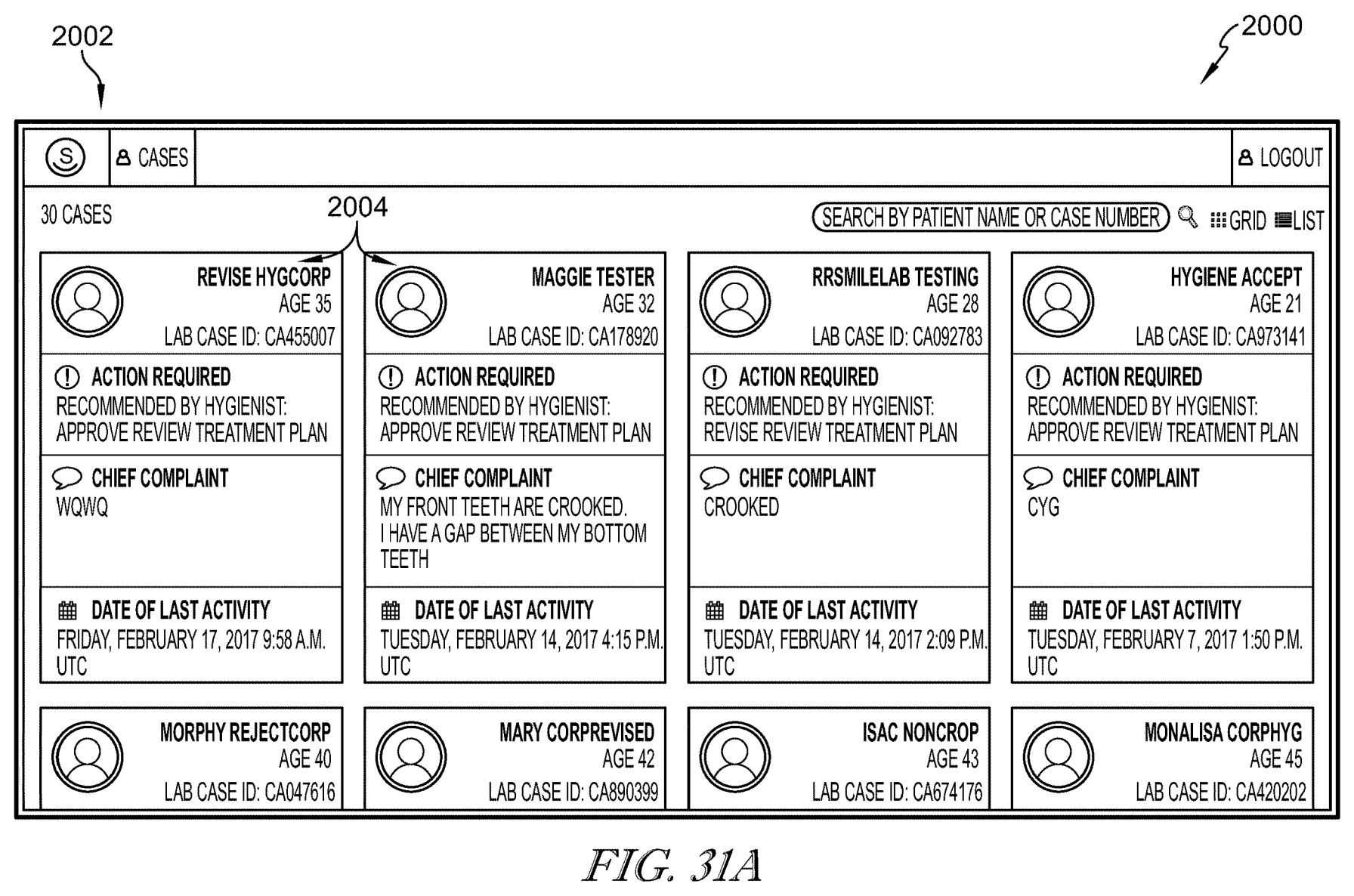
Figure 31B:
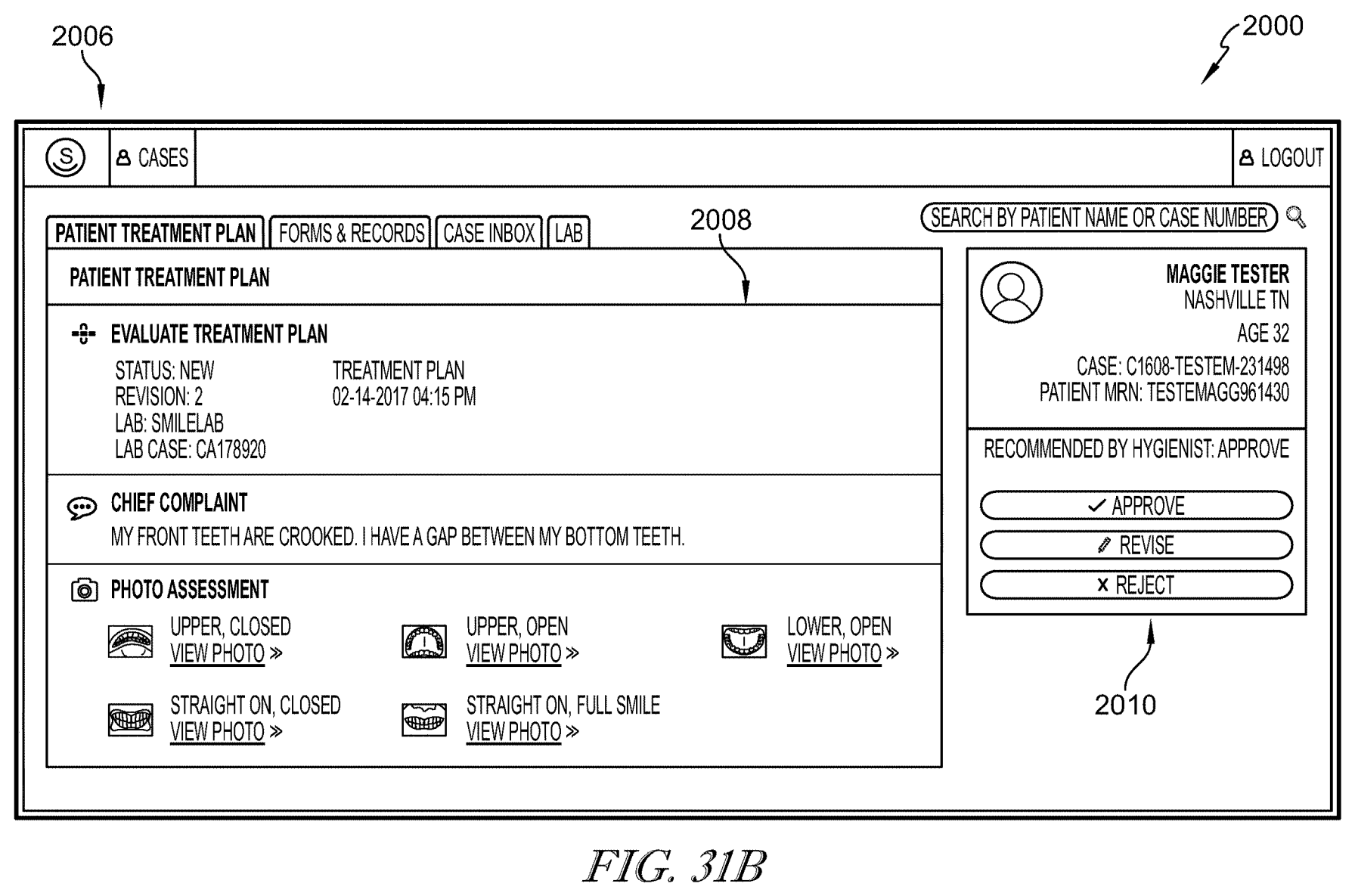
Figure 31C:
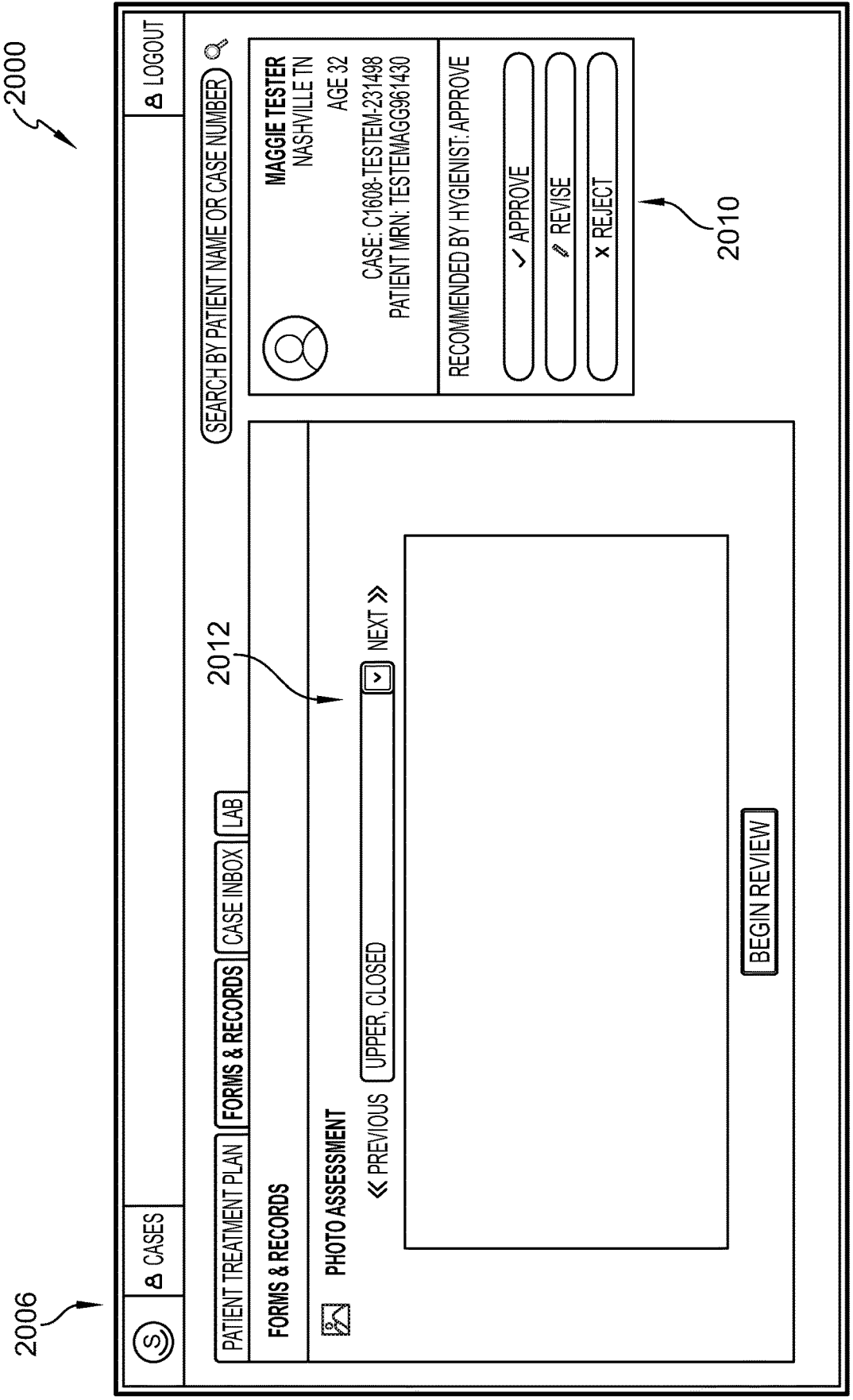

Referring now to FIGS. 31A-31E, a user interface 2000 for a provider portal is shown. The user interface 2000 may be used to allow a provider to perform a photo assessment, review a treatment plan, or otherwise interact with a user's case. The illustrative user interface 2000 is a web page provided by the application server 1102 to the provider device 1108; however, it should be understood that the user interface 2000 may be embodied as native application, managed application, or other interface of the provider device 1108. As shown in FIG. 31A, the user interface 2000 may include a case listing view 2002. The case listing view 2002 may include a case summary view 2004 for each user assigned to or otherwise associated with the provider. Selecting a case summary view 2004 may cause the provider device 1108 to display a corresponding case detail view 2006, shown in FIGS. 30B-30E.

Figure 31D:
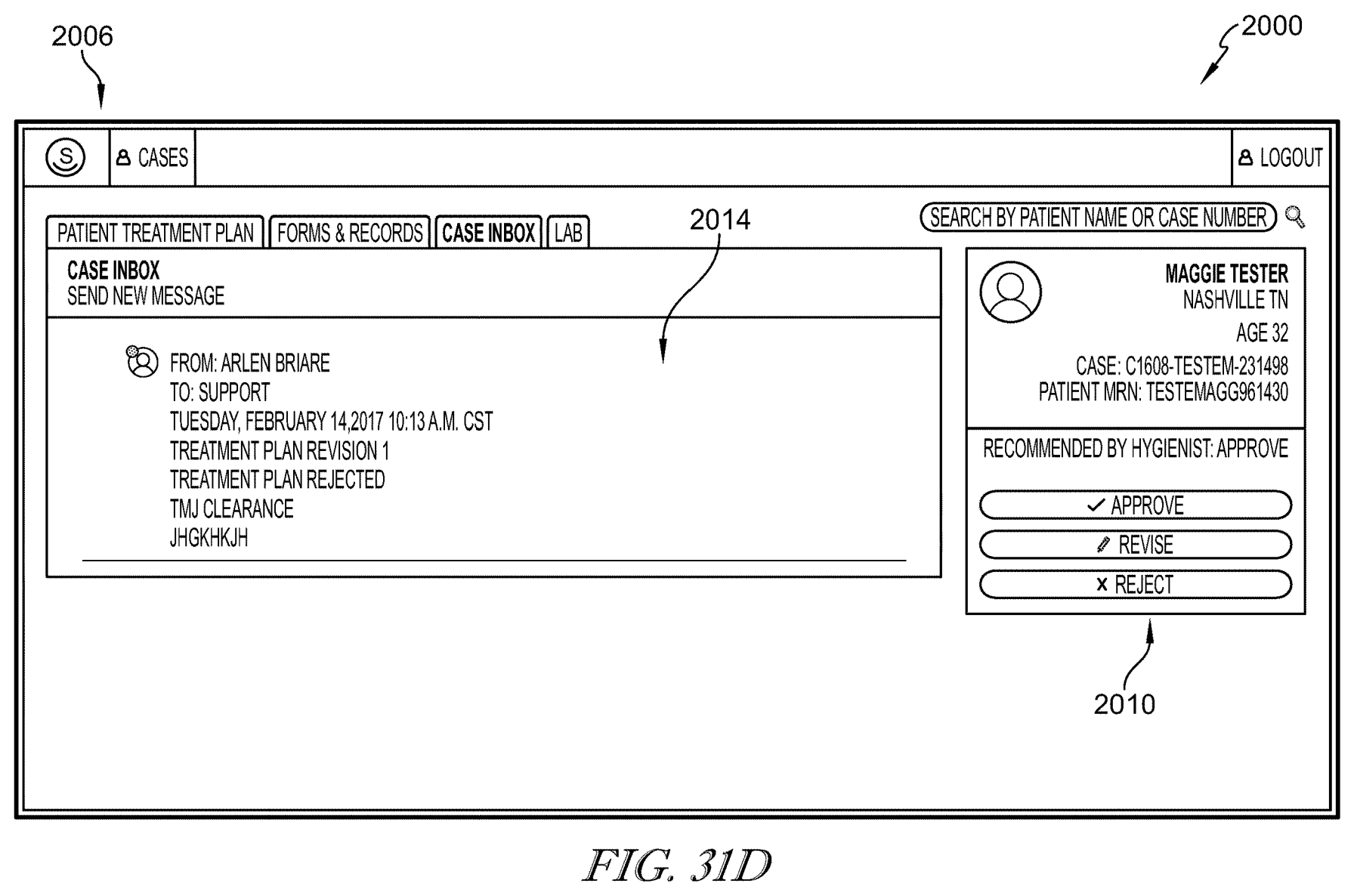
Figure 31E:
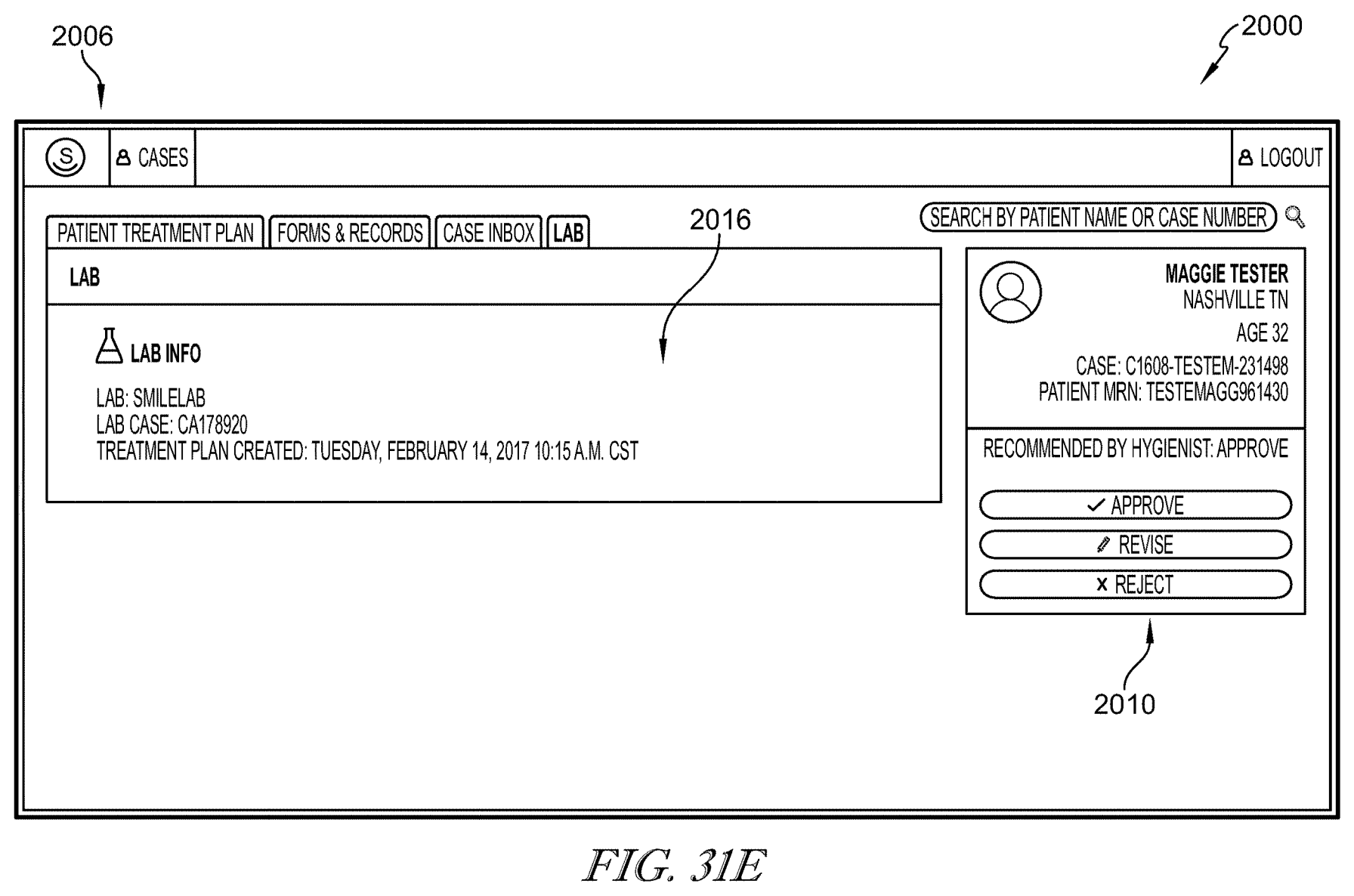

The case detail view 2006 may include a tabbed interface with multiple sub-views, including a patient treatment plan view 2008, shown in FIG. 31B. The patient treatment plan view 2008 may provide information on the treatment plan, the user's chief complaint, and the photo assessment, and may also allow the provider to initiate evaluation of the treatment plan and the photo assessment. The case detail view 2006 also includes an action box 2010, which includes buttons to allow the provider to approve or reject the treatment plan. As shown in FIG. 31C, the case detail view 2006 may include a form and record view 2012, which may display images (including treatment plan images and/or photo assessment images) and other documents for the provider to review. As shown in FIG. 31D, the case detail view 2006 may include a case inbox view 2014 that displays communications relevant to the user's case that are managed by the application server 1102. As shown in FIG. 31E, the case detail view 2006 may include a lab view 2016 that displays information for the dental lab 1110 assigned to the case.

Figure 32:
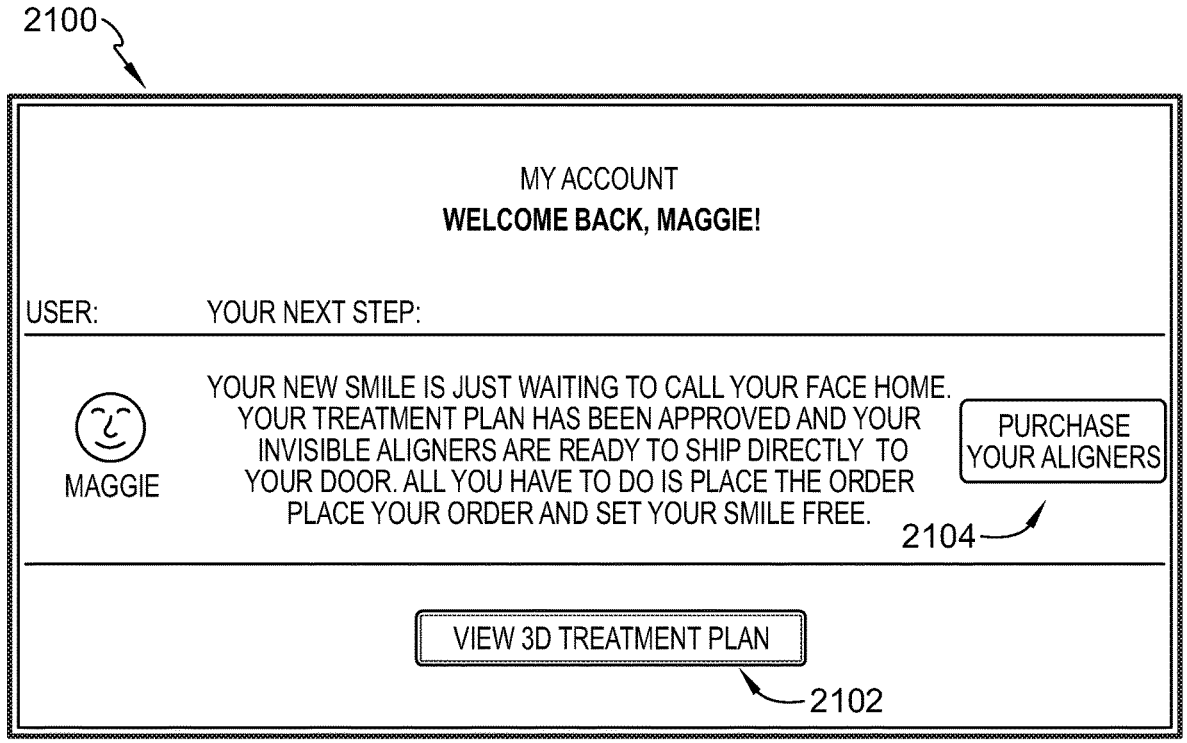
FIG. 32 is a screen shot of an account status user interface that may be generated by the application server of FIGS. 22-23.

Referring now to FIG. 32, a user interface 2100 for account status is shown. The illustrative user interface 2100 is a web page provided by the application server 1102 to the user device 1106; however, it should be understood that the user interface 2100 may be embodied as native application, managed application, or other interface of the user device 1106. The user interface 2100 may be used to display the status of the user's account, including indicating additional information required from the user or otherwise indicating the next step to be performed by the user. For example, the illustrative user interface 2100 indicates that the user's treatment plan is completed and ready for viewing. The user interface 2100 includes a button 2102 that, when selected by the user, launches a user interface for viewing the treatment plan. The user interface 2100 also includes a button 2104 that, when selected by the user, launches a user interface to purchase aligners for the treatment plan. The user interface for purchasing the aligners may collect account information, payment information, and perform other e-commerce functions as described above.

Figure 33:
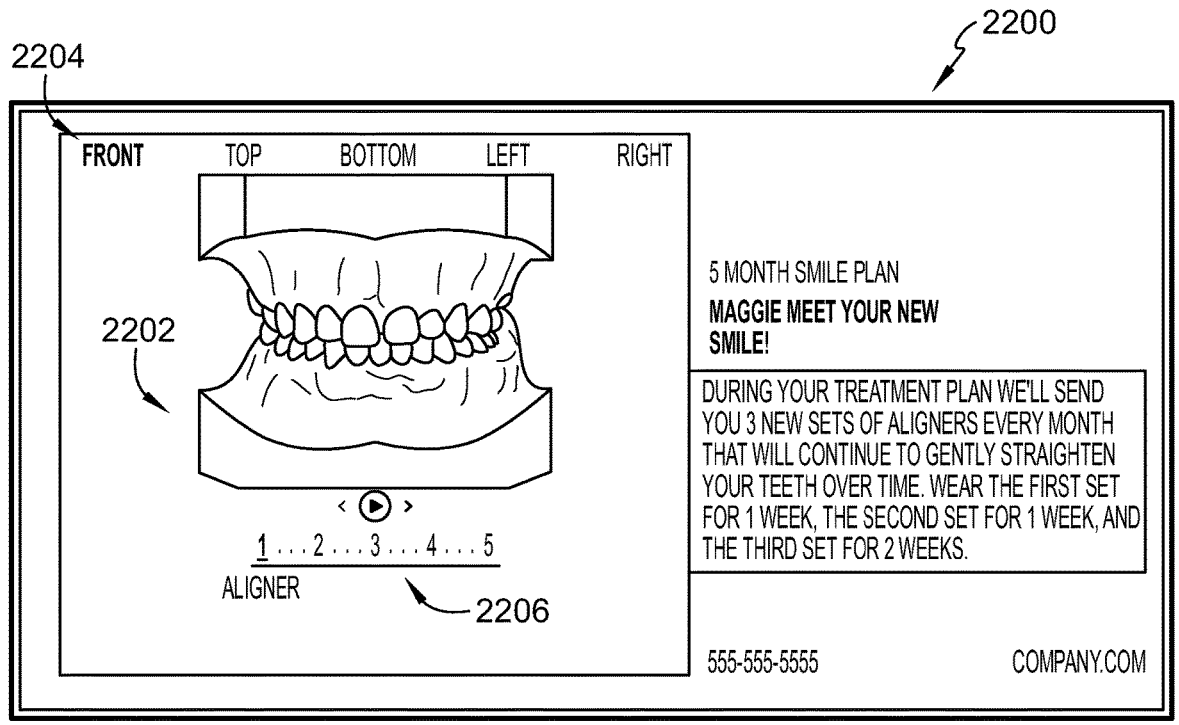
FIG. 33 is a screen shot of a 3D treatment plan viewer user interface that may be generated by the application server of FIGS. 22-23.

Referring now to FIG. 33, a user interface 2200 for viewing a 3D treatment plan is shown. The user interface 2200 may be used to view the treatment plan as described above in connection with block 1348 of FIG. 24B. The illustrative user interface 2200 is a web page provided by the application server 1102 to the user device 1106; however, it should be understood that the user interface 2200 may be embodied as native application, managed application, or other interface of the user device 1106. As shown, the user interface 2200 includes a 3D model view 2202 that displays the 3D model of the treatment plan. As described above in connection with block 1342 of FIG. 24B, the 3D model may be optimized for efficient viewing on the user device 1106. The user interface 2200 also includes a button bar 2204 that allows the user to switch between particular views of the 3D model and a slider 2206 that allows the user to switch between particular phases of the treatment plan. For example, the illustrative user interface 2200 displays a five-month treatment plan, and the slider 2206 allows the user to display a 3D model for each month of the treatment plan.

Figure 34A:
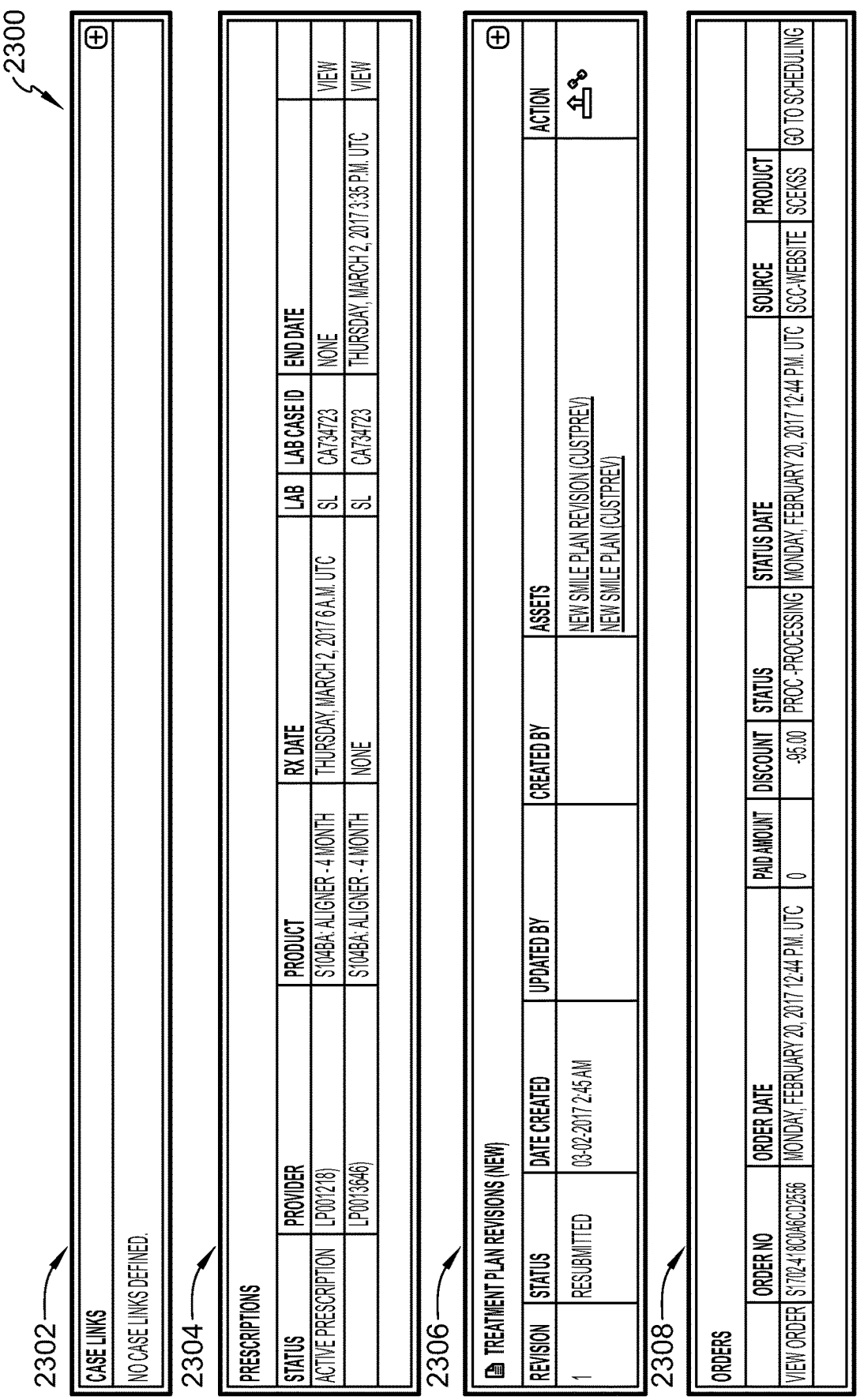
Figures 38A, 38B:
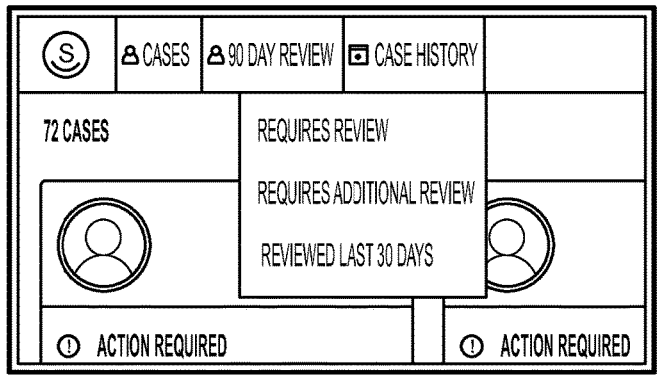
Figure 38C:
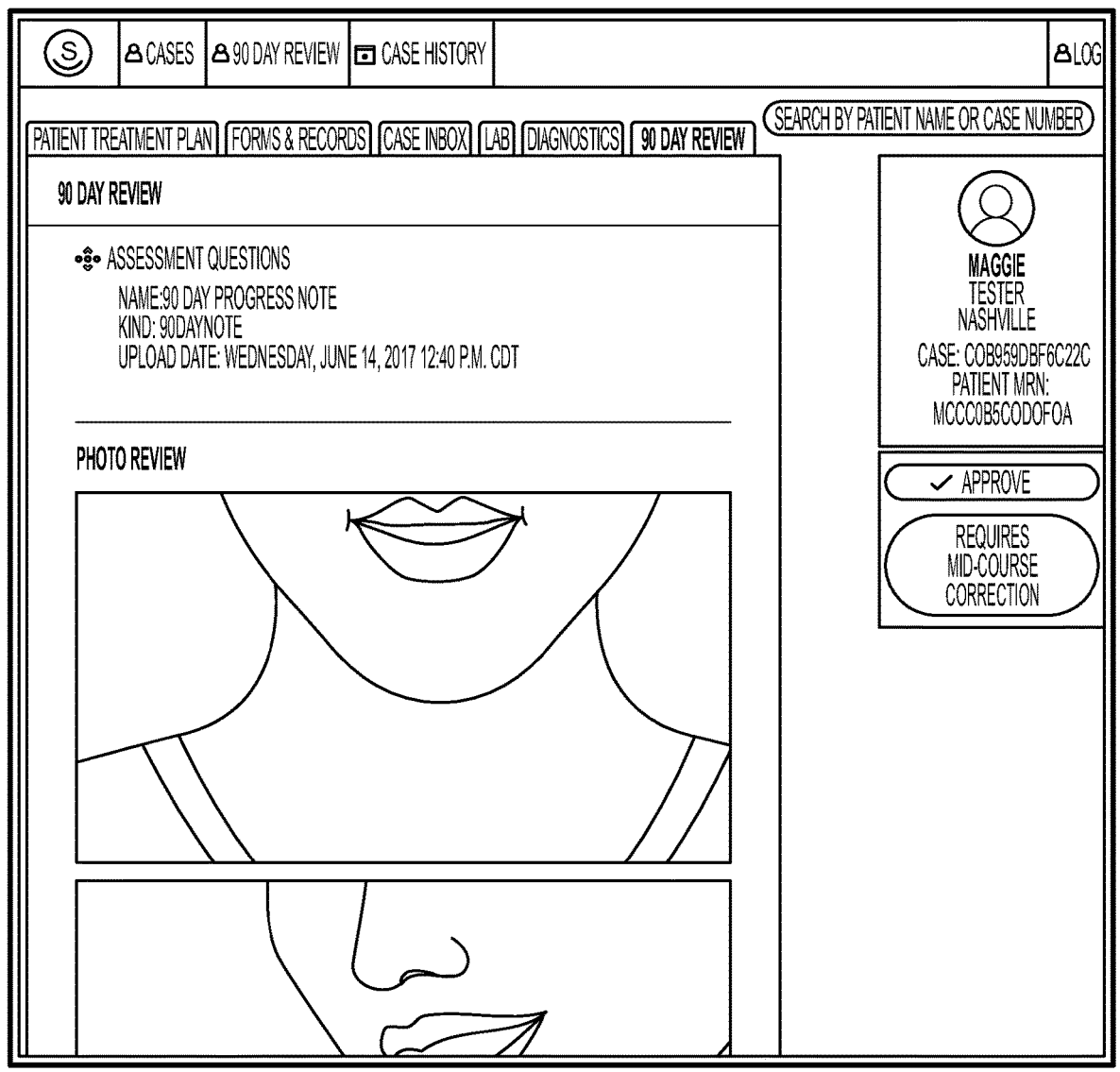

Referring now to FIGS. 33A-33F, a user interface 2300 for a staff portal is shown. The user interface 2300 may be used to store and manage all data relating to a particular user's case. Thus, the user interface 2300 may be used as an interface to a secure electronic medical records repository provided by the application server 1102. The illustrative user interface 2300 is a web page provided by the application server 1102 to the staff device 1104; however, it should be understood that the user interface 2300 may be embodied as native application, managed application, or other interface of the staff device 1104 and/or the application server 1102. The illustrative user interface 2300 shown in FIGS. 33A-33F illustrates one potential embodiment of the documents and other data that may be stored for each user by the application server 1102. As shown in FIGS. 33A-33F, the user interface 2300 includes multiple views, with each view allowing access to part of the data associated with a particular user's case. As shown in FIG. 34A, the user interface 2300 may include a case link view 2302, a prescription view 2304, a treatment plan revision view 2306, and an order view 2308. The treatment plan revision view 2306 may track changes made to the treatment plan during the provider's review process, as described above in connection with blocks 1332 to 1346 of FIG. 24B, and the prescription view 2304 may be populated after the provider has approved a treatment plan. As shown in FIG. 34B, the user interface 2300 may include a case detail view 2310, which includes details on the user's contact information, payment information, case status, and also includes links to the user's photo assessment and other information. As shown in FIG. 34C, the user interface 2300 may include a journal view 2312, which records events related to the user's case. As shown in FIG. 34D, the user interface 2300 may include a journal entry view 2314, which allows a staff professional or other person to enter events into the journal for the user's case. Each journal entry may be restricted by audience (e.g., staff, provider, user, or other audience). As shown in FIG. 34E, the user interface 2300 may include a case message view 2316, which records all messages sent via the application server 1102 concerning the user's case. The messages may be exchanged, for example, between the provider, staff, and/or the dental lab 1110 for a case. As shown in FIG. 34F, the user interface 2300 may include a case file view 2318 and a case document view 2320. The views 2318, 2320 may provide an interface to secure storage for all images, treatment plans, consent forms, and other documents related to a user's case.

Referring to FIGS. 34-36, another embodiment of a dental tray 200 includes a substantially arched mouth insert 202 that is sized and shaped to be inserted into the user's mouth. Particularly, the insert 202 is sized and shaped to be received into either an upper portion or a lower portion of the user's mouth. The insert 202 includes a cavity 204 defined by a bottom wall 206 and a pair of sidewalls 208 extending upward from the bottom wall 206. The cavity 204 is sized to receive the putty mixture. When the dental tray 200 is inserted into the user's mouth, the user bites down on the dental tray 200 so that the user's teeth are within the cavity 204 and bite into the putty mixture. A flange 210 extends from a front of the dental tray 200. The flange 210 is configured to be gripped by the user to insert and remove the dental tray 200 from the user's mouth.

The embodiments described above facilitate the application of a dental impression kit at home. It will be appreciated that the dental impression kit and methods described herein have broad applications. The foregoing embodiments were chosen and described in order to illustrate principles of the methods and apparatuses as well as some practical applications. The preceding description enables others skilled in the art to utilize methods and apparatuses in various embodiments and with various modifications as are suited to the particular use contemplated. In accordance with the provisions of the patent statutes, the principles and modes of operation of this disclosure have been explained and illustrated in exemplary embodiments.

It is intended that the scope of the present methods and apparatuses be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

What is claimed is:

1. A method of remote orthodontic treatment, the method comprising:
sending a dental impression kit to a customer for the customer to administer contents of the dental impression kit to generate a plurality of impressions of one or more dental arches of the customer used to manufacture one or more dental aligners;
receiving, by an application server from a user portal, a plurality of images provided by a customer computing device, the plurality of images representing teeth of the customer, and the plurality of images captured by a user device of the customer;
generating 3D image data corresponding to a mouth of the customer, the 3D image data generated based on the plurality of impressions made by the customer using the dental impression kit;
providing, by the application server to a staff portal, the plurality of images;
receiving, by the application server from the staff portal, a first communication that causes the application server to send the 3D image data to a dental lab computing device capable of generating a treatment plan for moving at least one tooth of the teeth of the customer, wherein the first communication is received based on a determination to generate a treatment plan;

receiving, by the application server from the dental lab computing device, treatment plan data corresponding to the treatment plan, wherein the treatment plan data comprises a plurality of 3D models, each 3D model of the plurality of 3D models corresponding to a respective step in a series of steps to reposition the at least one tooth of the teeth of the customer;

providing, by the application server to a provider portal, the plurality of images and the treatment plan data, the provider portal accessible by a provider computing device associated with a provider;

receiving, by the application server from the provider portal, a second communication that indicates the customer is fit for treatment and that the treatment plan is acceptable;

providing, by the application server to the user portal, a user interface to the customer on the user portal, the user interface including a first user interface element for viewing a visualization of the treatment plan and a second user interface element configured to enable purchasing the one or more dental aligners based on the treatment plan, wherein the visualization comprises a view of the plurality of 3D models;

receiving, by the application server from the user portal, a selection of the second user interface element on the user interface; and transmitting, by the application server to a manufacturing system based on the second communication and determining that the user purchased the one or more dental aligners, the treatment plan data for manufacturing the one or more dental aligners, the one or more dental aligners being manufactured based on the treatment plan and being specific to the customer and configured to reposition at least one tooth of the teeth of the customer.

2. The method of claim 1, further comprising:
receiving, by the application server from the user portal, a dental history questionnaire response; and
providing, by the application server to the provider portal, the dental history questionnaire response.

3. The method of claim 1, wherein the plurality of images comprises an upper open view image of the mouth of the customer, a lower open view image of the mouth of the customer, and a straight-on closed view image of the mouth of the customer.

4. The method of claim 1, wherein the 3D models comprise a sequence of 3D models indicative of the teeth of the customer, and wherein the visualization comprises a series of images representative of the sequence of 3D models.

5. The method of claim 1, wherein the plurality of images are received following the customer receiving the dental impression kit.

6. A method of remote orthodontic treatment, the method comprising:
receiving, by an application server from a user portal, a plurality of images provided by a customer computing device, the plurality of images representing teeth of a customer, and the plurality of images captured by a user device of the customer;
generating 3D image data corresponding to a mouth of the customer, the 3D image data generated based on a plurality of impressions made by the customer of one or more dental arches of the customer using a dental impression kit sent to an address specified by the customer for administration by the customer;

providing, by the application server to a staff portal, the plurality of images;

receiving, by the application server from the staff portal, a first communication that causes the application server to send the 3D image data to a dental lab computing device capable of generating a treatment plan for moving at least one tooth of the teeth of the customer, wherein the first communication is received based on a determination to generate a treatment plan;

receiving, by the application server from the dental lab computing device, treatment plan data corresponding to the treatment plan, wherein the treatment plan data comprises a plurality of 3D models, each 3D model of the plurality of 3D models corresponding to a respective step in a series of steps to reposition the at least one tooth of the teeth of the customer;

providing, by the application server to a provider portal, the plurality of images and the treatment plan data, the provider portal accessible by a provider computing device associated with a provider;

receiving, by the application server from the provider portal, a second communication that indicates the customer is fit for treatment and that the treatment plan is acceptable;

providing, by the application server to the user portal, a user interface to the customer on the user portal, the user interface including a first user interface element for viewing a visualization of the treatment plan and a second user interface element for purchasing the one or more dental aligners based on the treatment plan, wherein the visualization comprises a view of the plurality of 3D models;

receiving, by the application server from the user portal, a selection of the second user interface element on the user interface;

transmitting, by the application server to a manufacturing system based on the second communication and determining that the user purchased the plurality of dental aligners, treatment plan data; and manufacturing, by the manufacturing system based on the manufacturing system receiving the treatment plan data, one or more dental aligners based on the treatment plan data, the one or more dental aligners being specific to the customer and being configured to reposition the at least one tooth of the teeth of the customer, wherein manufacturing the one or more dental aligners comprises:
3D printing physical models based on the plurality of 3D models of the treatment plan; and
molding the one or more dental aligners using the 3D printed physical models.

7. The method of claim 6, further comprising:
receiving, by the application server from the user portal, a dental history questionnaire response;
providing, by the application server to the provider portal, the dental history questionnaire response.

8. The method of claim 6, wherein the plurality of images comprises an upper open view image, a lower open view image, and a straight-on closed view image.

9. The method of claim 6, wherein the plurality of 3D models are in a sequence which is indicative of movement of the teeth of the customer.

10. The method of claim 6, further comprising:
providing, by the application server to the user portal responsive to a selection of the first user interface element, the visualization of the treatment plan associated with the customer; and receiving, by the application server from the user portal, an order to purchase the treatment plan based on receiving the selection of the second user interface element, wherein manufacturing the one or more dental aligners occurs after the application server receives the order to purchase.

11. The method of claim 6, wherein each 3D model of the plurality of 3D models corresponds to a step in a series of steps to reposition the at least one tooth of the teeth of the customer.

12. A method of remote orthodontic treatment, the method comprising:

receiving, by an application server from a user portal, a plurality of images provided by a customer computing device, the plurality of images representing teeth of a customer, and the plurality of images captured by a user device of the customer;

generating 3D image data corresponding to a mouth of the customer, the 3D image data generated based on a plurality of impressions made by the customer of one or more dental arches of the customer using a dental impression kit sent to an address specified by the customer for administration by the customer;

receiving, by the application server from the staff portal, a first communication that causes the application server to send the 3D image data to a dental lab computing device capable of generating a treatment plan for moving at least one tooth of the teeth of the customer, wherein the first communication is received based on a determination to generate a treatment plan;

sending, by the application server to the dental lab computing device based on receiving the first communication, the 3D image data for generating the treatment plan;

receiving, by the application server from the dental lab computing device, treatment plan data corresponding to the treatment plan, wherein the treatment plan data comprises a plurality of 3D models corresponding to a position of the at least one tooth of the dental arch of the customer as the at least one tooth is moved in accordance with the treatment plan;

providing, by the application server to a provider portal, the plurality of images and the treatment plan data, the provider portal accessible by a provider computing device associated with a provider;

receiving, by the application server from the provider portal, a second communication that indicates the customer is fit for treatment and that the treatment plan is acceptable;

optimizing, by the application server, the plurality of 3D models for rendering on the customer computing device corresponding to the customer;

providing, by the application server to the user portal, a user interface to the customer on the user portal, the user interface including a first user interface element for viewing a visualization of the treatment plan and a second user interface element for purchasing one or more dental aligners, wherein the optimized plurality of 3D models are configured for rendering at the customer computing device of the customer, and wherein the optimized plurality of 3D models are incorporated into the visualization of the treatment plan for the customer to view;

receiving, by the application server from the user portal, a selection of the second user interface element on the user interface and determining an order to purchase the treatment plan based on receiving the selection of the second user interface element; and transmitting, by the application server to a manufacturing system based on the order to purchase, the treatment plan data for manufacturing the one or more dental aligners, the one or more dental aligners being manufactured based on the treatment plan data and being specific to the customer and configured to reposition the at least one tooth of the teeth of the customer.

13. The method of claim 12, wherein the plurality of images are received following the customer receiving the dental impression kit.

14. The method of claim 12, wherein the order for purchase includes a payment for the treatment plan.

15. The method of claim 10, further comprising optimizing the plurality of 3D models to provide views of the optimized plurality of 3D models, wherein optimizing the plurality of 3D models comprises reducing a size of data files corresponding to the plurality of 3D models.

16. The method of claim 15, wherein the user interface is configured to provide views of the optimized plurality of 3D models for each step of the treatment plan from multiple angles responsive to a selection of the first user interface element.

17. The method of claim 16, wherein the user interface is configured to provide views of the optimized plurality of 3D models including upper 3D models of an upper dental arch of the customer and lower 3D models of a lower dental arch of the customer.

18. The method of claim 17, wherein the user interface includes a plurality of user interface elements including a third user interface element for switching between particular views of the optimized 3D model of the plurality of 3D models, and a fourth user interface element for switching between steps of the treatment plan.

* * * * *